United States Patent
Charrier et al.

(10) Patent No.: US 6,456,743 B1
(45) Date of Patent: Sep. 24, 2002

(54) METHODS AND DEVICES FOR PROCESSING A SET OF DATA

(75) Inventors: Maryline Charrier, Rennes; Claude Dierieck, Cesson Sevigne, both of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/921,379

(22) Filed: Aug. 29, 1997

(30) Foreign Application Priority Data

Aug. 30, 1996 (FR) ............................................. 96 10636

(51) Int. Cl.$^7$ ............................. G06K 9/36; G06K 9/46
(52) U.S. Cl. ...................... 382/248; 382/249; 382/276; 382/233
(58) Field of Search ................................ 382/248, 249, 382/279, 276, 232, 233

(56) References Cited

U.S. PATENT DOCUMENTS

| | | | |
|---|---|---|---|
| 5,065,447 A | 11/1991 | Barnsley et al. | 382/56 |
| 5,416,856 A | 5/1995 | Jacobs et al. | 382/232 |

OTHER PUBLICATIONS

Popescu, et al. "Generalized Square Isometrics An Improvement For Fractal Image Coding", pp. 637–642.

Hürtgen, et al. "On The Convergence Of Fractal Transforms", 1994 IEEE, pp. 561–564.

*Primary Examiner*—Phuoc Tran
(74) *Attorney, Agent, or Firm*—Fitzpatrick, Cella, Harper & Scinto

(57) ABSTRACT

A method and device that operates in accordance with the method are provided for primary processing a set of data (IM, f) representing physical quantities. The method comprises a step of constructing a global contractive mapping of a first type for the set of data, the fixed point of which constitutes an approximation of all or part of this set. At least one mapping belonging to the group of mappings consisting of multi-dimensional mappings and non-linear mappings is employed to construct the global contractive mapping. A next step includes determining parameters ($a_i$, b) of the global contractive mapping so as to allow the use of a method of successive approximations converging towards the fixed point of the global contractive mapping. The determined set of parameters ($a_i$, b) constitutes a primary representation of the set of data.

38 Claims, 27 Drawing Sheets

METHODS AND DEVICES FOR PROCESSING A SET OF DATA

Figure 1:
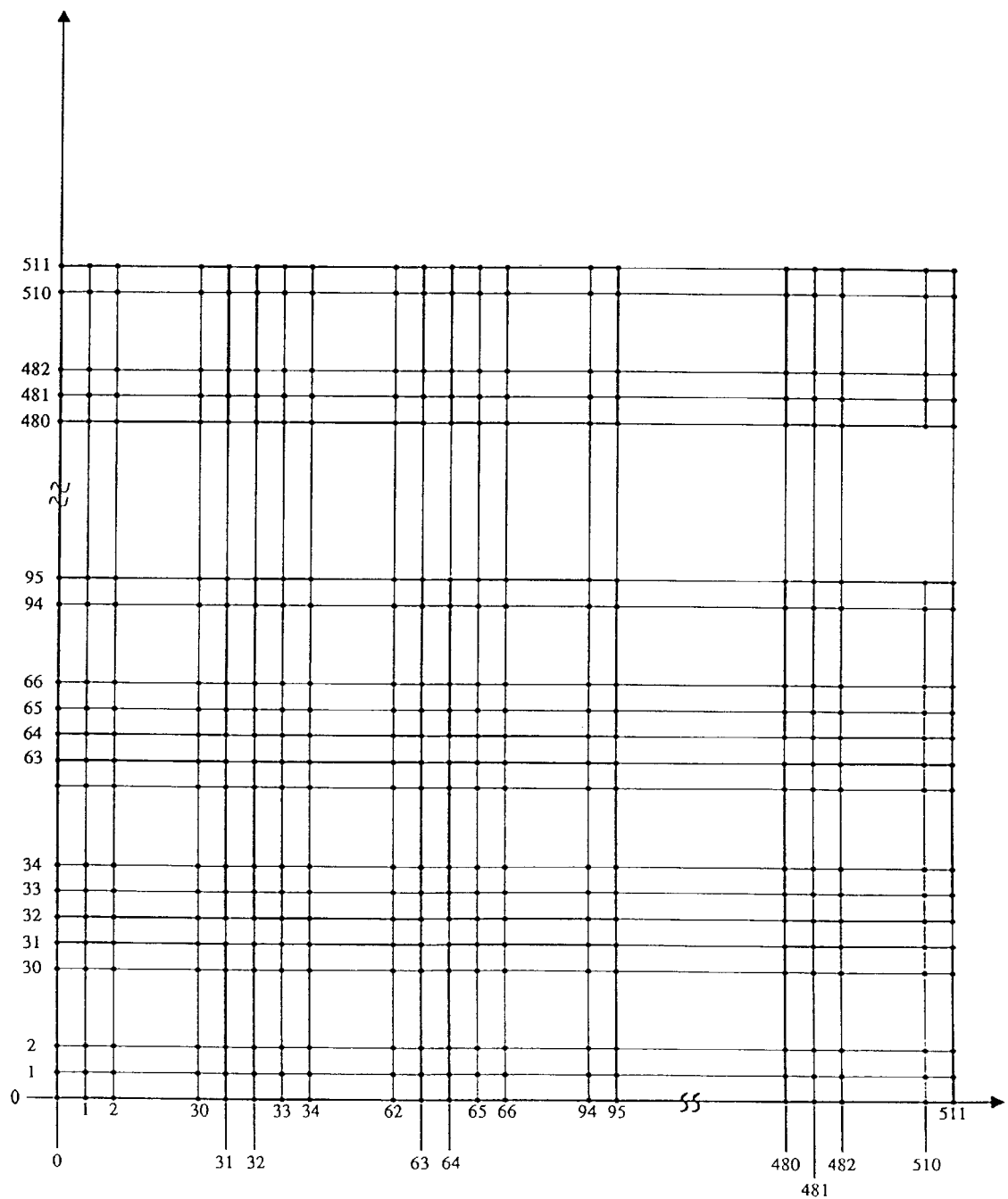

The present invention concerns, in general terms, a method and a device for the processing of data, notably the representation, generation, retrieval, regeneration or iterative processing of data.

More particularly, the present invention relates to the transmission (that is to say the remote representation) and/or the storage (that is to say the representation in a memory) of data, with or without compression thereof. These data can advantageously consist of the digital or analogue data of an image or sequence of images, and/or the digital or analogue data relating to sound (music, speech, etc) and/or the digital or analogue data relating to any mono or multi-dimensional signal. More generally, the present invention relates to the representation of any mono or multi-dimensional data.

Before disclosing the objectives and means of the invention, it is proposed to give below the following definitions:

"Set of data": set of any data representing physical quantities (usually voltage levels) which can themselves represent other physically perceptible or measurable quantities. In favoured mappings, the sets of data concerned are images, sound or mono or multi-dimensional signals, etc. In the mapping concerning the processing of images, reference will sometimes be made to the "image" instead of the "set of data" relating to the image. That which will be disclosed below with regard to "images" or "sub-images" is respectively applicable to "sets of data" or "sub-sets of data" and vice versa.

"Representation of data": any "processing" of a set of data of a given type, resulting a perfect or imperfect transformation of the said set of data into another type. Example: the data can consist of the 256 grey levels of the pixels of an image, their representation consisting of a series of binary words able to be stored or transmitted; conversely, the representation of the data consisting of the said binary words can consist of their transformation in order once again to have data of the same type as the initial data.

"Primary representation": by convention, any processing resulting in the transformation of data of a first type into data of a second type. In this case the term "primary processing" of the data will be used.

"Secondary representation": by convention, the transformation of data of the second type resulting from a primary processing. In this case the term "secondary processing" will be used.

"Retrieval of data": the particular case of a secondary representation in which the data of the second type are transformed into data of the first type. This retrieval can be perfect or imperfect.

A "metric space" is a set of elements provided with a functional distance which is symmetrical and positive and satisfies the triangular inequality. This space is "complete" when it contains all the limit points of all the convergent sequences.

A "Lipschitz mapping": a mapping which transforms the points of a is metric space in the same space and for which all the ratios of the distance of two elements transformed by the said mapping to the distance of the said two elements are bounded.

A "contractive mapping" or "contraction": a Lipschitz mapping for which the smallest of the majorants (contraction factor) of the said set of ratios is less than unity. However, within the meaning of the present invention, all convergent mappings (successive approximations) in a sub-set of the metric space are contractive.

A "similarity" is a Lipschitz mapping for which the ratio of the distance of two transformed elements to the distance of the said elements is a fixed quantity. A linear similarity is a "similitude".

A "contractive similarity" is a Lipschitz mapping for which the ratio of the distance of two transformed elements to the distance of the said elements is a fixed quantity strictly less than unity.

The "fixed point" of a contraction of a complete metric space in the same space (or of a sub-set of this space in itself) is the single element of the space which is left invariant by the said contractive mapping.

The "construction" of a contractive mapping on a set of data consists of constituting a family of contractions able to transform the data and select the parameters of one of the said contractions in order to satisfy one or more predetermined conditions.

The "method of successive approximations" makes it possible to iteratively approach the fixed point of a contraction as close as is desired. Starting from an arbitrary element, the said contraction is applied to this arbitrary element. The same contraction is then applied to the previously obtained transform. By reiterating this process the single fixed point of the contraction is successively and ineluctably approached.

"A best approximation" of an element in a metric space is a point of a sub-set of candidates, which are themselves points of the said space, which minimises the distance to the said element.

"A good approximation" of an element in a metric space is a point of a sub-set of the said space which is close with a predetermined error, to a predetermined best approximation.

In the prior art, various image representation methods, with compression, are known, using the so-called "fractal" technique.

Through the document U.S. Pat. No. 5,065,447, a method and a device are known for processing or storing an image with compression of the data relating to the initial image. In this method, the data relating to the initial image are divided, that is to say the image is cut into a plurality of elementary sub-images (referred to as "domain blocks"). This method then consists of generating an ordered dictionary of a set of reference sub-images (referred to as "range blocks") formed from image portions of predetermined size which have undergone a certain number of predetermined operations such as rotation and turning on various axes of symmetry. Then, for each elementary sub-image, a comparison is carried out with all the reference sub-images of the dictionary and in the dictionary the reference sub-image is selected which is the most similar to the elementary sub-image in question. Finally, the method consists of processing or storing parameter information relating to the addresses of the reference sub-images selected in the dictionary, in order to represent each of the original elementary sub-images.

It is through this set of operations that the method described in this document makes it possible to obtain a first representation of the image with compression of the data.

In order to effect, using the said parameter information, the retrieval of the initial image, the method and device described in this document perform the following operations: using an arbitrary starting image, steps similar to those above are carried out, that is to say the arbitrary starting image is partitioned and a dictionary is formed from the elementary sub-images thereof. However, the dictionary is formed only partially, performing for each sub-image only the predetermined operation corresponding to the relevant address of the dictionary of the sub-image in question.

The data thus obtained are used in order to reiterate this process until the difference between two consecutively obtained images is less than a predetermined threshold. The image lastly obtained is then an approximation of the initial image.

This method, which is interesting on a theoretical level, has the major drawback that it is sometimes difficult to put into practice on an industrial level with the means known at the present time. This is because each image must give rise to a long analysis with the formation of a particularly large dictionary, the elementary sub-images of the image to be stored or to be transmitted all being compared with each of the reference sub-images present in the dictionary. The inventors, who carried out simulations, found that, for certain images of average size and resolution (512×512 pixels with 3×256 colour levels), the processing time for the compression was of the order of 1000 to 2000 seconds on a workstation, that is to say around half an hour. Such a processing time is obviously prohibitive for almost any industrial application.

Through the document WO-A-93/17519, another method and device are known for processing images with compression of the data relating to the initial image. In this method the data relating to the initial image are also partitioned, that is to say the image is divided into a plurality of elementary images (referred to as "domains"). In this method a set of fractal transforms connecting the sub-images to all the initial data is then determined, that is to say, in the initial image, an image portion similar to the elementary image in question is sought, so as to minimise any error between the initial data and the approximate data item thus obtained. The coefficients of all the fractal transformations thus performed constitute the first representation of the initial image.

In order to perform the retrieval of the image, the method and device described in this document seek out the fixed points of the elementary fractal transformations whose coefficients were received without however explaining how this search is effected. The initial image is thus retrieved by carrying out a combining of the retrieved sub-images.

This method is also interesting on a theoretical level. However, the inventors found significant degradations in the quality of the image retrieved.

The inventors sought to develop a data processing method of the same type as the methods of the prior art analysed above, but having better performance both with regard to the quality of the retrieved data and with regard to the processing speed.

In the course of their researches, the inventors discovered that the reason why the methods described in U.S. Pat. No. 5,065,447 and WO-A-93/17519 have the above-mentioned defects relates to the fact that the two methods use geometric transformations of image portions consisting essentially of contractive similarities (construction of the dictionary in U.S. Pat. No. 5,065,447 and fractal transformation in WO-A-93/17519). They were in fact able to show that it is a question in both cases of implementing an idea widely shared by experts interested in fractal compression at the time of filing of the present application, an idea according to which the images would, whatever their origin, consist essentially of elements or parts having significant degrees of resemblance between them.

In fact, however, the performance of WO-A-93/17519 is very poor with regard to the quality of the retrieved image since the inventors discovered that the capabilities of retrieval of contractive similitudes are very limited, contrary to the belief of experts at the date of filing of the present application.

Likewise the performance of U.S. Pat. No. 5,065,447 is very limited with regard to processing time. As the retrieval capabilities of contractive similitudes are inclusively limited, the author of U.S. Pat. No. 5,065,447 was led to the production of a large dictionary constructed on the basis of numerous transformations of sub-images in the method according to U.S. Pat. No. 5,065,447: it is a case in fact of artificially multiplying the resemblance elements, which certainly makes it possible to improve the quality of the retrieved image substantially, but at the expense of the computing time.

The inventors therefore sought to produce a method and a device for processing data, notably for images, making it possible to obtain better performance than the aforesaid prior art, both with regard to the quality of the data or of the retrieved image and with regard to the computing speed, and able to result in a significant compression of the data to be transmitted or stored.

The methods and devices according to the invention resolve this problem.

In general terms, the present invention relates first of all to a method for the primary processing of a set of data representing physical qualities, characterised in that it includes:

b) a step of "construction" of a global contractive mapping of the so-called "first type" for the said set of data, the fixed point of which constitutes an approximation of all or part of this set, using, to do this, at least one mapping belonging to the group of mappings consisting of multi-dimensional mappings and non-linear mappings and determining the parameters of the global contractive mapping so as:

to allow the use of a method of successive approximations converging towards the fixed point of the said global contractive mapping; the set of parameters thus determined constituting a primary representation of the said set of data.

In general terms, the present invention then relates to a device for the primary processing of a set of data representing physical quantities, characterised in that it includes:

means of inputting data to be processed;

means of outputting parameters;

first logic means of transforming the data to be processed into parameters;

the said first logic means including:
"construction" means adapted:
to construct, for each set of data to be processed, a global contractive mapping of the so-called "first type", the fixed point of which constitutes an approximation of all or part of this set of data, using, to do this, at least one mapping belonging to the group of mappings consisting of multi-dimensional mappings and non-linear mappings, so as:
to allow the use of a method of successive approximations converging towards the fixed point of the said global contractive mapping;
to deliver, at the output means, the parameters thus determined, said parameters constituting a primary representation of the said set of data.

By virtue of these provisions, the present invention achieves these objectives.

It should be noted first of all that it was discovered that, in general terms, in accordance with the invention, in order to process, notably to represent, a set of initial data representing physical quantities, notably with compression of the said initial data, it suffices to construct, by appropriate means, a global contractive mapping, acting on the said data.

Another important characteristic of the invention lies in the fact that, in order to construct the said global contractive mapping, it is necessary to use, to do this, at least one mapping belonging to the group of mappings consisting of multi-dimensional mappings and non-linear mappings. In doing this, any recourse to mathematical transformations belonging to the class of contractive similarities is excluded, which makes it possible to avoid the drawbacks set out above.

However, in order to construct the said global contractive mapping acting on the data, the expert has at his disposal a very wide range of mathematical tools on which he is able to draw. He can consequently choose from amongst these tools those which are the most favourable to performance, for example in conjunction with the type of data to be represented or the particular application involved. Such a possibility does not exist in the prior art analysed above and proves highly advantageous. Thus, for example, in the case of a local processing of the image, by partitioning of said image into elementary sub-images, the expert can choose, for the local processing, mappings which are not necessarily contractive, which gives him an important choice in the possibilities of local processing of the image and also leaves him a great deal of freedom. In particular, he can choose, at local level, Lipschitz mappings which enable him to facilitate the implementation of the contractive nature of the global mapping.

Moreover, the use of a method of successive approximations leaves the expert the freedom to choose the final difference between the said fixed point and the data thus retrieved or generated.

In one of its aspects, the present invention relates in particular to a method of primary processing of a set of data representing physical quantities comprising:

a) a "partitioning" step in the course of which the said set of data is partitioned into m "elementary sub-sets";

characterised in that it also includes:

b) a "construction" step in which, for each of the said elementary sub-sets, n working sub-sets are taken into consideration, n being greater than 1, and an elementary mapping of the n working sub-sets is constructed in the elementary sub-set in question, determining the parameters of the elementary mapping so as:

to make contractive a global mapping, of the so-called "first type", including the m elementary mappings related to the m elementary sub-sets and the fixed point of which constitutes an approximation of all or part of this set of data;

to allow the use of a method of successive approximations converging towards the fixed point of the global contractive mapping;

all the said parameters thus determined and related to the m elementary sub-sets constituting a primary representation of the said set of data.

Moreover, in this aspect, the present invention relates to a device for the primary processing of a set of data representing physical quantities, characterised in that it includes:

means of inputting data to be processed;

means of outputting parameters;

first logic means for transforming the data to be processed into parameters; the said first logic means including:

"partitioning" means adapted to partition the said set of data into m "elementary sub-sets";

"construction" means adapted:

to take into account, for each of the said elementary sub-sets, n working sub-sets, n being greater than 1, to construct, for each of the elementary sub-sets, an elementary mapping of the n working sub-sets in the elementary sub-set in question, determining the parameters thereof so as:

to make contractive a global mapping of the so-called "first type" including the m elementary applications related to the m elementary sub-sets, and the fixed point of which constitutes an approximation of all or part of this set of data, and to permit the implementation of a method of successive approximations converging towards the fixed point of the said global contractive mapping;

to deliver at the output means the parameters thus determined, said parameters constituting a primary representation of the said set of data.

By virtue of these provisions, the method and device overcome the aforementioned drawbacks.

In fact, it should be noted first of all that the method and device allow a representation of a set of data, notably those relating to an image, with where applicable a significant amount of compression.

In addition, considering n working sub-sets (or working sub-images), n being strictly greater than unity, according to the invention a multi-dimensional mapping is used, which excludes the mapping belonging to the class of similarities. Because of this, the method according to the invention avoids the poor performance related to the use of fractal transforms as described in the document WO-A-93/17519. This is because, by constructing each elementary mapping in question from the n working sub-sets, the quality of the retrieval is notably improved, in so far as the number n of working sub-sets is high. Certainly the computing time increases with the number of working sub-sets used by the elementary sub-sets (or elementary sub-images) but this computing time, even for a relatively high integer n, is much less than the computing time related to the construction of a dictionary and the analysis of the image on this basis described in the document U.S. Pat. No. 5,065,447.

Thus, by choosing, in a preferred embodiment, n equal to 4, the inventors found, with regard to quality, that the method according to the invention made possible, all other things being equal, an improvement in the error rate of approximately 15% compared with the method and device described in the document WO-A-93/17519.

Moreover, by avoiding the formation of a dictionary and the long analysis described in the document U.S. Pat. No. 5,065,447, and by virtue of the characteristics of the present invention, the processing of an image is notably accelerated compared with the aforementioned US document. By implementing their preferred embodiment, the inventors found that, for an image of 512×512 pixels with 3×256 colour levels, the processing time was of the order of less than 100 seconds on a workstation; they also have every reason to believe that the improvements made to the method and device briefly described above will make it possible to obtain performance with regard to speed.

As a variant, in a second aspect of the present invention, the method of primary processing of a set of data representing physical quantities comprises:

a) a "partitioning" step in the course of which the said set of data is partitioned into m "elementary sub-sets"; and it is characterised in that it also includes:

b) a "construction" step in which, for each of the said elementary sub-sets, n working sub-sets are taken into consideration, related geometrically thereto in a predetermined manner, n being non null, and an elementary mapping belonging to the group of mappings consisting of multi-dimensional mappings and non-linear mappings is constructed, from the n working sub-sets in the elementary sub-set in question, determining all the parameters of this elementary mapping so as:

to make contractive a global mapping, of the so-called "first type", including the m elementary mappings related to the m elementary sub-sets and the fixed point of which constitutes an approximation of all or part of this set of data;

to allow the use of a method of successive approximations converging towards the fixed point of the said global contractive mapping;

all the said parameters thus determined and related to the m elementary sub-sets constituting a primary representation of the said set of data.

In this aspect of the present invention, the device for the primary processing of a set of data representing physical quantities includes:

means of inputting data to be processed;

means of outputting parameters;

first logic means of transforming the data to be processed into parameters; the said first logic means including:

"partitioning means adapted to partition the said set of data into "elementary sub-sets", "construction" means adapted:

to take into account, for each of the said elementary sub-sets, n working sub-sets related thereto in a predetermined fashion, n being non-null, to construct, for each of the elementary sub-sets, an elementary mapping belonging to the group of mappings consisting of multi-dimensional mappings and non-linear mappings, of the n working sub-sets in the elementary sub-set in question, determining all the parameters of this elementary mapping so as:

to make contractive a global mapping of the so-called "first type" including the m elementary mappings whose fixed point constitutes an approximation of all or part of this set of data;

to allow the use of a method of successive approximations converging towards the fixed point of the said global contractive mapping;

to deliver, at the output means, the parameters thus determined, said parameters constituting a primary representation of the said set of data.

These arrangements have substantially the same advantages as those relating to the first aspect of the present invention as described briefly above.

It will also be noted here that, like the constructed elementary mappings belonging to the group of mappings consisting of multi-dimensional mappings and non-linear mappings, the mappings belonging to the class of similitudes is avoided, with the advantages observed above.

In addition, as the n working sub-sets relating to a given elementary sub-set are related geometrically in a predetermined manner thereto, this aspect of the invention advantageously makes it possible to avoid the long analysis with the formation of a dictionary followed by a search for the reference sub-image as described in the document U.S. Pat. No. 5,065,447. The speed of processing of a set of data, and notably of an image, is thereby considerably increased.

As a variant, in a second aspect of the present invention, the method of primary processing of a set of data representing physical quantities comprises:

a) a "partitioning" step in the course of which the said set of data is partitioned into m elementary sub-sets"; and also includes:

b) a "construction" step in which, for each of the said elementary sub-sets, n working sub-sets which correspond to it are taken into consideration, at least one working sub-set having a size different from that of the corresponding elementary sub-set, n being non null, and an elementary mapping belonging to the group of mappings consisting of multi-dimensional mappings and non-linear mappings is constructed, of the n working sub-sets in the elementary sub-set in question, determining all the parameters of this elementary mapping so as:

to make contractive a global mapping, of the so-called "first type", including the m elementary mappings related to the m elementary sub-sets, the fixed point of which constitutes an approximation of all or part of this set of data;

to allow the use of a method of successive approximations converging towards the fixed point of the said global contractive mapping;

all the said parameters thus determined and related to the m elementary sub-sets constituting a primary representation of the said set of data.

In this aspect of the present invention, the device for the primary processing of a set of data representing physical quantities includes:

means of inputting data to be processed;

means of outputting parameters, first logic means of transforming the data to be processed into parameters; the said first logic means including:

"partitioning means adapted to partition the said set of data into "elementary sub-sets", "construction" means adapted:

to take into account, for each of the said elementary sub-sets, n working sub-sets which correspond thereto, at least one of the said working sub-sets having a size different from that of the corresponding elementary sub-set, n being non-null, to construct, for each of the elementary sub-sets, an elementary mapping belonging to the group of mappings consisting of multi-dimensional mappings and non-linear mappings, of the n working sub-sets in the elementary sub-set in question, determining all the parameters of this elementary mapping so as:

to make contractive a global mapping of the so-called "first type" including the m elementary mappings whose fixed point constitutes an approximation of all or part of this set of data;

to allow the use of a method of successive approximations converging towards the fixed point of the said global contractive mapping;

to deliver, at the output means, the parameters thus determined, said parameters constituting a primary representation of the said set of data.

These arrangements have substantially the same advantages as those relating to the first aspect of the present invention as described briefly above.

It should be noted in particular that, as the elementary mappings constructed belong to the group of mappings consisting of multi-dimensional mappings and non-linear mappings, the mappings belonging to the class of similitudes are avoided, with the advantages observed above.

In addition, the fact of providing that at least one working sub-set has a size different from that of the corresponding elementary sub-set makes it possible to broaden, for the expert, the choice of the type of elementary mapping which he will use, in order to constitute the global contractive mapping. In this way, the expert can even more easily adapt the implementation of the method to particular situations relating to data to be processed. In addition, by choosing working sub-sets having a size greater than that of the corresponding elementary sub-sets, the range of parameters corresponding to the elementary mappings is thereby broadened, which improves the quality of retrieval of data, and in particular when said data relate to an image.

In another of its aspects, the present invention relates to a method for the secondary processing of a set of data including a set of parameters resulting from the primary processing of initial data effected by implementing the methods described briefly above, characterised in that it includes:

c) an "iterative calculation" step in the course of which, using the said set of parameters, use is made of a method of successive approximations converging towards the fixed point of a global contractive mapping of the so-called "second type", the latter fixed point constituting a secondary representation of the said set of initial data.

Moreover, in this aspect, the present invention relates to a device for the processing of data suitable for the secondary processing of a set of parameters resulting from the primary processing of the initial data produced by the use of one or other of the primary processing methods according to the first two aspects of the invention defined above, the data processing device being characterised in that it includes:

means of inputting parameters means of outputting data;

second logic means of transforming the parameters into data; the said second logic means including:

"iterative calculation" means adapted to implement, using the said set of parameters, a method of successive approximations converging towards the fixed point of a global contractive mapping of the so-called "second type", the latter fixed point constituting a secondary representation of the said set of initial data, and delivering the data thus calculated at the output means.

By virtue of these arrangements, it is possible to effect a secondary processing of a set of data having a set of parameters resulting from the primary processing of initial data in a relatively simple manner since it suffices to use a method of successive approximations, known per se, converging towards the fixed point of a global contractive mapping. The convergence process thus used makes it possible to approach a representation of the set of initial data. It is possible, advantageously, to fix an error threshold as from which it will be considered that the precision required for the representation of this set of initial data is achieved.

In this case, the implementation in the preferred embodiment, where the global contractive mapping used during the primary processing and the global contractive mapping used during the secondary processing are identical, the representation of the set of initial data reached at the end of the secondary processing in reality constitutes a retrieval of the said initial data with, where applicable, the predetermined error mentioned above. Thus, if the set of initial data relates to an image, the primary processing makes it possible to transform and/or to compress these data, for example with a view to their storage or transmission, and the secondary processing makes it possible to retrieve them.

In the case where the global contractive mapping implemented during the primary processing and the global contractive mapping implemented during the secondary processing are of distinct types, the secondary representation no longer constitutes a retrieval of the initial data but in reality constitutes a transformation thereof. This will be the case for example when an initial colour image has been the subject of a primary processing and is then represented by an image with one grey level: in both cases it is indeed the same image, however the data relating to the image obtained at the end of the secondary processing are no longer of the same type as the initial data.

In a preferred embodiment, in the course of the said "iterative calculation" step, account is taken on the one hand of the said set of parameters and on the other hand of an arbitrary set of data referred to as the "initialisation" set, and, in order to effect the said global contractive mapping of the so-called "second type":

$c_1$) the initialisation set is partitioned into m elementary sub-sets;

$c_2$) for each of the m elementary sub-sets thus determined, the parameters of the elementary mappings corresponding to the elementary sub-sets resulting from the partitioning of the set of initial data are taken into consideration, and the said elementary mappings are used on the elementary sub-sets of the initialisation set;

$c_3$) the set of data obtained by the m implementations of elementary mappings are combined, this constituting an intermediate representation of the said initial data, with an error;

$c_4$) operations $c_1$–$c_3$ are reiterated, taking the said intermediate representation as the initialisation set, so as to approach the fixed point of the said global contractive mapping of the second type;

the set of data finally obtained constituting a secondary representation of the set of data which was the subject of a primary processing.

In a preferred embodiment of the device according to the invention, the said second logic means include:

means of inputting parameters;

means of outputting data;

second logic means of transforming the parameters into data; the said second logic means including:

"iterative calculation" means adapted to effect, using the said set of parameters, and on an arbitrary set of data referred to as an "initialisation" set, a global contraction of the so-called "second type" and, for this purpose:

$c_1$) to partition the initialisation set into m elementary sub-sets, $c_2$) to take into consideration, for each of the m elementary sub-sets thus determined, the parameters of the elementary mappings corresponding to the elementary sub-sets resulting from the partitioning of the set of initial data, and to use the said elementary mappings on the elementary sub-sets of the initialisation set, $c_3$) to combine the set of data obtained by the m implementations of elementary mappings, this constituting an intermediate representation of the said initial data, with an error, $c_4$) to reiterate operations $c_1$–$c_3$, taking the said intermediate representation as the initialisation set, so as to approach the fixed point of the said global contractive mapping of the second type, $c_5$) to deliver, at the output means, the set of data thus obtained, this set constituting a secondary representation of the said set of initial data.

By virtue of these arrangements, the method of successive approximations used for the secondary processing is implemented in a particularly simple manner using the parameters obtained at the end of the primary processing.

The inventors noted, in the field of image processing with compression, the performance both with regard to the quality of the image retrieved and with regard to the speed of processing mentioned above.

The present invention also relates, in another of its aspects, to a method of processing a set of data representing a physical quantity comprising a primary processing phase and a secondary processing phase, the said processings being in accordance with those briefly defined above. Correlatively, the data processing device, according to this aspect of the invention, incorporates a primary processing device and a secondary processing device as defined above.

This aspect of the invention combines, within the same processing method, a primary processing phase and a secondary processing phase. These arrangements can be particularly advantageous should it be desired to transform data of one type into data of another type. Thus for example, in certain image processing applications, it may be useful to be able to transform a colour image into a grey-level image. According to this aspect of the invention, such a transformation will consist on the one hand of a primary processing of the colour image, followed (immediately or otherwise) by a secondary processing of the parameters thus obtained, in the course of which a global contractive mapping of the so-called "second type" (different from the global contractive mapping effected during the primary processing) will be effected so as to retrieve a different type of image, in the example cited a grey-level image. This is an example of "complex processing".

Figure 2:
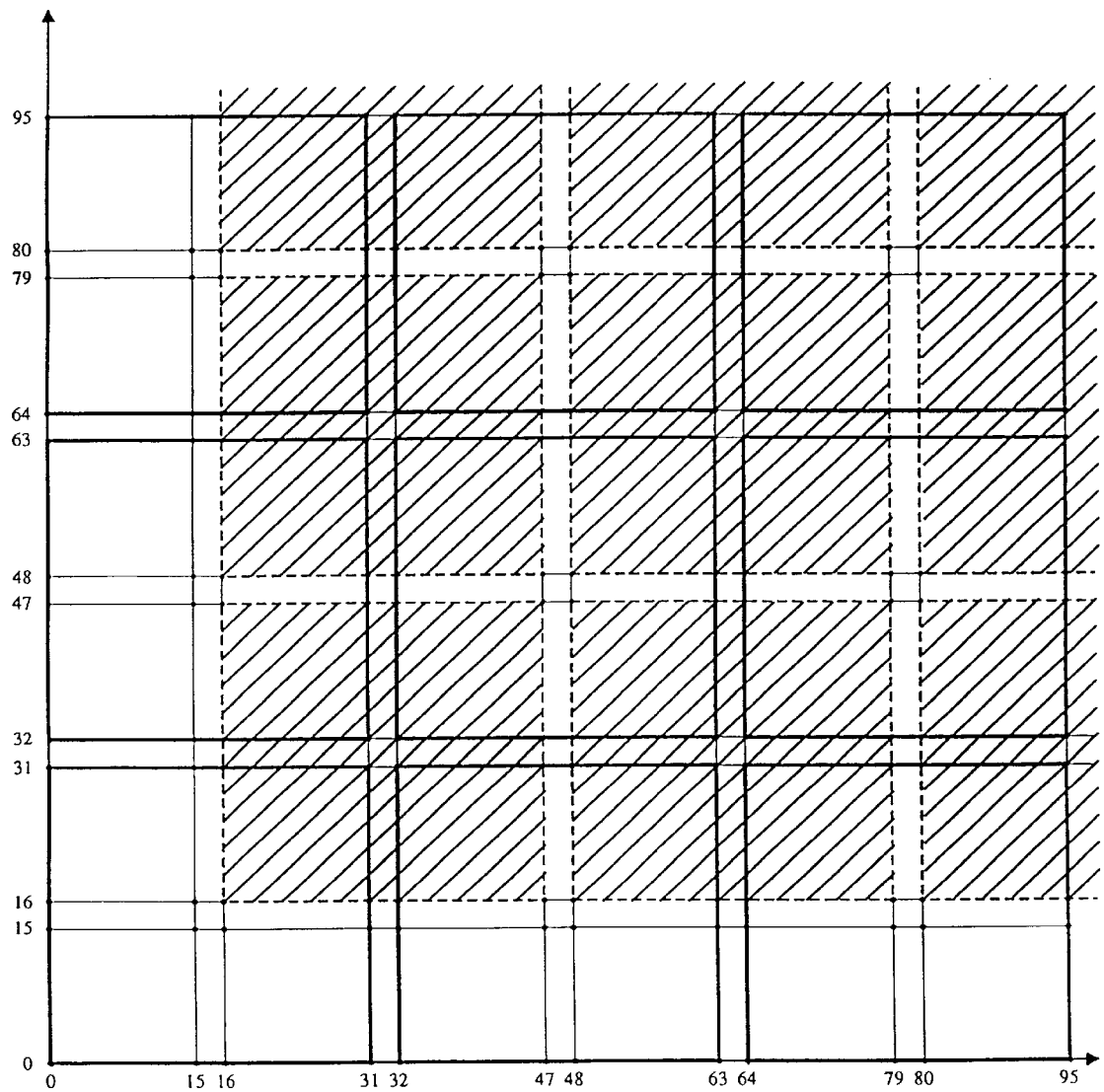
Figure 3:
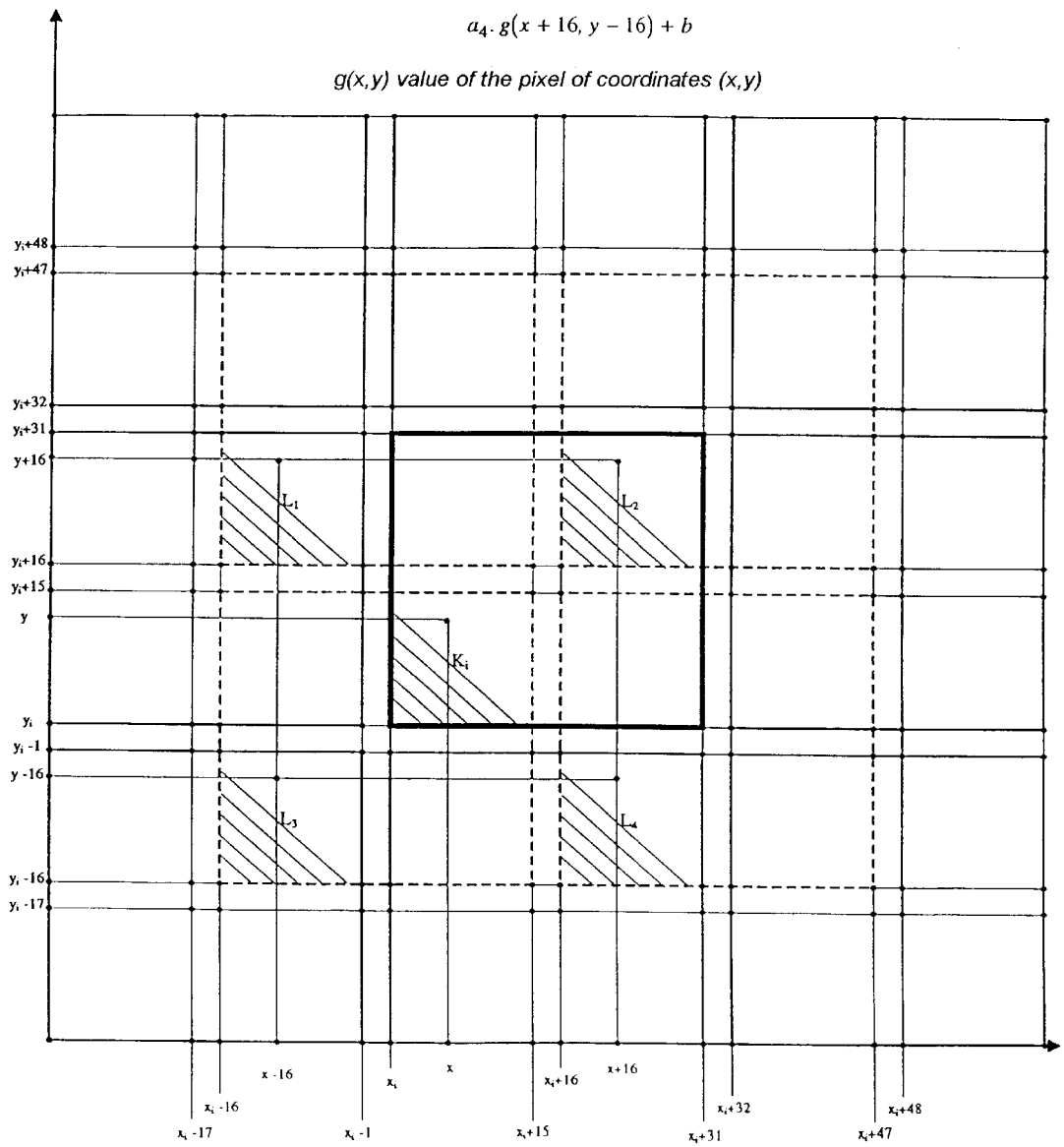
Figure 3A:
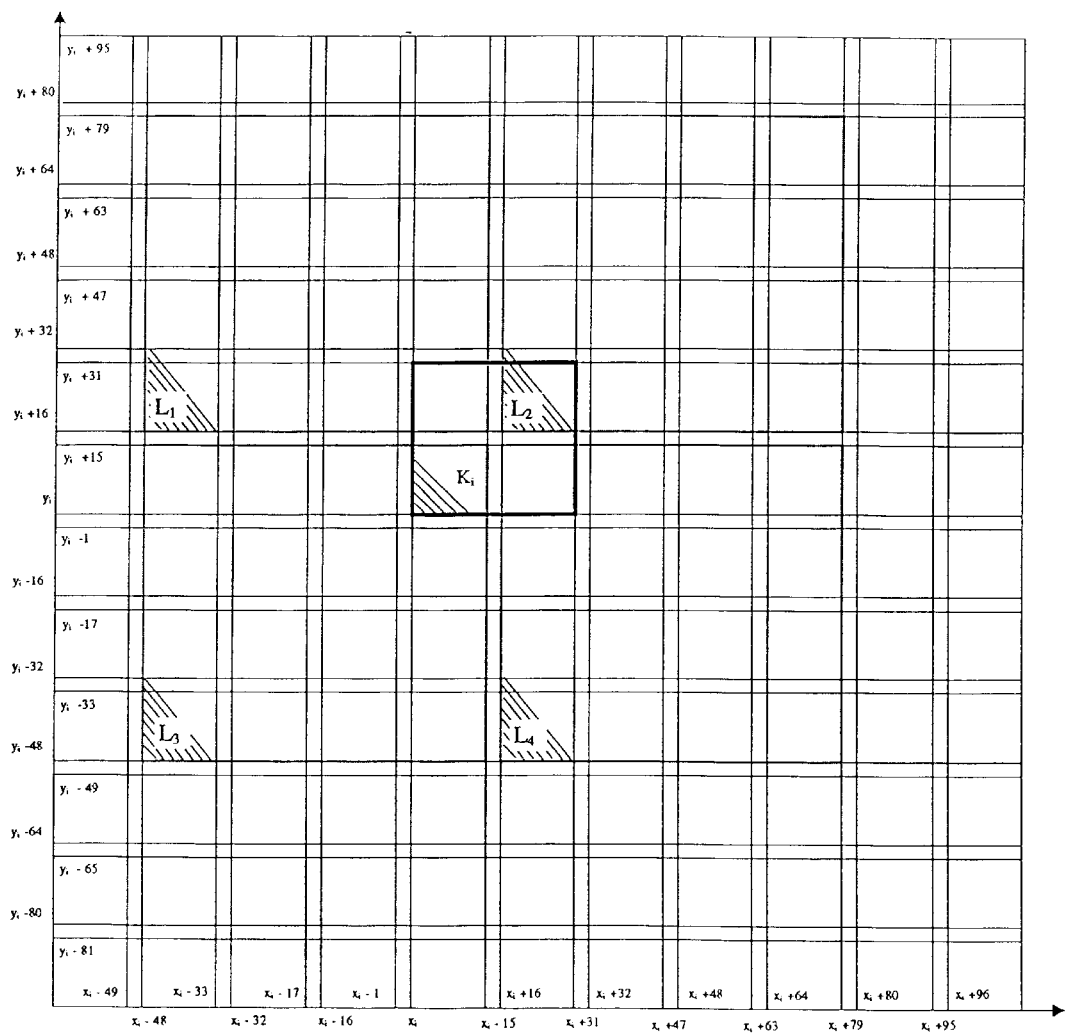
Figure 4:
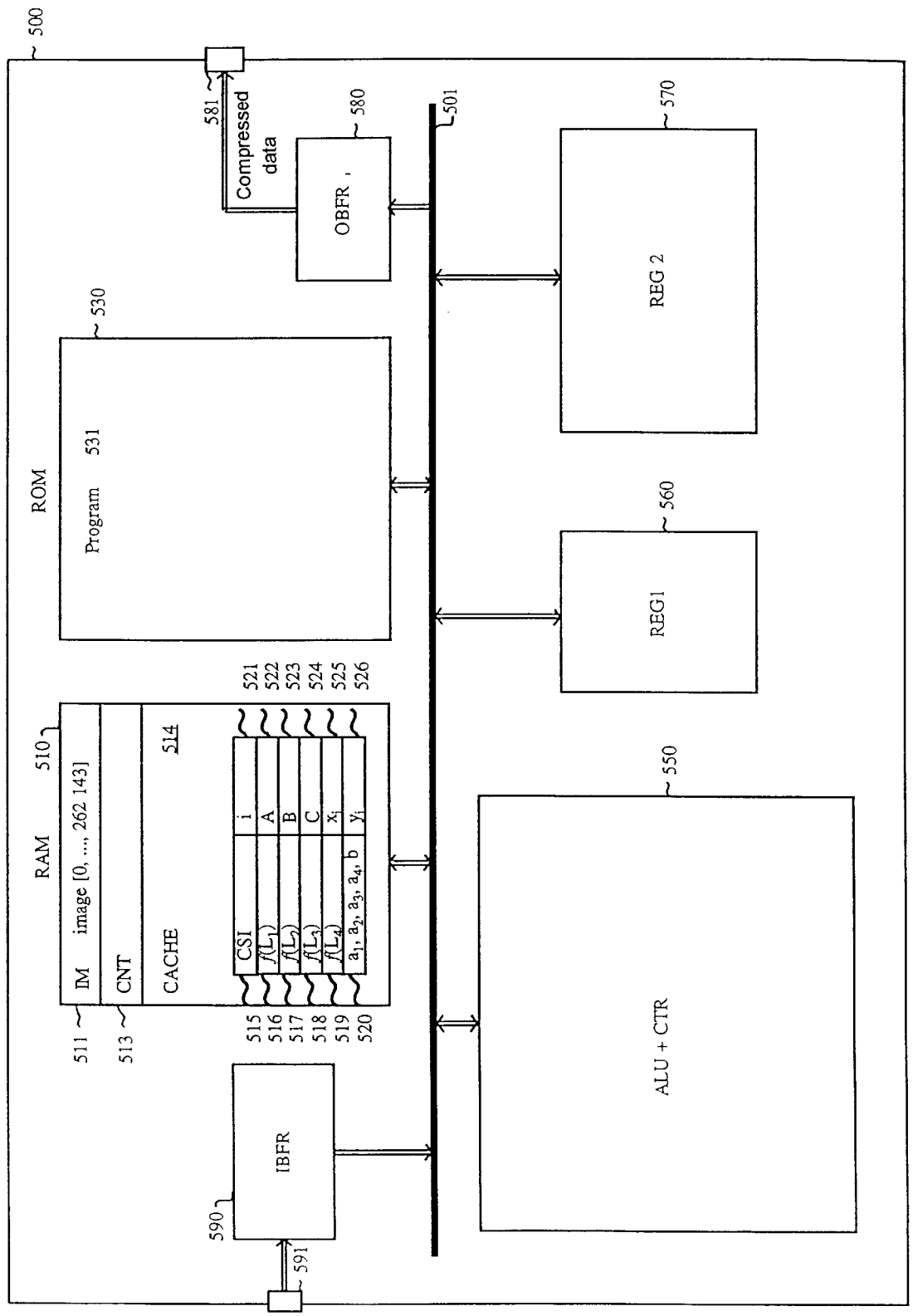
Figure 5:
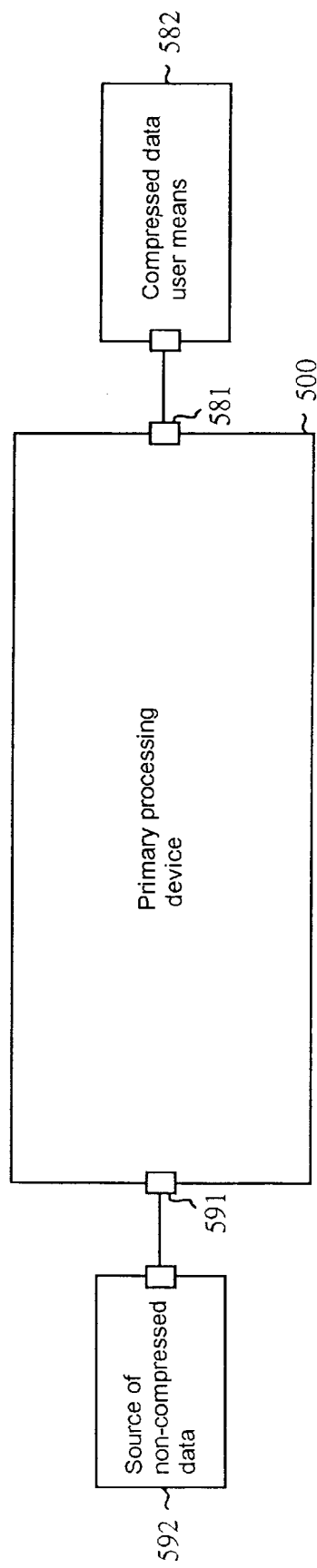
Figure 6:
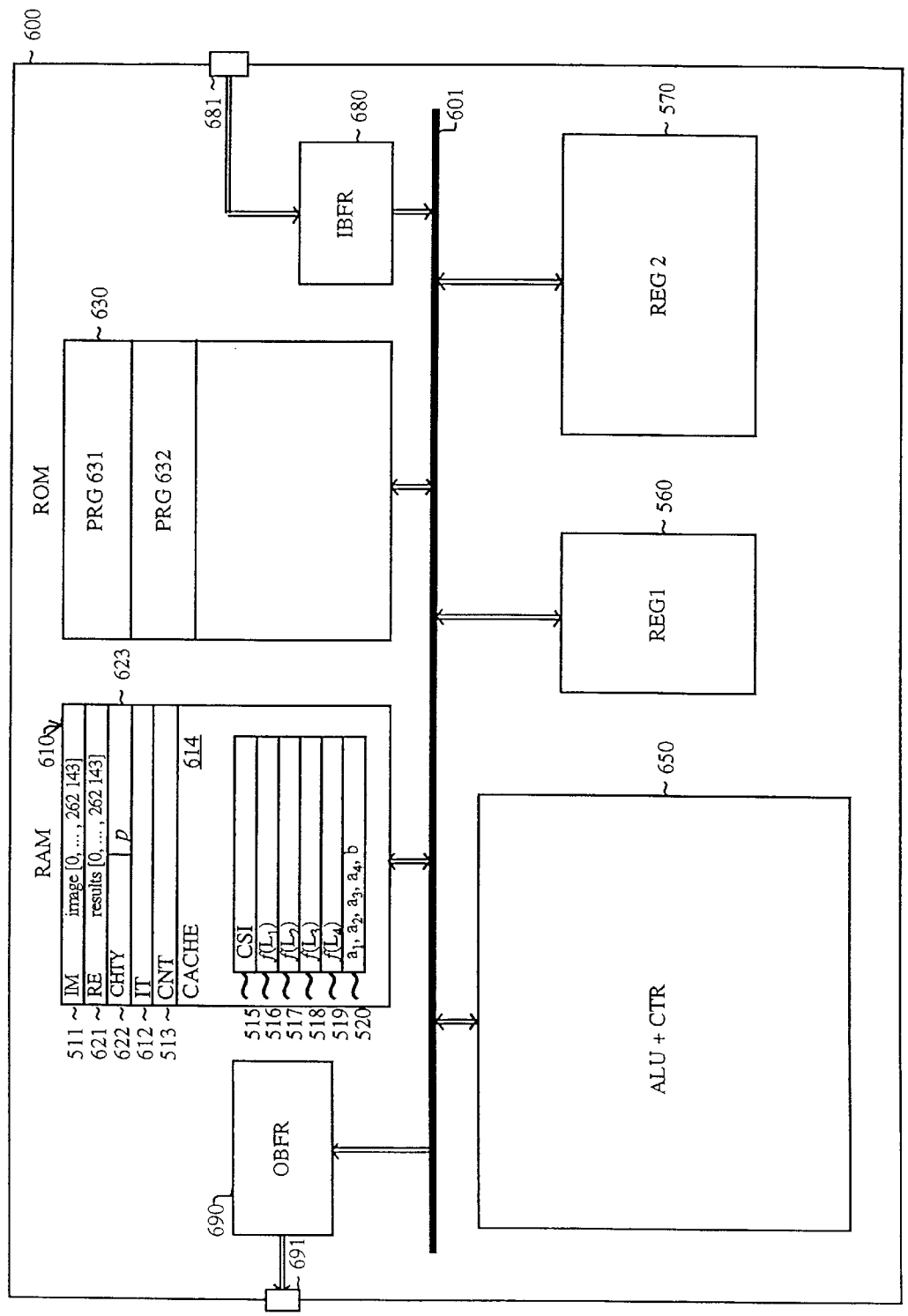
Figure 7:
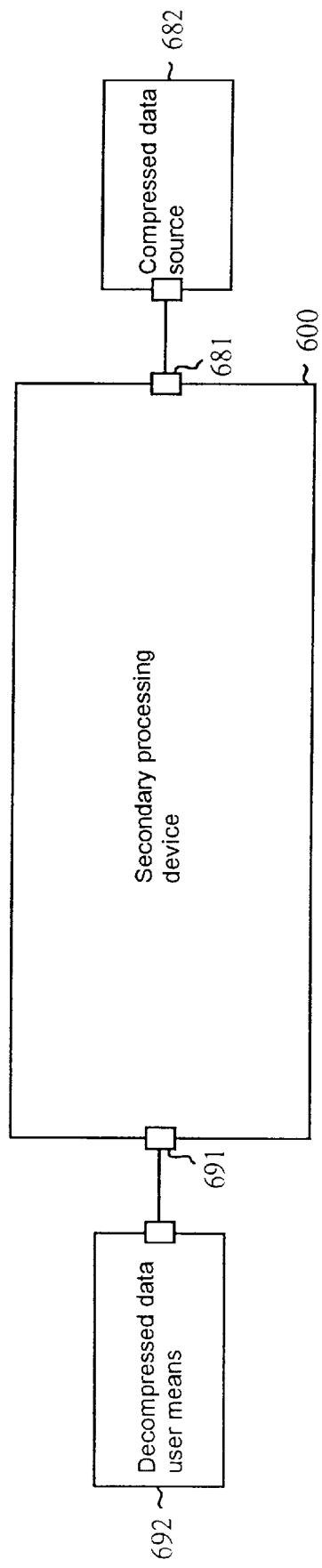
Figure 8:
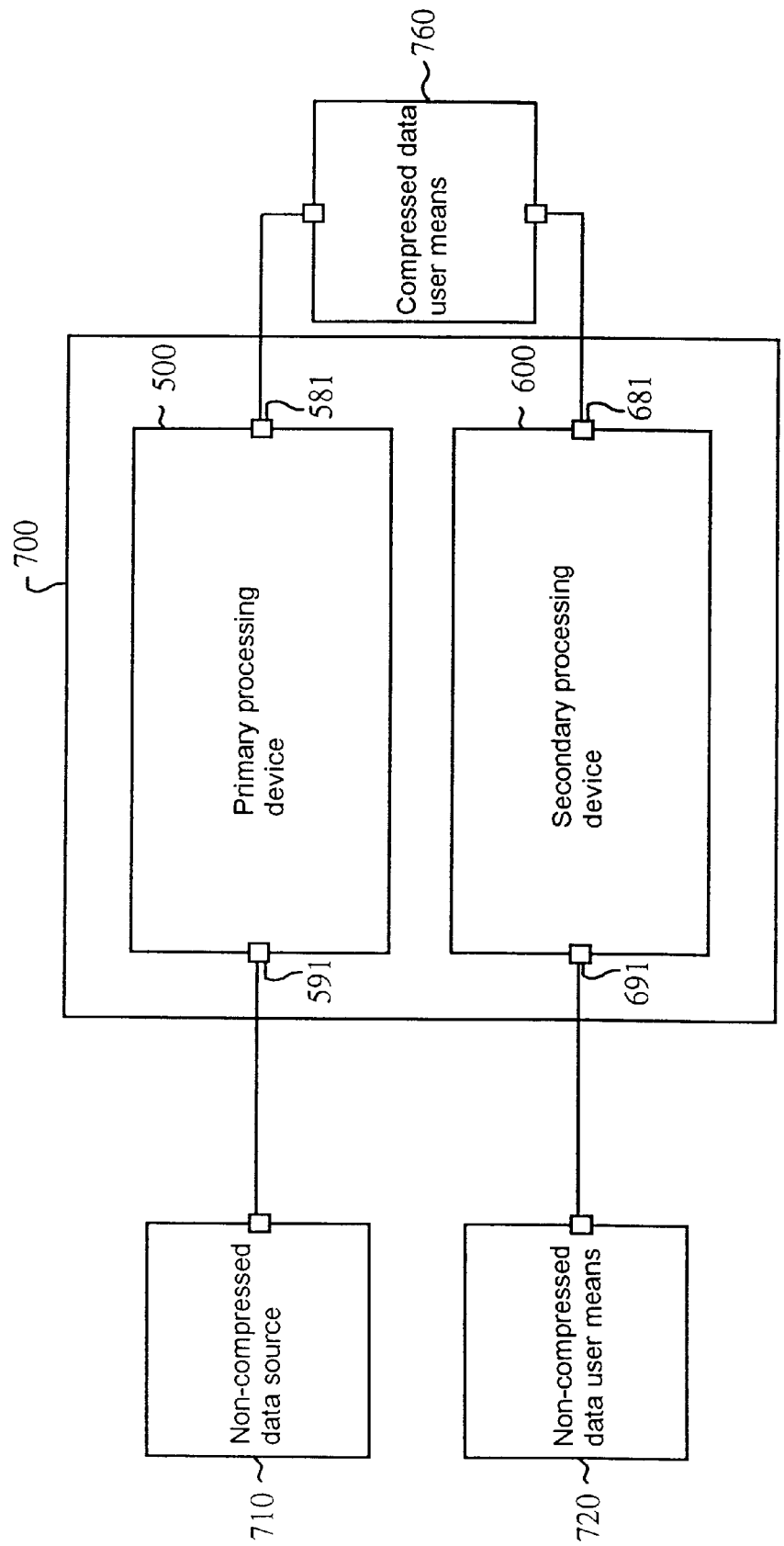
Figure 9:
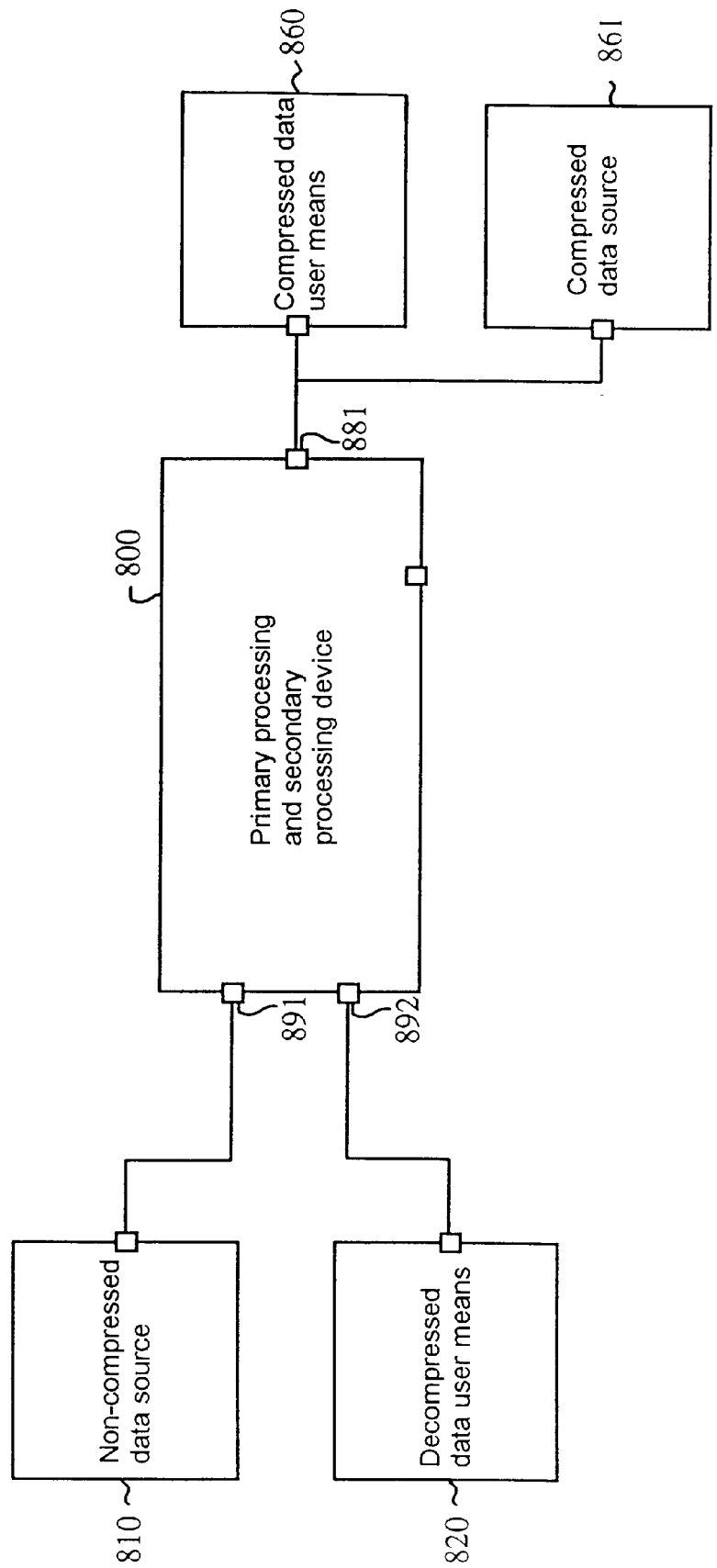
Figure 9A:
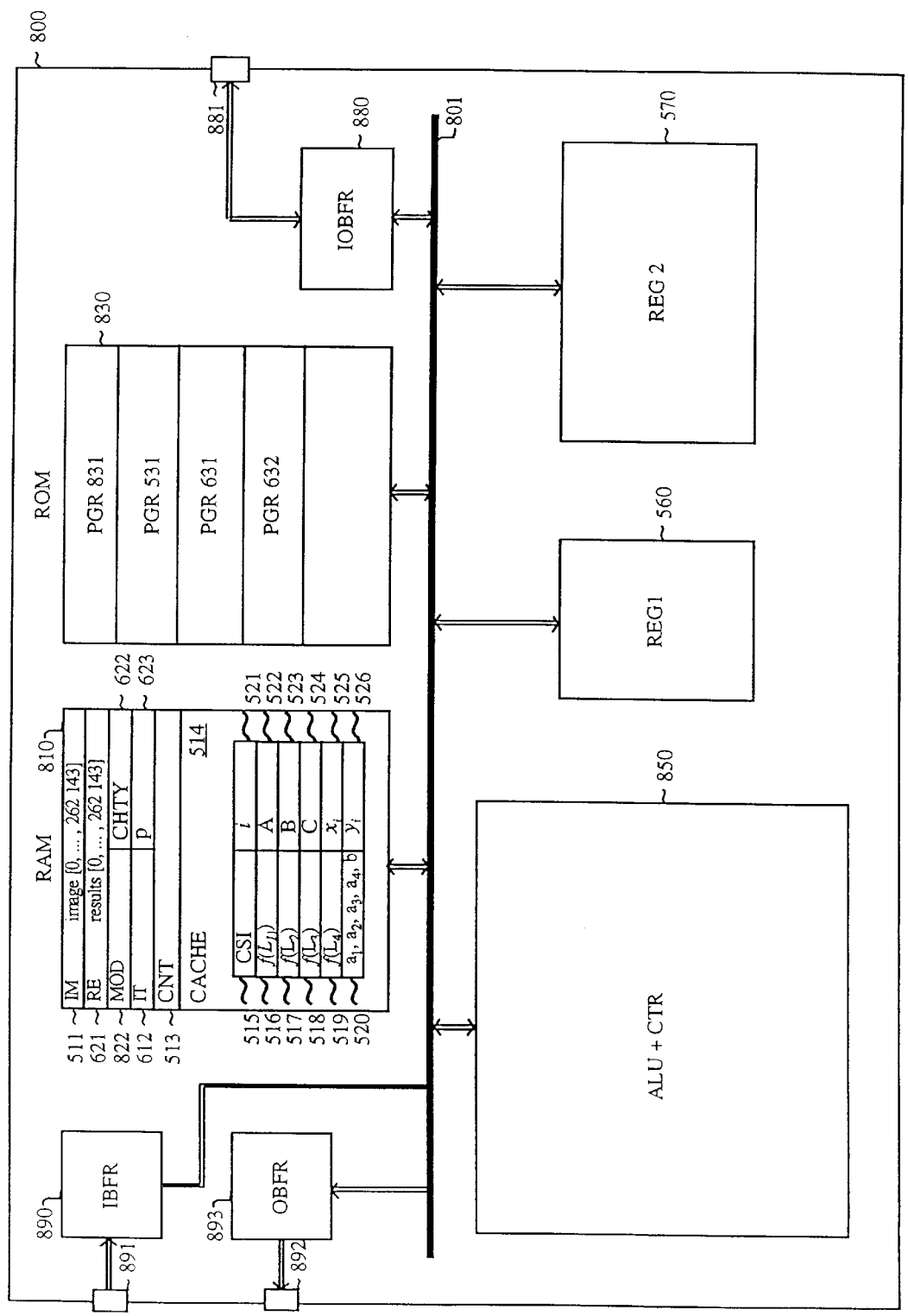
Figure 10:
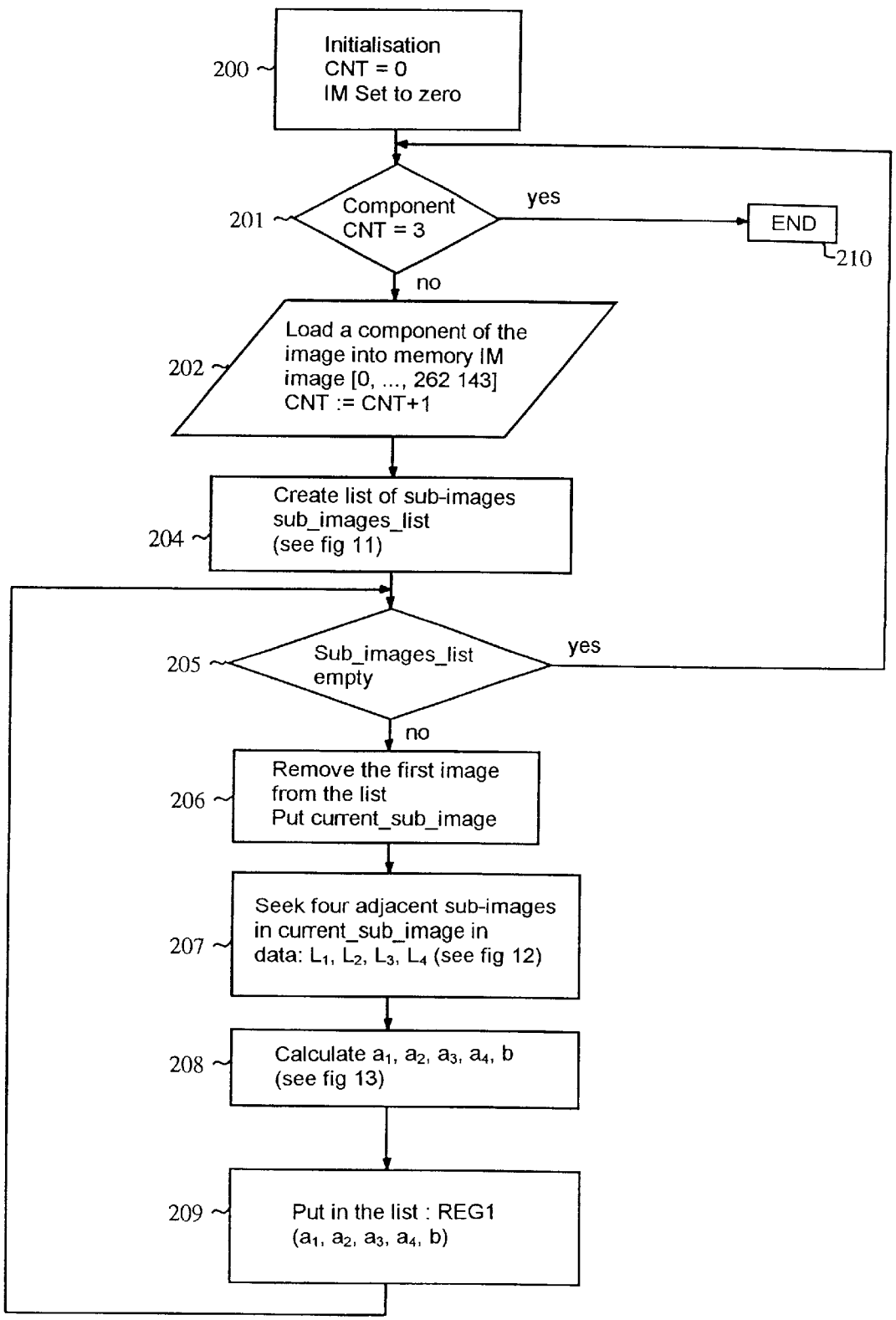
Figure 14:
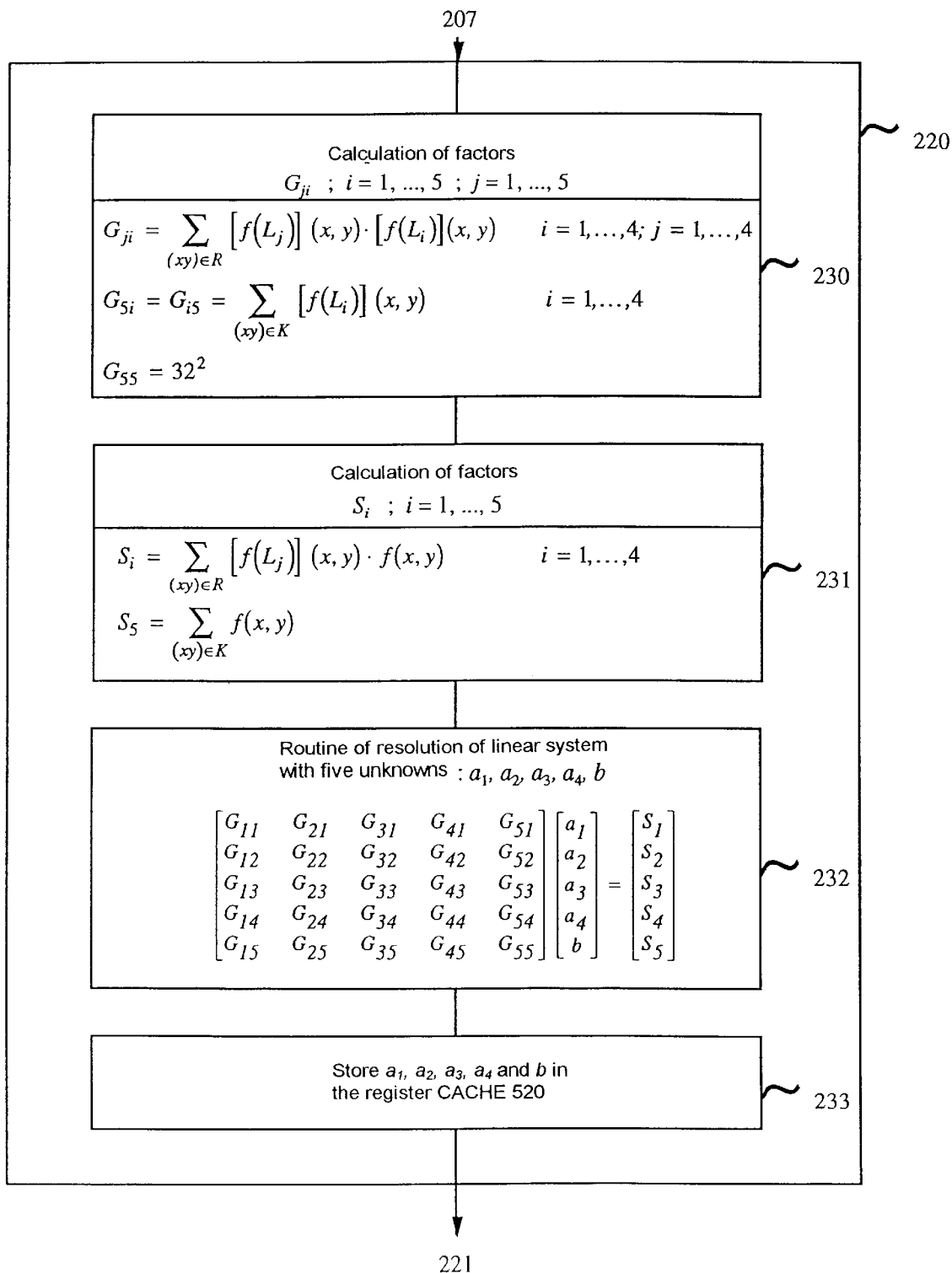
Figure 15:
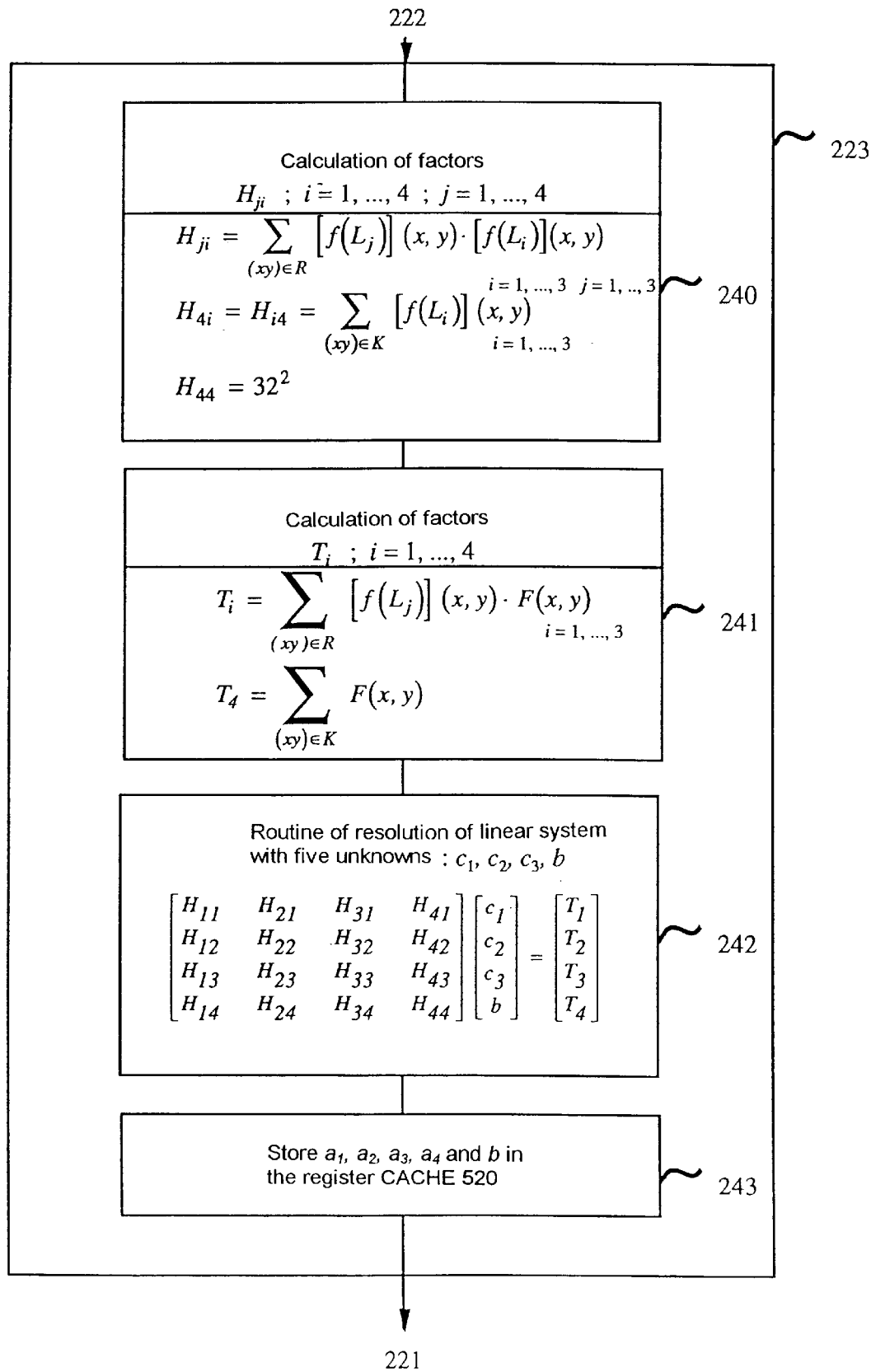
Figure 16:
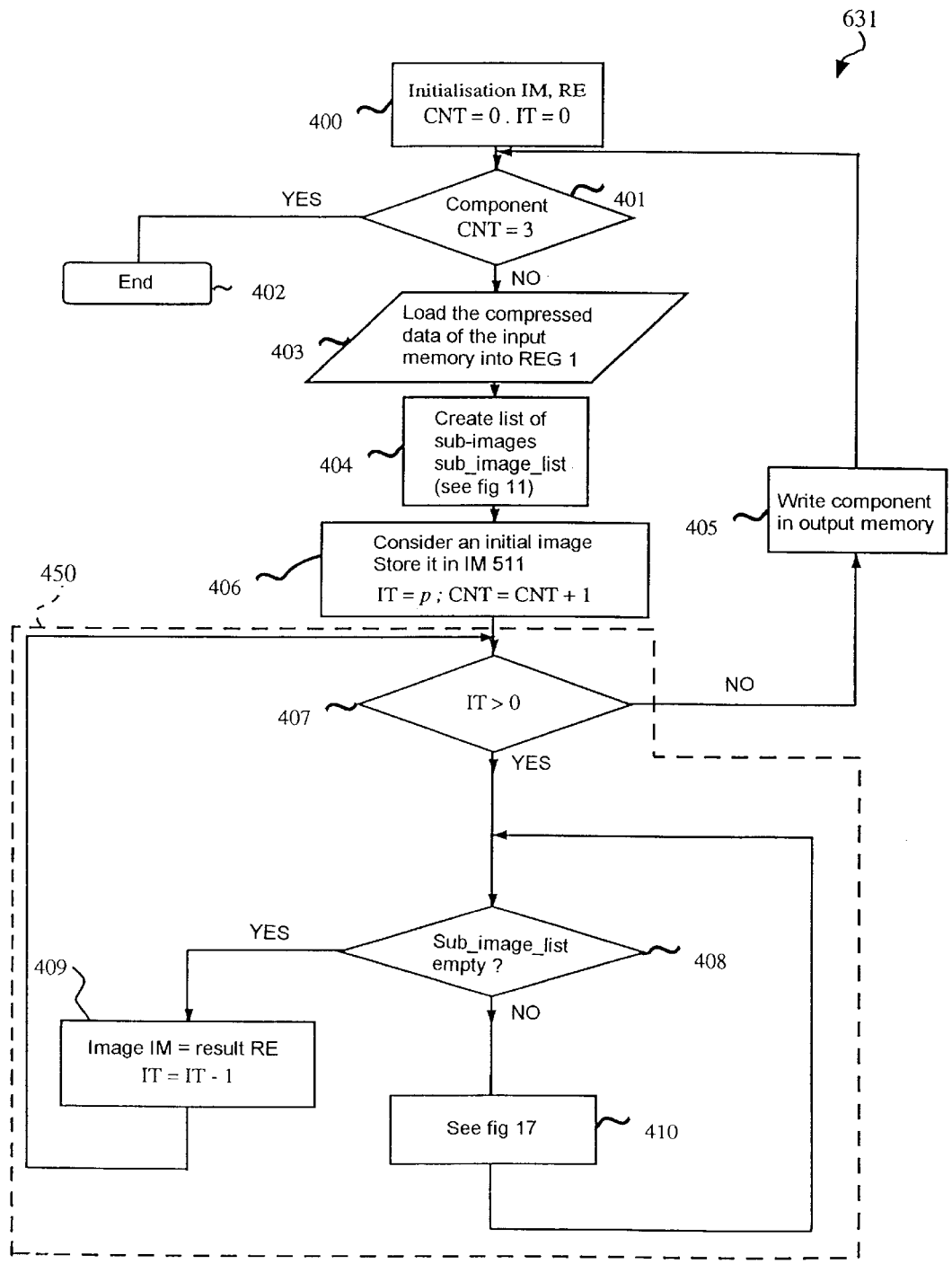
Figure 16A:
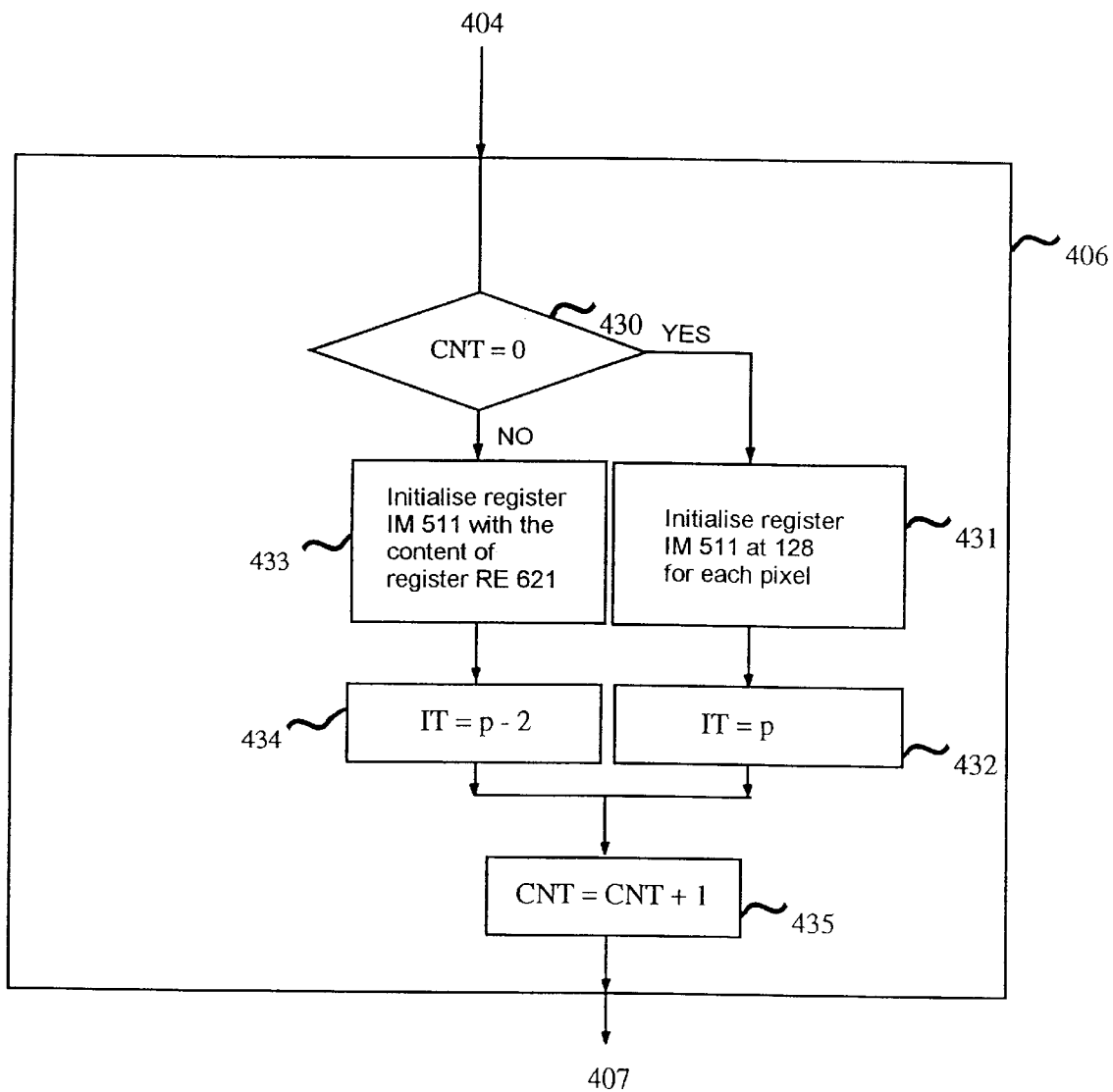
Figure 17:
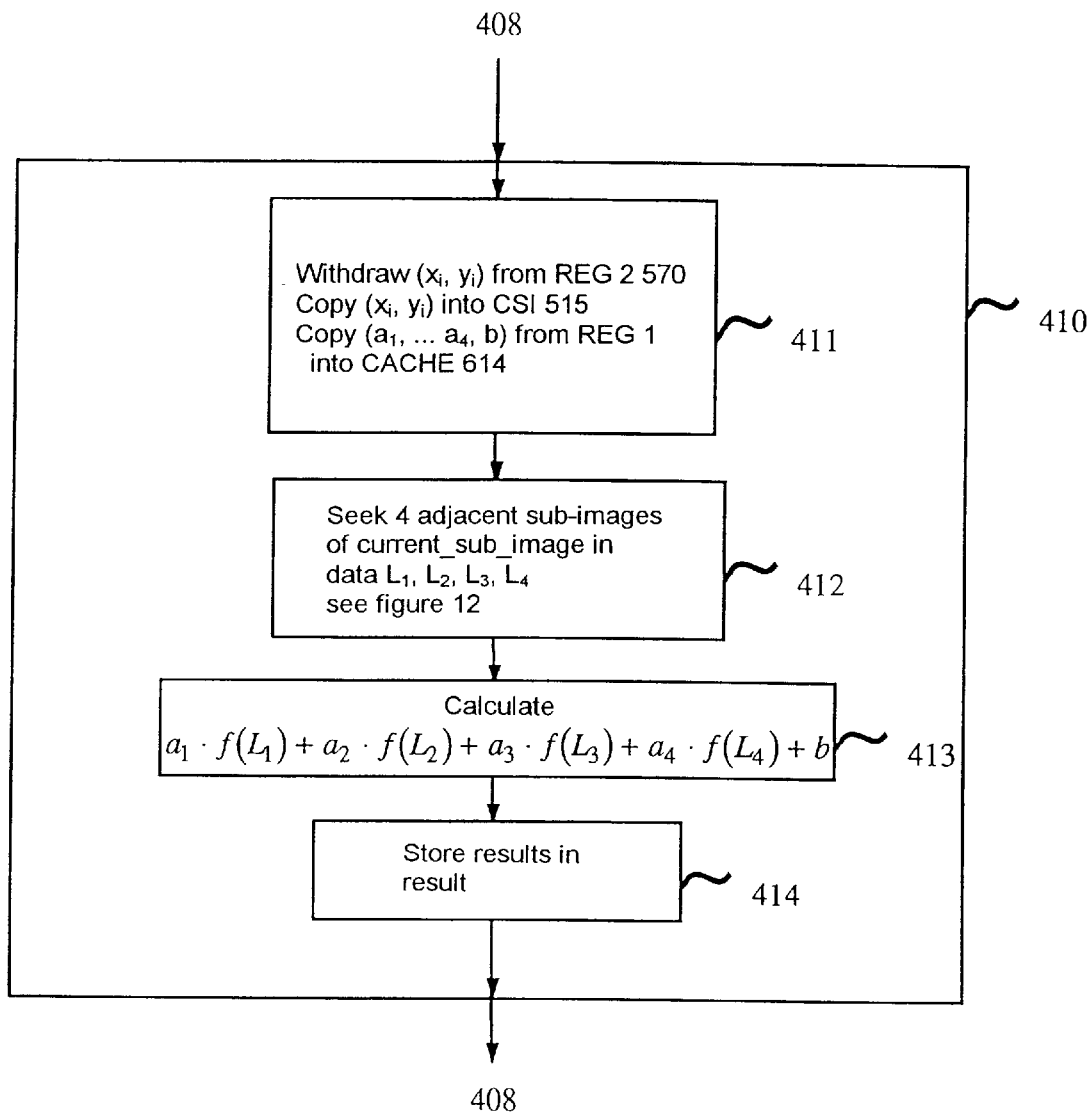
Figure 17A:
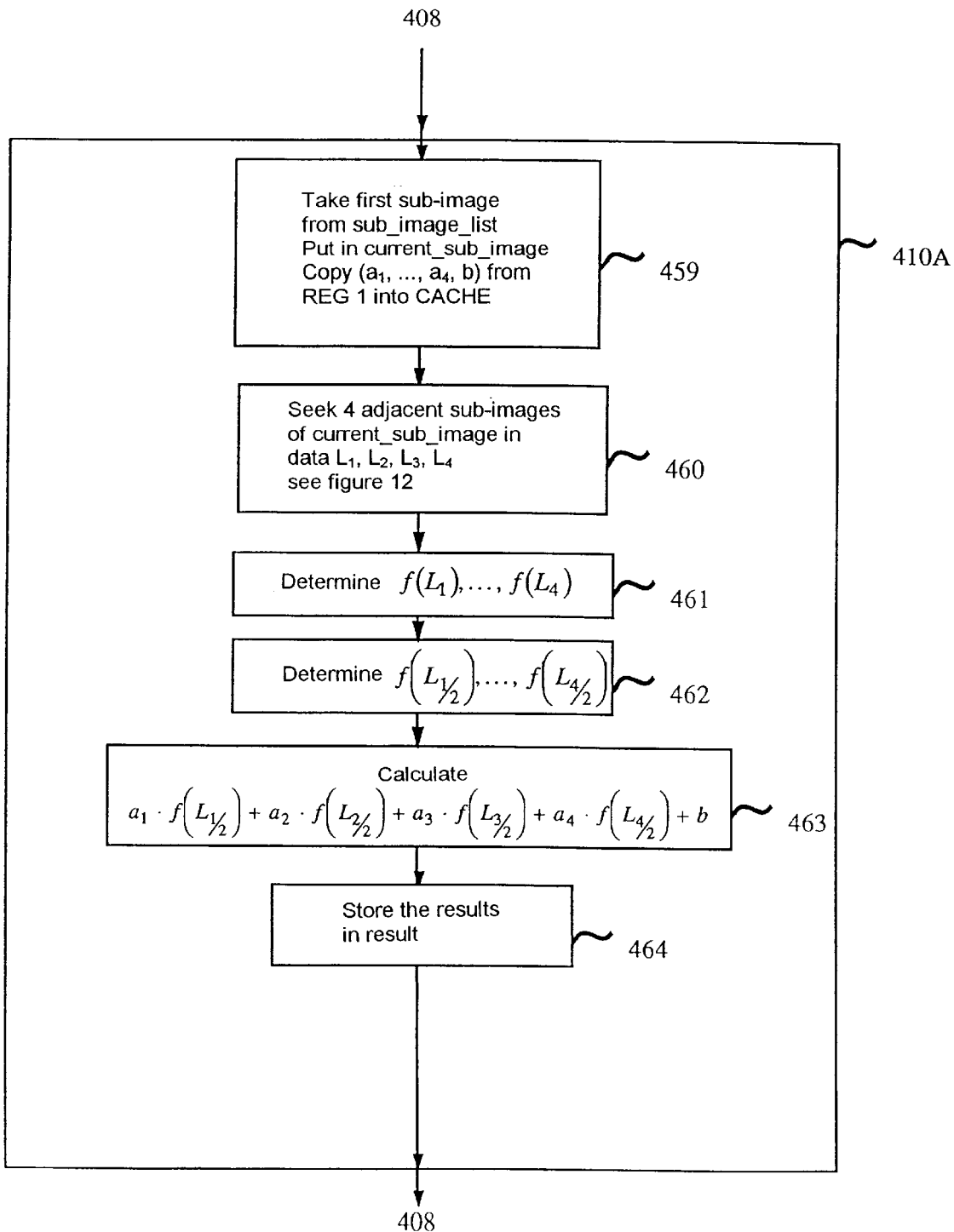
Figure 17B:
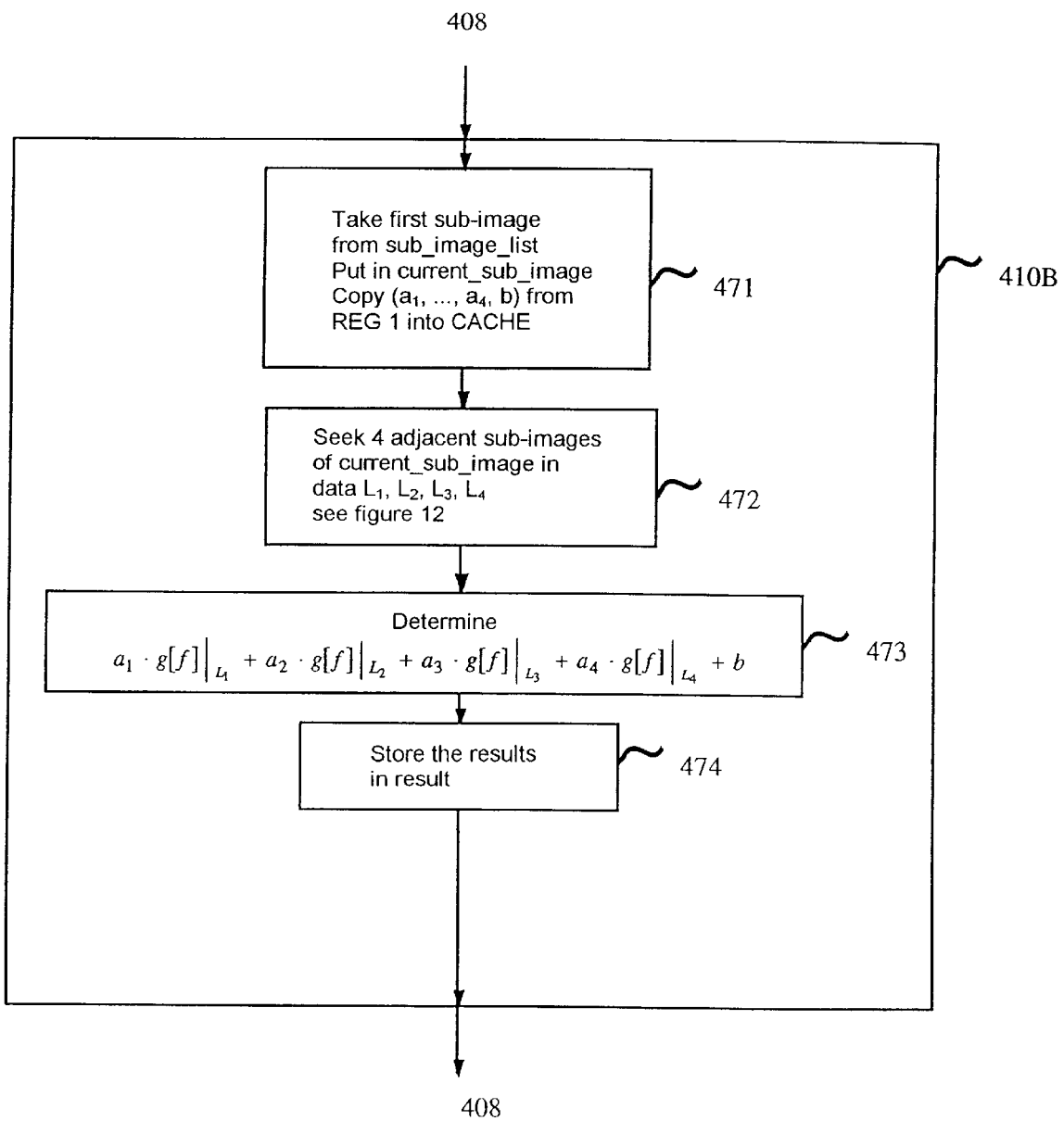
Figure 18:
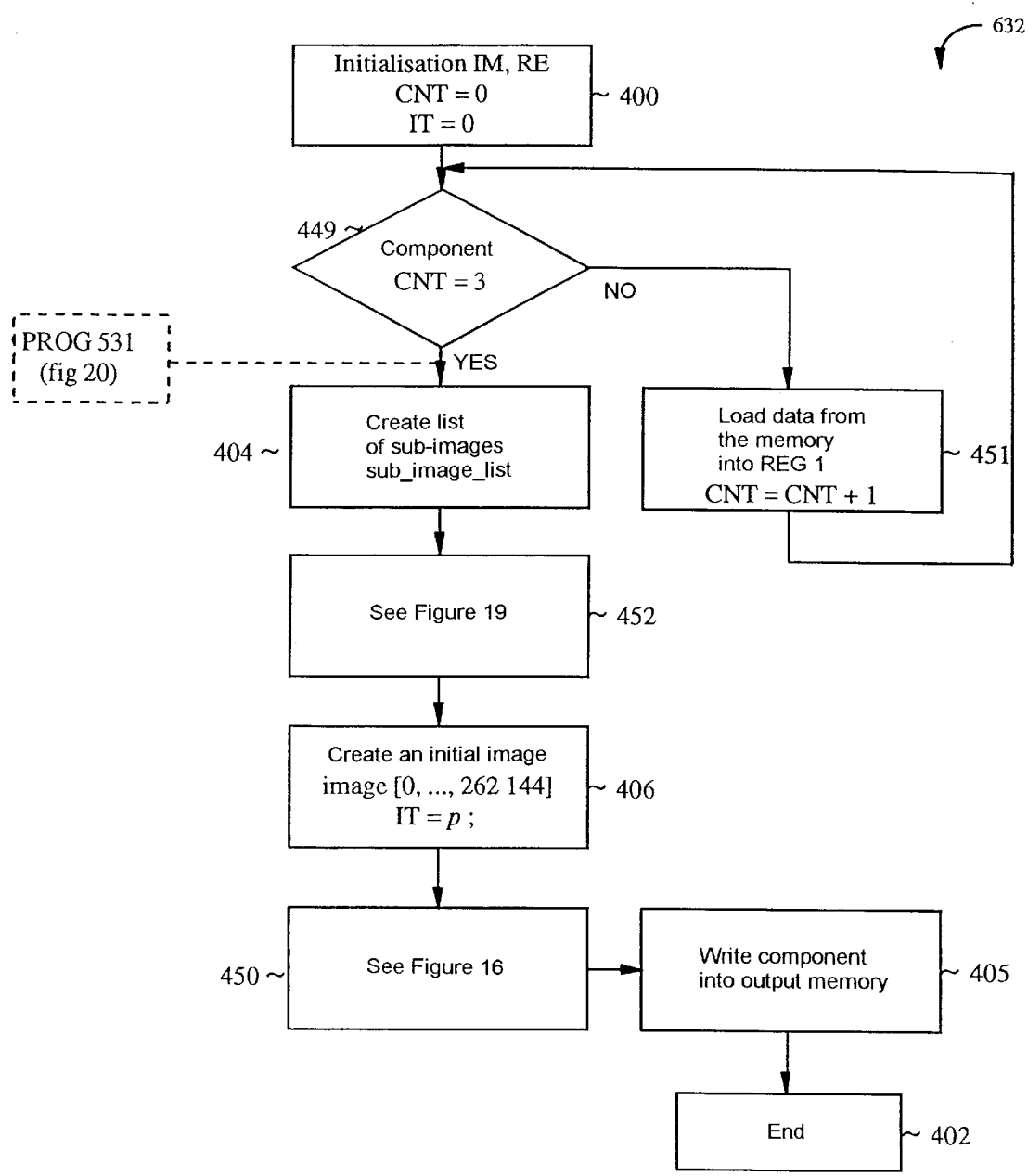
Figure 19:
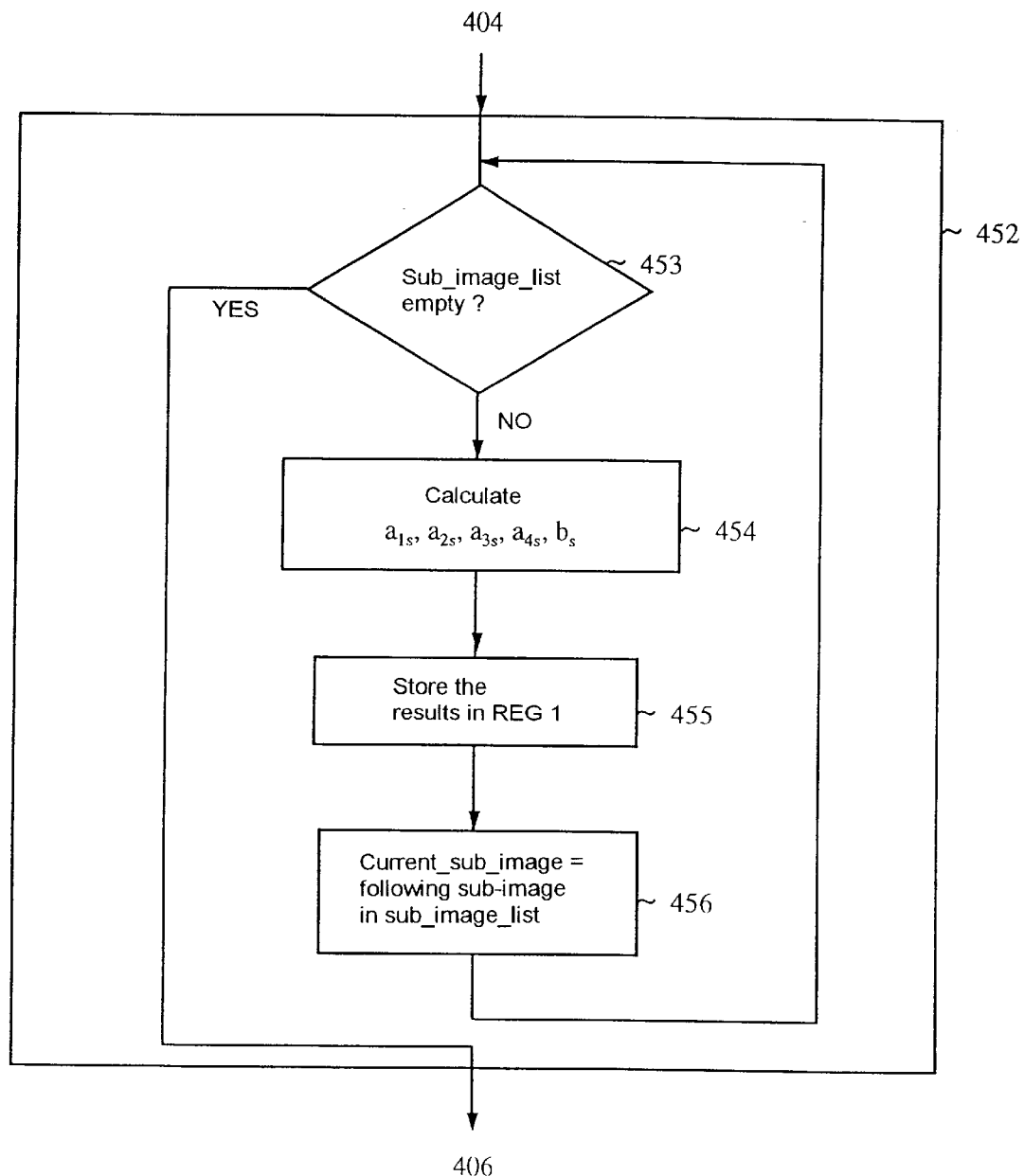
Figure 20:
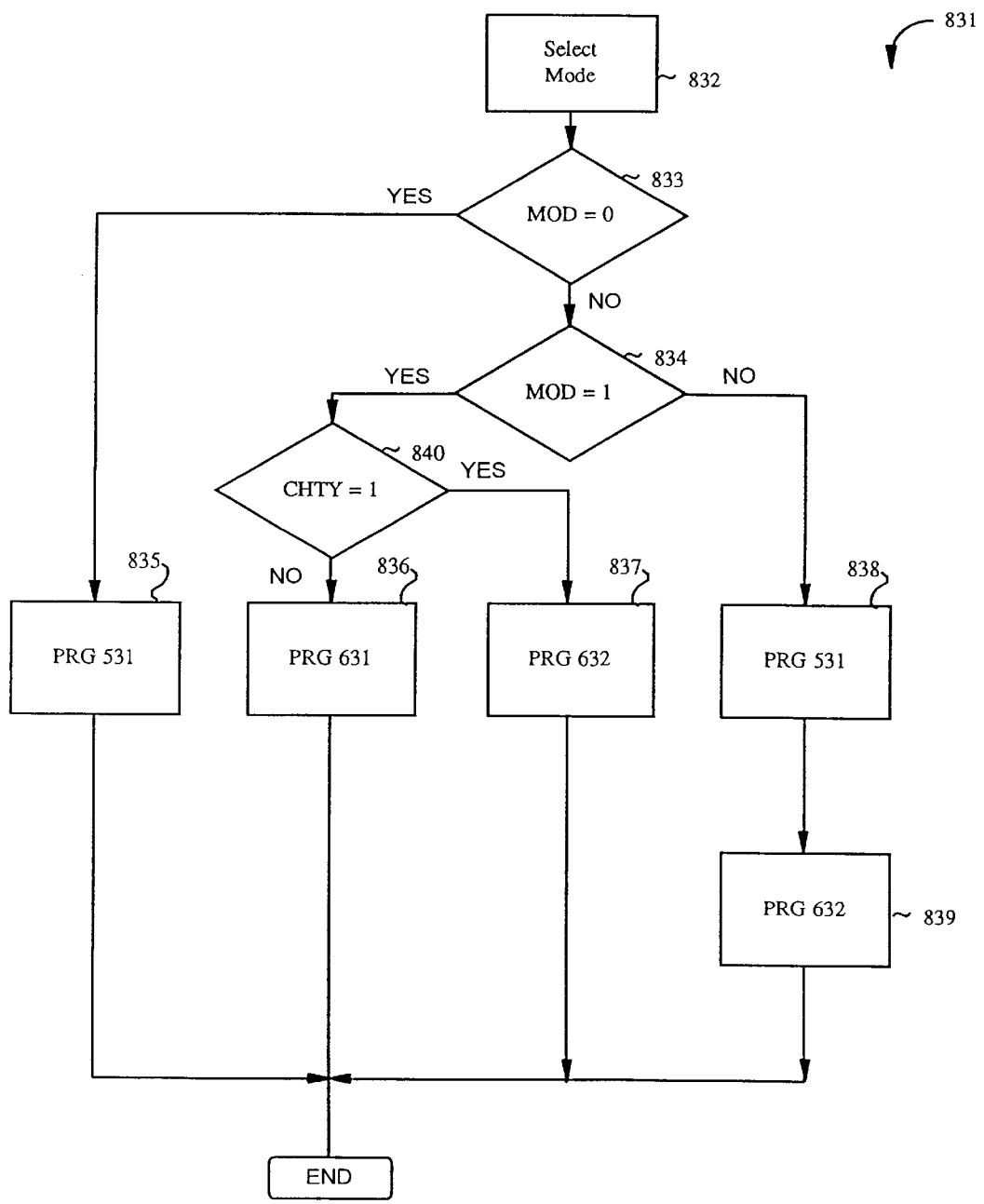

The characteristics, advantages and other objects of the invention will moreover emerge from the description of the accompanying drawings in which:

FIG. 1 illustrates diagrammatically a method of effecting a partitioning of a 512×512 pixel image into elementary sub-sets, consisting of squares of 32×32 pixels, FIG. 2 illustrates diagrammatically a method of effecting a division of a 512×512 pixel image into a tiling, consisting of squares of 32×32 pixels, offset horizontally and vertically by 16 pixels, FIG. 3 illustrates diagrammatically the arrangement of an elementary sub-set $K_i$ and of its four working sub-sets $L_1$, $L_2$, $L_3$ and $L_4$, which, in a preferred embodiment, are of a size identical to that of the elementary sub-set $K_i$ and offset in both directions with respect to the said elementary sub-set in a predetermined manner, FIG. 3A is similar to FIG. 3 and illustrates another preferred embodiment, FIG. 4 is a simplified block diagram of a preferred embodiment of the device for primary processing of a set of data, FIG. 5 is an outline diagram of a device using the device of FIG. 4, FIG. 6 is a simplified block diagram of a preferred embodiment of the device for secondary processing of a set of data, FIG. 7 is an outline diagram of a device using the device of FIG. 6, FIG. 8 is an outline diagram of a primary processing and secondary processing device, FIG. 9 is an outline diagram of another primary processing and secondary processing device, FIG. 9A is a simplified block diagram of a preferred embodiment of the processing device of FIG. 9, FIG. 10 is a simplified flow diagram of the compression of a 512×512 pixel colour image implemented in the device of FIGS. 4, 9 and 9A, FIGS. 11, 12, 12A, 12B, 13, 14 and 15 are flow diagrams illustrating certain operations in the flow diagram in FIG. 10, FIG. 16 is a simplified flow diagram of the decompression of a colour image implemented in the device of FIGS. 6, 9 and 9A, FIG. 16A is a flow diagram illustrating an operation in the flow diagram of FIG. 16, FIGS. 17, 17A and 17B are flow diagrams illustrating an operation in the flow diagram of FIG. 16, FIG. 18 is a variant of FIG. 16, FIG. 19 is a flow diagram illustrating a step in the flow diagram of FIG. 18, and FIG. 20 is a flow diagram of a configuration program used in the device of FIG. 9A.

The present description is divided into four parts:
the first part relates to the general description of the method. This part is divided into three sections:
the first section relates to the overall theory at the basis of the invention. It discloses the mathematical concepts which in general terms underlie the invention as it can be understood in its most general terms;
the second section discloses, notably with the aid of FIGS. 1 to 3, certain particular characteristics of the preferred embodiment of the method for the primary processing of the data of a 512×512 pixel image resulting in the compression thereof. This section explains more particularly the structure of the multi-dimensional mapping chosen in this preferred embodiment and the means for calculating the coefficients of this mapping,
the third section discloses the particular characteristics of the preferred embodiment of the method of secondary representation of the data of the image, and notably the retrieval of the data thereof from the compressed data obtained at the end of a primary processing. This section discloses more particularly the method of successive approximations used here to do this.
the second part relates to the description of a preferred embodiment of a processing device and is divided into six sections:
the first section relates to the description of a device for the primary processing of a set of data,
the second section relates to a device for the secondary processing of a set of parameters resulting from the primary processing of initial data. Such a device makes it possible, for example, to retrieve the image compressed by the primary processing device,
the third section relates to the description of a device incorporating both a primary processing device and a secondary processing device,
the fourth section relates to the description of a preferred flow diagram of the compression of a 512×512 pixel colour image implemented in the logic means included in the primary processing device,
the fifth section relates to the description of two embodiments of a decompression flow diagram implemented in the logic means included in the secondary processing device, and
the sixth section relates the description of the flow diagram of the configuration programme of the device incorporating a primary processing device and a secondary processing device.
the third part relates to the description of a variant using the working sub-sets having a size different from that of the corresponding elementary sub-set. In this part, only the modifications which are made to the embodiment described in the second part are described; and in the fourth part a description is given of a variant embodiment implementing a global contractive mapping composed of non-linear mappings. Likewise in this fourth part only the elements modified with respect to those of the embodiment described in the second part are disclosed.

1. General Description of the Method

A description will now be given, with the aid of FIGS. 1 to 3, of the method as implemented in a preferred embodiment of the present invention. This description will be given with the help of the aforementioned figures and a certain number of mathematical concepts belonging in general terms to the theory of analysis and more particularly the theories of topology and functional analysis.

In this preferred embodiment, it is proposed to compress the data relating to an image, in order to result in a "primary representation" thereof, and then to retrieve the initial data, that is to say to effect a "secondary representation" of the compressed data in order to obtain a set of data of the same type as the initial data with a predetermined maximum difference between the data thus retrieved and the initial data.

To give a clear idea, a 512×512 pixel colour image with 3×256 colour levels is considered here. This digital image requires 512×512×24 bits to be stored, that is to say 6.29 Mbits. In order to measure the difference between the initial image and the retrieved image, the square root of the mean square deviation is taken into consideration, averaged over all the pixels and all the components (conventionally referred to as RMSQ). The efficacy of a compression algorithm is expressed by the link between the compression rate obtained for a given deviation (RMSQ). The preferred embodiment described here makes it possible to obtain the following efficacy:

TABLE 1

| Number of iterations to decompression | RMSQ | bits/pixel |
|---|---|---|
| 5–7 | 5–15 | 0.75 |
| 5–8 | 5–10 | 1.50 |
| 6–8 | 4–8 | 2.25 |
| 7–9 | 3–7 | 3.00 |
| 7–10 | 2–5 | 4.50 |

General Theory at the Basis of the Invention

The representation of a set of data, themselves representing physical quantities, such as data relating to the image described above, especially when it is desired to compress these data at the time of their representation, can be analysed as an approximation of all the data.

The invention proceeds from the demonstration by the inventors of the fact that the fixed-point theory can be used to perform such an approximation.

It is considered that the approximation of a set of initial data is an operation consisting of seeking, in a family of candidates for representation, the candidate or candidates which minimise a predetermined criterion. Usually the criterion is expressed by a distance between two elements of a metric space, which can be expressed by the following equation:

$$d: (g,h) \epsilon E \times E \rightarrow d(g,h) \epsilon R^+ \qquad (1)$$

where d is the distance function,

E is a metric space, $R^+$ is the set of positive real numbers or zero, g, h are elements of the metric space E, that is to say the space which contains all the mappings of a given definition field $\Omega \subset R^q$ in the field of application $R^d$.

The data to be processed are applications of $\Omega \subset R^q$ in $R^d$:

$$g:(x,y) \epsilon \Omega \subset R^q \rightarrow g(x,y) \epsilon R^d$$

where $R^q$ and $R^d$ are spaces which are a product of R of a given number (n or d) of dimensions. The set of data to be processed is a given metric space E.

It will be noted that for example in the context of a 512×512 colour image with 2×256 colour levels, the data of the initial image consist of a table of correspondence which at each pixel position (xy) in the field of definition [0.511]× [0.511] associates three positive values of level between 0 and 255. It is seen that these data of the initial image in reality constitute a mapping f∈E of a field of the space $R^2$ in a field of the space $R^3$:

$$g: (x,y) \epsilon [0,511] \times [0,511] \subset R^2 \rightarrow [0,255]^3 \subset R^3$$

The problem of the approximation of a set of data to be processed f∈E consist therefore of seeking, in a family of candidates for the representation $G \subset E$, the candidate or candidates g* in G which minimise the distance (1). This is expressed by the following equation:

$$?g^* \epsilon G: d(f,g^*) = \inf\{d(f,g)|g \epsilon G\}$$

The said candidates belong to the set:

$$P_G(f) = \{g^* \epsilon G \ d(f,g^*) = \inf\{d(f,g)|g \epsilon G\} \qquad (2)$$

where:

$P_G$ is the metric projection operator, $\inf\{\ldots\}$ is the largest of the minors of the set in question $\{\ldots\}$.

Hereinafter, it is assumed that the metric space is complete, which guarantees the existence of a single fixed point for each contraction of the metric space in itself.

The inventors showed that the candidates for representation can be defined as being fixed points relative to contractions, a family of contractions being determined conjointly. Under these conditions, seeking the best approximation amounts to determining the fixed points relating to the contraction minimising the said predetermined error criterion in this family of contractions.

These conditions can be expressed thus:

$$?a^* \epsilon \sigma(X): d(f,a^*) \leq d(f,a), \forall a \epsilon \sigma(X) \qquad (3)$$

where σ(X) is the extension to a sub-set of contractions X,(X⊂CON(E)) of the link existing between a contraction and its fixed point. This mathematical link can be expressed as follows:

$$\sigma: T \epsilon CON(E) \rightarrow t \epsilon E \qquad (4)$$

where t is the fixed point of the contraction T(T(t)=t), CON(E) the set of contractions of E.

The problem of approximation can, under these conditions, be reformulated as follows: it is a case of seeking the contraction whose fixed point is the best approximation of the initial data.

It will be observed that, in doing this, the inventors moved the problem to be resolved since it was no longer a case of seeking a candidate constituting itself a best approximation but a contraction whose fixed point constitutes the best approximation.

This can be expressed by the inequality:

$$?T^* \epsilon X : d(f, \sigma(T^*)) \leq d(f, \sigma(T)) \forall T \epsilon X \tag{5}$$

where X is a sub-set of contractions of $E(X \subset CON(E))$.

The inventors thus showed that, in accordance with the general method discovered by them, the essential step for arriving at a representation of data to be processed, notably in the context of a compression of the data, consists of:

constituting a family of contractions able to transform the data, and selecting the parameters of one of the said contractions in order to satisfy one or more predetermined conditions, in this case minimising the distance between the initial data and the fixed point constituting the best approximation of the said initial data.

This is, according to the invention, a step of "constructing" the global contractive mapping.

Then, according to the invention, the parameters thus determined must allow, for retrieving the initial set of data, the implementation of a method of successive approximations converging towards the fixed point of the said global contractive transform representing the said set of initial data, which makes it possible, for the reasons set out above, to retrieve, with the best approximation, the said set of data to be processed.

It will be observed that, for implementing the general method according to the invention, and notably in the step of constructing the global contractive mapping, the expert has, in order to constitute the family of contractions able to transform the data, a large range of choice of mathematical mappings in the group of mappings consisting of multi-dimensional mappings and non-linear mappings. In the embodiment described below, the global contraction will be constructed in pieces, and for each piece a specific multi-dimensional linear mapping will be used. It will be possible to use other mappings, for example non-linear mappings. A general method, a preferred implementation of which will be described in detail below, thus affords a very large number of possibilities of processing the data, with a view to representing them.

A description will now be given of the means used in the preferred embodiment for constructing the global contractive mapping.

The inventors showed that, in order to seek a contraction whose fixed point constitutes the best approximation of the initial data, it was necessary first of all to seek a candidate constituting in itself a good approximation, which constitutes a practical approach for resolving such a problem.

The inventors showed that the said practical approach can consist of finding the contraction which minimises the distance between the initial data and transforms, taking account of an estimated contraction factor.

This reformulation of the problem to be resolved can be expressed by the following main optimisation problem:

$$? \hat{T} \in X : d\left(f, \frac{\hat{T}(f)}{1 - con(\hat{T})}\right) = \min\left\{d\left(f, \frac{T(f)}{1 - con(T)}\right) \middle| T \in X\right\} \tag{6}$$

where con(T) is the contraction factor of the contractive mapping T.

As, in reality, it is sometimes difficult to find the said contraction factor of the global mapping, the inventors found that, in these cases, it may suffice to resolve a simplified optimisation problem in terms of which it is necessary to find a global contraction which minimises the distance between the initial data and their transform. It will be observed here that the factor 1/1-con(T) is no longer taken into account.

This simplified optimisation problem is expressed as follows:

$$?\hat{T} \epsilon X : d(f, \hat{T}(f)) = \min\{d(f, T(f)) | T \epsilon X \tag{7}$$

Preferred Method of Primary Processing of the Data of the Image

According to an important characteristic of one of the aspects of the invention as implemented here, the global contraction is constructed in pieces. To do this, a step of "partitioning" of all the data relating to the image is performed, in the course of which the said set is partitioned into m "elementary sub-sets".

In the preferred embodiment which concerns the image processing, in general terms, the initial image is partitioned into m elementary sub-images.

It should be stated here that in general terms a "partitioning" of the metric space Q amounts to defining the set $\tau = \{K_i | K_i \subset \Omega, i=, \ldots, m\}$ where $K_1, \ldots, K_m$ are sub-sets defined in the said metric space $\Omega$, required to comply with the following four conditions:

1) the sub-sets $K_i$ must be closed, which is expressed by $K_i$adh $K_i$, i=1, ..., m.

2) none of the subsets $K_i$ can have an empty interior, which is expressed by: int $K_l = \emptyset$, l=1, ..., m.

3) their combining must produce the closure of the metric space $\Omega$ in question, which is expressed by: : adh$\Omega$= $U_{i=1}^{m} K_l$ 4) the interiors of each sub-set $K_i$ must be separate in pairs, which is expressed by:

int $K_i \cap$ int $K_j = \emptyset$ i, j=1, ..., m, i≠j.

It should also be noted here that the partitioning of an initial data of a given type (g$\epsilon$E) amounts, in general terms, to defining a restriction g$|K_i$ for each sub-set $K_i$ of the partitioning $\tau$.

This characteristic advantageously facilitates the work of constructing the global contraction, by reducing this work to that of finding the elementary mathematical transformations which each have the object of permitting the retrieval of the elementary sub-set $K_j$. This is because, by definition, the sub-sets of data include even fewer data than the initial set, and consequently it is substantially easier to find mathematical transformations enabling these data to be retrieved, it being stated once again that all the mathematical transformations must, at the level of the entire image, constitute a global contractive mapping.

Consequently the global contractive mapping T is thus constructed in pieces, each piece being, in accordance with this aspect of the invention, a Lipschitz mapping.

It will moreover be observed here that these elementary Lipschitz mappings are not necessarily contractive, and that at this level also, by virtue of the invention, the expert has at his disposal a large range of mathematical mappings enabling him to process the data relating to the sub-sets.

It should however be noted that, in certain cases, it will not be necessary to carry out this partitioning, for example when the image gives rise to a simple geometric structure.

According to the aspect of the invention described here, for each of the m elementary sub-sets ($L_1, \ldots, Km$), n working sub-sets are taken into consideration (n=4 in this embodiment). For each of the m elementary sub-sets effected in the course of the partitioning, the elementary Lipschitz mapping in question is constructed from these n working sub-sets.

So as to be able to take into consideration the n working sub-sets related to each of the m elementary sub-sets, in accordance with another characteristic of the invention, a "division" of the set of initial data will be performed.

This division $L=\{L_j|L_j \subset \Omega j=1, \ldots, 1\}$ of the set of data, which is defined in the metric space $\Omega$, must comply with the following three conditions:

1) the sub-sets $L_j$ must be closed, which is expressed by:

$$L_j = adh\, L_j, j=1, \ldots, l$$

2) None of the sub-sets $L_j$ can have an empty interior, which is expressed by: int $L_j \neq \emptyset$, j=1, ..., l.
3) Their combining is included in the metric space $\Omega$, which is expressed by: $U_{j=1}^{l} L_j \subset \Omega$ It will be observed at this stage that the division performed encompasses on the one hand the partitionings as defined above, but also includes on the one hand what will be referred to as a "tile covering" (a concept known in English as "tiling") for which the sub-sets $L_i$ are able to overlap, which is expressed by the equation: int $L_i \cap$ int $L_j \neq \emptyset$, i, j=1, ..., l, i≠j.

In this embodiment the 512×512 pixel image is partitioned into 256 square elementary sub-sets of 32×32 pixels (see FIG. 1).

In accordance with a custom in the image processing field, the data are organised as follows:
- the reference point of coordinates (0,0) consists of the point at the bottom left of the image;
- the columns (x axis) are numbered from left to right;
- the rows (y axis) are numbered from bottom to top.

FIG. 1 illustrates diagrammatically on the y axis the ranking of certain lines of the image and on the x axis the ranking of certain columns. For reasons of clarity, the scale used on the x axis and y axis is not uniform. On the part at bottom left in FIG. 1 the first 9 squares of 32×32 pixels are illustrated, so as to show the rankings and columns constituting the boundary of said squares. The squares of 32×32 pixels constitute an example of partitioning of the field $\Omega=[0.511]\times[0.511]$ where the image in question is defined.

In this embodiment, the division of the 512×512 pixel image into working sub-sets is illustrated in FIG. 2. It is similar to the partitioning of FIG. 1, except that the working sub-sets of 32×32 pixels are offset by 16 pixels in both directions compared with the elementary sub-sets. In this figure, which illustrates the bottom left corner of the 512× 512 pixel image, the elementary sub-sets resulting from the partitioning are illustrated in thick lines whilst the working sub-sets resulting from the division are illustrated in doffed lines and are hatched.

FIG. 3 illustrates how, in this embodiment, each working sub-set $L_j$ is linked to a given elementary sub-set $K_i$. The elementary sub-set $K_i$ having the coordinates $(x_i, y_i)$ is illustrated in thick lines, whilst the corresponding working sub-sets are illustrated in dotted lines, the other sub-sets being outlined in fine lines. It can be seen that, in this embodiment, to each of the sub-sets $K_i$ are linked four working sub-sets $L_j$ (numbered $L_1, \ldots, L_4$) offset by 16 pixels in both directions. In reality it is a case of four sub-sets resulting from the division which cover the elementary sub-set in question (resulting from the partitioning). The following expressions show the coordinates of a sub-set $K_i$ and of the working sub-sets $L_1, \ldots, L_4$.

$K_i$: $[x_i, x_i+31] \times [y_i, y_i+31]$ $L_1$: $[x_i-16, x_i+15] \times [y_i+16, y_i+47]$ $L_2$: $[x_i+16, x_i+47] \times [y_i+16, y_i+47]$ $L_3$: $[x_i-16, x_i+15] \times [y_i-16, y_i+15]$ $L_4$: $[x_i+16, x_i+47] \times [y_i-16, y_i+15]$ It will be noted that, in this embodiment, the sub-sets resulting from the division have the same dimensions as those resulting from the partitioning; in addition, in this embodiment, the division of the image into working sub-sets constitutes not a tiling but a simple partitioning because of the fact that the working sub-sets have a size identical to the sub-sets and the offset is equal to half a side of the square sub-sets in question.

Below a description will be given, in particular with the help of FIG. 3A, of a variant in which, in accordance with another aspect of the invention, the working sub-sets have a size different from that of the elementary sub-set to which they correspond, the division of the image resulting in a tiling.

The global mapping used in the preferred embodiment will now be described with the help of FIGS. 2 and 3.

It should be stated first of all that the global contractive mapping consists of taking an element g of the metric space E so as to transform it into an element T(g) of the same metric space E, which is expressed by $$T: g \epsilon E \rightarrow T(g) \epsilon E \qquad (8)$$

The fact that g belongs to the space E(g∈E) can also be expressed as follows:

$$g: (x,y) \epsilon \Omega \subset R^q \rightarrow g(x,y) \epsilon R^d \qquad (9)$$

It will in fact be observed that equation (9) merely explains the type of special data in question: to each pair of values (x,y) taken in the field of definition (in this case the plane image $\Omega \subset R^2$) there corresponds a value in the mapping field $R^d$, that is to say three values amongst 256 levels of three primary colours. It will also be observed that, it being a case of image processing, the field of definition is $R^2$, whilst the mapping field is $R^3$ since the colour image has three components.

In the preferred embodiment of FIGS. 2 and 3 described below and in accordance with another aspect of the invention, each "piece" of the global contractive mapping, that is to say a Lipschitz elementary mapping, is a multi-linear mapping of the type:

$$T(g)\Big|_{Ki}: (x, y) \in Ki \rightarrow [T(g)](x, y) = \sum_{j=1}^{n} a_1 \cdot g\Big|_{ij} (x, y) + b \qquad (10)$$

where:

$T(g)|K_i$ the restriction of T(g) to the elementary sub-set $K_i$ n>1 the dimension of the multi-linear application $a_1, \ldots, a_n$ the multiplication factors b the translation factor $L_i, \ldots L_n$, the working sub-sets, with a position predetermined with respect to $K_i$ and related to this sub-set.

Thus, in the example of FIG. 3, the values g(x,y) of the pixels of coordinates (x,y), are transformed as follows:

$$[T(g)](x, y) = a_1 \cdot g(x - 16, y + 16) + \quad \text{(10twice)}$$
$$a_2 \cdot g(x + 16, y + 16) +$$
$$a_3 \cdot g(x - 16, y - 16) +$$
$$a_4 \cdot g(x + 16, y - 16) + b$$

where g(x,y) is the value of the pixel (x,y) in the image g (x,y) is a pixel of the elementary sub-set $K_i$ g(x−16, y+16) is the value of the corresponding pixel in the working sub-set $L_1$ g(x+16, y+16) is a value of the corresponding pixel in the working sub-set $L_2$ g(x−16, y−16) is a value of the corresponding pixel in the working sub-set $L_3$ g(x−16, y−16) is a value of the corresponding pixel in the working sub-set $L_4$ $a_1, \ldots, a_4$ the multiplication factors b the translation factor.

It can be seen that equations (10) and (10a) above are linear and multi-dimensional in nature, that is to say multi-linear, the factors $a_j$ for j=1, ..., n and b being respectively the multiplication factors and the translation factor. The factors $(a_1, \ldots, a_n, b)$ are here the "parameters" within the meaning of the invention of the elementary mapping relative to the sub-set $_{Ki}$. All the factors $(a_1, \ldots, a_n, b) K_i$ relating to the m elementary sub-sets $(K_1, \ldots, K_m)$ constitutes, in this embodiment, the "set of parameters" of the global contractive mapping within the meaning of the invention.

It should be stated that, in the preferred embodiment, n equals 4, which means that only four working sub-sets $L_j$, j=1, ..., n such as those defined with the help of FIG. 3, are related to each elementary sub-set $K_i$.

Thus, with each pair of values (x,y) of a given elementary sub-set $K_i$, there is associated a value calculated from the multi-linear equation (10) (See the example in FIG. 3 and equation 10a). This is done for all the m elementary sub-sets $(K_i, \ldots, K_m)$.

An explanation will now be given as to how the factors of the multi-linear mapping $a_j$, j=1, ..., n and b are determined for each of the elementary working sub-sets $K_i$.

In order to resolve the simplified optimisation problem (7) it is necessary, in general terms, for each elementary sub-set $K_i$ to minimise the distance between the restriction to the elementary sub-set $K_i$ and its transform by the global contractive mapping. In other words, it is necessary to minimise the distances:

$$d(f|_{Ki}, T(f)_{Ki}), i=1, \ldots m \quad (11)$$

In the preferred embodiment, use is made of the method of minimising the least squares in the presence of constraints, where the quantity to be minimised is the distance defined in equation (11) and is expressed in the form:

$$[d(f|_{Ki}, T(f)|_{Ki})]^2 = \Sigma_{(x,y) \in Ki}(f(x,y) - [T(f)](x,y))^2 \quad (12)$$

$$|a_i| < \beta, i=1, \ldots, n \quad (13)$$

where $\beta < 1/n$.

By minimising expression (12) under the constraints (13), each restriction of T(f) to $K_i$ is determined, and at the same time the factors $a_j$ and b of equation (10).

The factors $a_j$, b associated with each of the sub-sets $K_i$ constitute the primary representation of the set of initial data.

The problem of minimisation according to equations (10) and (12) under the constraints (13), in order to determine the factors $(a_1, \ldots, a_n, b)$ for each $K_i$:i=1, ..., m, will be detailed below.

For each elementary sub-set, the objective function $\phi K_i : R^{n+1} \to R$ defined as follows will be taken into consideration:

$$\phi_{K_i}(a_1, \ldots, a_n, b) = \sum_{(x,y) \in K_i} \left( f(x, y) - \left[ \sum_{j=1}^{n} a_j \cdot f'_{iL_j}(x, y) + b \right] \right)^2. \quad (14)$$

The problem of minimisation under constraints therefore amounts to seeking the (n+1) values $(a_1^*, \ldots, a_n^*, b^*) \in C \subset R^n$ which satisfy:

$$\phi_K(a_1^*, \ldots, a_n^*, b^*) = \min \{\phi_K(a_1, \ldots, a_n, b) | (a_1, \ldots, a_n, b) \in C, \quad (15)$$

where $$C = \{(a_1, \ldots, a_n, b) | R^{n+1}| - \beta < a_i < \beta : i=1, \ldots, n.$$

It should be stated first of all that the resolution of a minimisation problem without constraints is well known to experts. It is a question in this case of minimising in general an objective function of the type:

$$\Psi(c_1, \ldots, c_m) = \sum_{(x,y) \in K} \left( F(x, y) - \left[ \sum_{j=1}^{m-1} c_j \cdot g_j(x, y) + c_m \right] \right)^2, \quad (16)$$

where m is the number of parameters of the objective function and when $(c_1, \ldots, c_m)$ runs over the entire space $R^m$. The vector $(c_1^*, \ldots, c_m^*)$ sought satisfies:

$$\Psi(c_1^*, \ldots, c_m^*) = \min \{\Psi(c_1, \ldots, c_m) | (c_1, \ldots, c_m) \in R^m\}.$$

This vector $(c_1^*, \ldots, c_m^*)$ is characterised by the Euler equation:

$$\Psi'(c_1^*, \ldots, c_m^*) = 0, \quad (17)$$

where $_{\Psi'}(c_1^*, \ldots, c_m^*)$ is the derivative of $_{\Psi'}$(within the meaning of Fréchet). This is a linear continuous mapping of $R^m$ to R.

The latter equation is replaced here by the partial derivatives of $_\Psi$ at point $(c_1^*, \ldots, c_m^*)$, with respect to each variable. Therefore $(c_1^*, \ldots, c_m^*)$ is characterised by:

$$\partial_l \Psi(c_1^*, \ldots, c_m^*) = 0,$$

$$\partial_m \Psi(c_1^*, \ldots, c_m^*) = 0.$$

Having regard to the particular form of the function (16), the equations (18) are equivalent to:

$$\Sigma_{j=1}^{m} c_j^* \cdot G_{ji} = S_i : i=1, \ldots, m, \quad (19)$$

where $$G_{ji} = \Sigma_{(x,y) \in K} g_j(xy) \cdot g_i(xy), \{j=1, \ldots, m-1, i=1, \ldots, m-1,$$

$$G_{mi} = G_{im} = \Sigma_{(x,y) \in K} g_i(xy) \ i=1, \ldots, m-1$$

$G_{mm}$ = number of points (x,y) dans $K_i$, $S_m = \Sigma_{(x,y) \in K} F(xy)$.

The equations (19) form a linear system of equations which are easy to resolve by various methods well known in mathematics.

The resolution of the problem of minimisation (15) of the function (14) under the constraints (13) will comprise the following steps:

a) Resolution of the problem of minimisation without constraints of the function (14) on $R^{n+1}$ by the method described above by equations (16) to (19). The solution will be denoted $(\tilde{a}_1, \ldots, \tilde{a}_n, b) \in R^n$.

b) If $(\tilde{a}_1, \ldots, \tilde{a}_n, b) \in C$, and therefore if $-\beta < \tilde{a}_i < \beta$; $i=1, \ldots, n$, then the solution sought to the problem described by equations (15) and (16) is found and therefore $(a_1^*, \ldots, a_n^*, b) = (\tilde{a}_1, \ldots, \tilde{a}_n, b)$ c) If $(\tilde{a}_1, \ldots, \tilde{a}_n, b) \notin C$, certain constraints are violated. This will result in a disjointed partitioning of all the indices $\{1, \ldots, n\} = NV \cup UV \cup LV$ where NV is all the indices $i \in \{1, \ldots, n\}$ for which $-\beta < \tilde{a}_i < \beta$ UV is all the indices $j \in \{1, \ldots, n\}$ for which $\beta < \tilde{a}_j$ LV is all the indices $k \in \{1, \ldots, n\}$ for which $\tilde{a}_k < -\beta$ Therefore expressed mathematically:

$$\{1, \ldots, n\} = NV \cup UV \cup LV \quad (20)$$

$$NV = \{i \in \{1, \ldots, n\} | -\beta < \tilde{a}_i < \beta\} \quad (21)$$

$$UV = \{j \in \{1, \ldots, n\}, \beta < \tilde{a}_j\} \quad (22)$$

$$LV = \{k \in 1, \ldots, n\} | \tilde{a}_k < -\beta\} \quad (23)$$

In this case it is necessary to resolve a problem of minimisation without constraints described by equations (16) to (19) where $$F(x,y) = f(x,y) - \Sigma_{j \in UV} \beta \cdot g|_{L_i}(x,y) + \Sigma_{k \in LV} \beta \cdot g|_{L_k}(x,y). \quad (24)$$

$$\Psi(c_1, \ldots, c_m) = \Sigma_{(x,y) \in K}(F(x,y) - [\Sigma_{j=1}^{m-1} c_j \cdot g_j(x,y) + c_m])^2 \quad (25)$$

where m the number of indices in NV, $g_j = g|L_i$ expresses the fact that the $j^{th}$ unviolated constant relates to the factor $a_i$.

The solution of the last problem (24) and (25) will be $(c_1^* \ldots c_m^*)$.

Finally the solution sought for the problem with constraints will be $$a_i^* = c_j^*: j=1, \ldots, m-1 \text{ où } i \in NV, \quad (26)$$

$$a_k^* = \beta: k \in UV, \quad (27)$$

$$a_l^* = -\beta: l \in LV, \quad (28)$$

$$b^* = c_m. \quad (29)$$

if however (26) respects the constraints. In the contrary case, it will be necessary to reiterate the process.

A flow diagram for the partitioning of the 512×512 pixel image, its division and the calculation for each of the elementary sub-spaces $K_i$ of factors $a_j$ and b is described below, with the help of FIGS. 10 to 15.

Preferred Method of Secondary Processing of Compressed Data

A description will now be given of a preferred implementation of the method of secondary representation of a set of data consisting of parameters resulting from a primary processing of data, in accordance with the method described above.

In this embodiment, the parameters resulting from the primary processing are the subject of the secondary processing, with a view to retrieving, with the error rate mentioned above, the initial data.

In other variant embodiments, one of which is described below, the object of the secondary processing is to deliver data of a type other than that of the initial data.

In general terms, in the case of a retrieval of the initial data, a step of "iterative calculation" is carried out, in the course of which, using the said parameters $(a_1, \ldots, a_n, b)$, use is made of a method of successive approximations converging towards the fixed point of the global contractive mapping (T), this fixed point constituting a representation of the said set of initial data $(f \in E)$ In order to implement the method of successive approximations in the context of a retrieval, the global contractive mapping $(T^*)$ as defined above (equations (8) and (10)) is applied, in accordance with a preferred method of implementing the invention, to a set of arbitrarily chosen data $(x_0 \in E)$. The same contraction $(T^*)$ is then applied to the transform thus obtained and this process is reiterated until the difference between two consecutive transforms is less than the given threshold. This is expressed by the following equation.

$$T^*(\ldots T^*(T^*(x_0)) \ldots) = (T^*)^n (x_0) \quad (30)$$

By applying the global contractive mapping q times to the result of the previous transform, a good approximation of f is obtained, which is expressed by:

$$(T^*)^q (x_0) \approx f \quad (31)$$

the criteria for stopping the iterations being expressed as follows:

$$d((T^*)^l(x_0), (T^*)^{l+1}(x_0)) < \epsilon \quad (32)$$

where $\epsilon$ is the deviation tolerated on a pixel multiplied by the number of pixels in the image.

It should be noted that using the global contractive mapping (7) amounts to effecting the various partitionings and divisions of the arbitrary image and successive transforms thereof, so as to be able to use equation (10) for each of the elementary sub-sets of the partitionings in question.

Below, with the help of FIGS. 16 and 17, a description is given of a flow diagram for retrieving an image represented in accordance with the method of the invention.

In the above description, the global contractive mapping defined in equations (8) and (10) is used in the data retrieval process. This is because, as the aim of the secondary processing described above is, in this embodiment, to obtain a retrieval of the initial data which is as faithful as possible, it is the same global contractive mapping which is used during the retrieval step.

On the other hand, in the variant described below with the help of FIGS. 9, 9A, 18 and 19, where it is desired to obtain, at the end of the secondary processing, data of a type different from that of the initial data, another global contractive mapping will be used.

In general terms, the global contractive mapping used during the primary processing is of the so-called "first type"; the one used during the secondary processing is of the so-called "second type". In the case of retrieval of the initial data, the global contractive mapping of the second type is identical to that of the first type. Where in the course of the secondary processing the data of a type different from that of the initial data are obtained, the global contractive mapping of the second type will be different from that of the first type.

2. Description of a Preferred Embodiment of a Processing Device

Device for Primary Processing of a Set of Data

A description will now be given with the help of FIG. 4 of a preferred embodiment of a device for processing a set of data representing physical quantities and designed to permit a primary representation of the said set by using the method described above.

In this embodiment, which concerns a colour image processing device, the data of the image in 512×512 pixels are admitted at the input, whilst at the output the device delivers the parameters $a_i$, $l=1, \ldots, 4$ and b relating to each of the m sub-sets constituting the partitioning of the image.

It will be noted here that the present invention is certainly not limited to any particular image format but allows the processing of images of all sizes. However, in this preferred embodiment, the image processed and retrieved is a 512×512 pixel image with 256 colour levels on each of three components, red, green and blue.

In the block diagram in FIG. 4, the coding device bears the general reference 500.

It includes, connected to a data and address bus, designated under the reference 501:

- a controller (ALU+CTR) 550 incorporating an arithmetic logic unit. This controller consists, in this embodiment, of a microprocessor of the type marketed by INTEL under the reference i486,
- a random access memory RAM, bearing the reference 510. This memory has a certain number of registers, which will be described below, and a rapidly addressable part (cache) 514,
- a program memory 530, of the ROM type,
- a first direct access random access memory register 560 (REG 1),
- a second direct access random access memory register 570 (REG 2),
- an input buffer IBFR 590, connected to an input connector 591, and
- an output buffer OBFR 580, connected to an output connector 581.

In the ROM 530 a program is recorded for processing data at the input 591, with compression thereof in accordance with the method described above. The compression program, which in FIG. 4 bears the reference 531, is described below with the help of FIGS. 10 to 15.

All the means 510, 530, 531, 550, 560 and 570 constitute here an embodiment of "first logic transformation means" within the meaning of the invention.

In a preferred embodiment, all these elements could be incorporated in one and the same integrated circuit (ASIC).

In this embodiment, the random access memory RAM 510 includes, amongst other things, the following registers designed for using the program 531:

- a register 511 IM, designed to store the image data,
- a counter 513 CNT. This counter is used as explained below (FIG. 10),
- the part 514 CACHE of the random access memory. This part is a memory part which is addressable very rapidly, in which, as is known, the most currently used data at a given moment are stored.

The part CACHE 514 of the memory 510 includes the following registers:

- a register 515 CSI designed to store, at a given moment, the coordinates of the elementary sub-set $K_i$ in the course of processing,
- registers $(f(L_1)-f(L_4))$ referenced 516–519, in which the values $[f(L_i)](x,y)$ corresponding to each point (x,y) (level amongst 256 of the colour component in the course of processing) of the working sub-sets $L_1$–$L_4$ defined above are recorded,
- a register 520 designed to store the factors $a_1$, $a_2$, $a_3$, $a_4$ and b, relating to an elementary sub-set in question $K_i$.

The register 560 REG 1 is designed to add, for each elementary sub-set, the factors $a_1$, $a_2$, $a_3$, $a_4$ and b, relating to each working sub-set.

The register 570 REG 2 is designed to store the list of addresses of all the elementary sub-sets $K_i$. In this register the said coordinates are recorded once and for all, since in this embodiment the device is designed to process an image whose 512×512 pixel structure is partitioned once and for all.

FIG. 5 depicts, connected respectively to the input and output means:

- a source 592 of uncompressed data, and
- means 582 using compressed data.

The source 592 can include numerous means within the knowledge of an expert. For example, it can consist of a hard-disk or diskette or compact-disk (CD ROM) reader. The data of the image to be compressed can therefore advantageously be recorded on the corresponding media: hard disk, diskette or compact disk.

This recording can be effected in any way known to experts.

The source 592 can also consist of a video interface, able to deliver the data of the image to be compressed at the input 591.

The source 592 can also consist of data reception means connected to a transmission network, the source 592 being able to transform the data received into a suitable format for them to be able to be presented at the input of the primary processing device.

Likewise, the user means 582 can also consist of means of storing the compressed image (hard disk, diskette, CD ROM etc) or a simple interface designed to deliver the video signal in a known format to other user means such as means intended for example to transmit this compressed image remotely or to store it. These means 582 can moreover consist of a data transmission device connected to a telecommunications network.

Device for Secondary Processing of a Set of Parameters Resulting From the Primary Processing of Initial Data In this embodiment, which concerns the processing of images, the secondary processing device is able to retrieve, using the factors $a_1$, $a_2$, $a_3$, $a_4$ and b relating to each of the m sub-sets, the initial image, in colour. It is also able to deliver the data relating to a grey-level image corresponding to an original colour image. These data output from the secondary processing device, representing grey levels in this example, are of a different type from those representing the initial colour image which were the subject of the primary processing.

In the block diagram in FIG. 6, the retrieval or iterative calculation device bears the general reference 600.

It includes, connected to a data and address bus, designated under the reference 601:

- a controller (ALU+CTR) 650 incorporating an arithmetic logic unit.

This controller consists, in this embodiment, of a microprocessor of the type sold by INTEL under the reference i486,

- a random access memory RAM, bearing the reference 610. This memory includes a certain number of registers, which will be described below, and a rapidly addressable part (cache) 614, a program memory 630 of the ROM type. In this memory there are notably recorded on the one hand a program 631 for decompressing the data of the image presented at the input 681 with a view to the retrieval of the initial image and a program 632 for decompressing the data of the image with a view to the retrieval of a grey-level image instead of a colour image. The program 631 and 632 use the method described above and their flow diagrams are detailed below with the help of FIGS. 16 to 18, a first direct-access register 560 (REG 1), and a second direct-access register 570 (REG 2) identical to those described with the help of FIG. 4, an output buffer OBFR 690, connected to an output connector 691, and an input buffer IBFR 680, connected to an input connector 681.

The set of means 610, 630, 631, 650, 560 and 570 constitutes here an embodiment of "second logic means" within the meaning of the invention. The set of means 610, 630, 632, 650, 560 and 570 constitutes here another embodiment of "second logic means" within the meaning of the invention.

In a preferred embodiment, all these elements can be incorporated in one and the same integrated circuit (ASIC) suitable for the secondary processing.

In this embodiment, the random access memory RAM 610 includes, amongst other things, the following registers intended for implementing the programs 631 and 632:

a register 511 (IM), similar to the one described in relation to FIG. 4, a register 621 (RE), intended to store the data of an image, a register CHTY 622, designed to differentiate the general secondary processing from a retrieval, a register IT 612 intended to store the current value of the number of iterations performed in order to effect the secondary representation, a register p 623 intended to store the number of iterations for implementing the method of successive approximations in order to effect the secondary processing of the image, a counter 513 CNT similar to the one described in relation to FIG. 4. This counter is used here as explained below (FIG. 18), the part 614 CACHE of the random access memory. This part is a memory part which can be addressed very rapidly, in which are stored, as is known, the data which are most currently used at a given moment.

The part CACHE 614 of the memory 610 has registers 515 to 520 identical to those described in relation to FIG. 4.

The register 560 REG 1, identical to that of the device of FIG. 4, is intended to store, for each elementary sub-set, the factors $a_1$, $a_2$, $a_3$, $a_4$ and b.

The register 570 REG 2, identical to that of the device of FIG. 4, is intended to store the list of addresses of all the elementary sub-sets $K_i$. In this register the said coordinates are stored once and for all, since in this embodiment the device is intended to retrieve an image whose 512×512 pixel structure has been partitioned once and for all.

FIG. 7 depicts, connected respectively to the input and output means:

a source 682 of compressed data, and means 692 using decompressed data.

The source 682 can consist of means of storing the compressed image (hard disk, diskette, CD ROM etc) or a simple interface designed to deliver them. The means 682 can also consist of a data reception system connected to a telecommunications network.

The means 692 can consist for example of means of storing decompressed data or a simple interface delivering the decompressed data at its output. They can also consist of a device for transmitting decompressed data over a telecommunications network.

Description of a Device Incorporating a Primary Processing Device and a Secondary Processing Device In the block diagram in FIG. 8, a device incorporating a primary processing device 500 and a secondary processing device 600 is depicted and bears the general reference 700.

This device is capable of simultaneously processing compressions of images and decompressions. It is consequently composed of the devices described in relation to FIGS. 4 and 6. It is a question in this case of the primary processing device 500 and secondary processing device 600. This type of apparatus is referred to as "full-duplex".

In another embodiment (half-duplex), the device can execute only a primary processing or a secondary processing but never at the same time. It can also perform a "complex" processing including a primary processing and a secondary processing performed one after the other. The block diagram of such a device is depicted in FIGS. 9 and 9a.

This device, which bears the reference 800, includes conjointly the resources of the devices 500 and 600 described above, avoiding duplication. Thus:

the registers of the random access memories 510 and 610 described above are incorporated in the same random access memory unit 810, a single read only memory unit 830 incorporates the programs 531, 631 and 632 mentioned above and a configuration program 831.

a single microprocessor 850 incorporates the means 550 and 650.

The configuration program 831, which will be described below in relation to FIG. 19, enables the device 800 to perform:

a compression of the data of a colour image, a decompression of the data either with a view to retrieving the initial colour image or with a view to delivering an image with corresponding grey levels, and a complex processing enabling a colour image to be transformed into a grey-level image.

Description of a Preferred Flow Diagram for Compression of a 512×512 Pixel Colour Image This flow diagram is illustrated in FIG. 10. FIGS. 11 to 15 are flow diagrams explaining certain operations of the compression flow diagram of FIG. 10.

The flow diagrams of FIGS. 11 and 12 also detail operations of the decompression flow diagram of FIGS. 16 and 17, which will be described below. The references between the parameters refer back to the steps in FIG. 16.

It should be stated first of all that the data relating to the image represent a mapping as defined in equation (9) disclosed above.

In this case, to each pair of values (x,y) (column, row coordinates) taken in the definition field (in this case to the 512×512 pixel plane image) there corresponds a value f(x,y) in the mapping field $R^3$, that is to say a value amongst 256 levels relating to each of the three primary colours.

Three series of numbers each corresponding to the level of a primary colour (that is to say 262, 144 values f(x,y) per component), scanning the data of the image as follows:
- the rows are scanned from left to right;
- the rows are incremented from bottom to top.

These three series are here recorded in the uncompressed data source 592. They can be read at the input port 591 under the control of the microprocessor 550.

At 200, an initialisation of the registers is performed (IM 511, CNT 513) and of the two registers REG 1 560 and REG 2 570.

The files relating to the colour components R, G, B are accessible separately and are supplied in a predetermined order, namely:
- first of all the data of the image in question relating to the red component (R), then the image data relating to the green component (G) and finally the data image relating to the blue component (B).

At 201, a first test is carried out for the purpose of determining whether or not the counter CNT 513 is equal to 3.

If not, the program switches to step 202, in the course of which:
- the counter CNT is incremented by 1 unit;
- the microprocessor 550 reads, at the input port 591, the following colour component to be processed.

It should be stated that each colour component is presented as a series of 262, 144 values f(x,y) corresponding to the level of the colour in question for each of the pixels of the image. This series is loaded into the register IM 511.

It should be stated that, in the preferred embodiment, each working sub-image has as many data as the elementary sub-images.

The program then switches to step 204 (explained in FIG. 11), in the course of which the 512×512 pixel image will be partitioned into 256 sub-images $K_i$, i=(1, ..., 256) of 32×32 pixels. This partitioning is effected by determining the coordinates (x,y) of the bottom left-hand corner of each of the m sub-sets $K_i$ in question. Thus the sub-set $K_i$ illustrated in FIG. 3 has the coordinates $(x_i, y_i)$, which correspond to those of its bottom left-hand corner. Each of the addresses of the bottom left-hand corners of the blocks of 32×32 pixels corresponds to a particular address in the list recorded in the register IM 511 of the random access memory 510.

The list of these addresses is loaded in the register REG 2.

Figure 11:
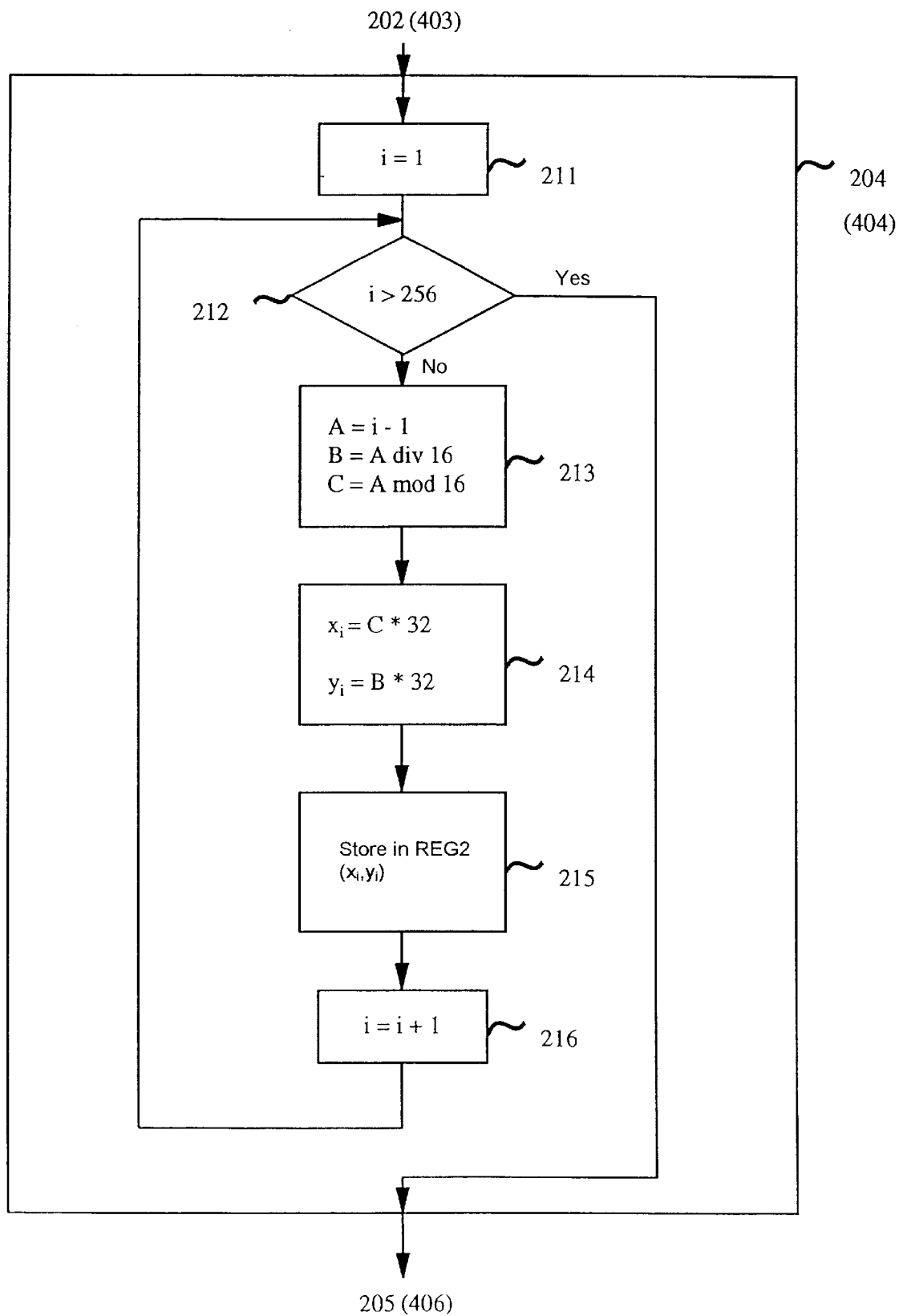

With reference to FIG. 11, after an initialisation of the counter consisting of the register i 521 relating to the index of the sub-set $K_i$ in step 211, the program switches to the test 212, in the course of which it is checked whether or not the list is complete. If not, the program switches to step 213, and a variable B is determined as the quotient of a complete division of (i−1) by 16. The remainder of the division (variable C) will be stored in the register 524. The coordinates of the bottom left-hand corner of the elementary sub-set $K_i$ in question are stored in the variables $(x_i, y_i)$ during step 214. The values $x_i=C*32$ and $y_i=B*32$ are calculated at 214 and temporarily stored in the registers 525 and 526. The values of the variables $x_i$ and $y_i$ thus obtained are then copied into the register 570, REG 2, during step 215. During step 216 the counter i is incremented and the program then runs the test 212 again.

When the test 212 is positive, the program then switches to the test 205, in the course of which it is checked whether or not the list recorded in the register REG 2 is empty. If not, this means that there are still elementary sub-sets $K_i$ to be processed and the program switches to step 206.

At step 206, the first elementary sub-image in the list recorded in the register REG 2 is eliminated. This sub-image is recorded in a register CSI 515 of the cache memory of the RAM 510.

The program then switches to step 207 in the course of which, from the address recorded in the register CSI, a search is made for the four adjacent sub-images $L_1$, $L_2$, $L_3$, $L_4$ (see FIG. 3). For this purpose, the rule stated above is applied.

The purpose of step 207 is to determine the values f(x,y) of the colour component associated with each of the pixels of the working sub-sets $L_1$, $L_2$, $L_3$ and $L_4$ related geometrically and in a predetermined manner to the elementary sub-set in question $K_i$. The set of values f(x,y) related to the pixels of the sub-set $L_1$ (respectively $L_2$, $L_3$ and $L_4$) will hereinafter be denoted $f(L_1)$ (respectively $f(L_2)$ $f(L_3)$ and $f(L_4)$). The detailed flow diagram of this step is depicted in FIG. 12.

Figure 12:
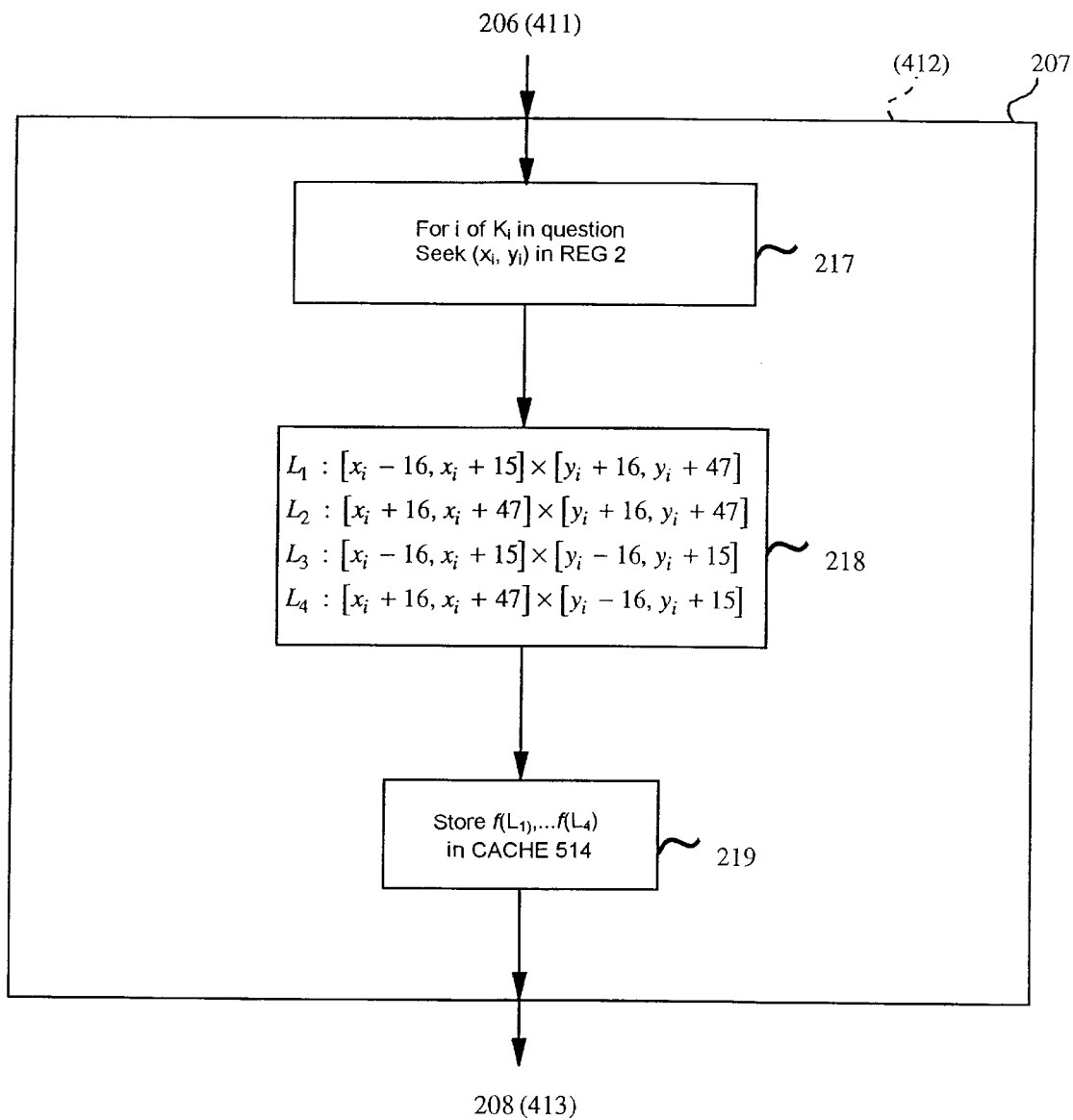

With reference to FIG. 12, for each elementary sub-set $K_i$ in question, the controller 550 copies, into the arithmetic unit 550, the coordinates $(x_i, y_i)$ of the bottom left-hand pixel of $K_i$ and stored in the register REG2 507 at step 217. Then, at step 218 the arithmetic unit 550 determines the coordinates of each pixel of each working sub-set in accordance with the following table:

$L_1$: $[x_i-16, x_i+15] \times [y_i+16, y_i+47]$ $L_2$: $[x_i+16, x_i+47] \times [y_i+16, y_i+47]$ $L_3$: $[x_i-16, x_i+15] \times [y_i-16, y_i+15]$ $L_4$: $[x_i+16, x_i+47] \times [y_i-16, y_i+15]$ Then at step 219 the arithmetic unit 550 will seek, for the colour component in the course of processing, the value corresponding to each of the $32^2$ pixels of $L_1$ (respectively $L_2$, $L_3$ and $L_4$) and stores the set of $32^2$ values in the register $f(L_1)$ 516 (respectively $f(L_2)$ 517, $f(L_3)$ 518 and $f(L_4)$ 519) of the cache 514).

The program then switches to step 208, in the course of which, in general terms, the parameters $a_j$ (in this case $a_1$, $a_2$, $a_3$, $a_4$) and b are calculated by using the method of least squares with the constraints described above (see equations 12 and 13).

Figure 13:
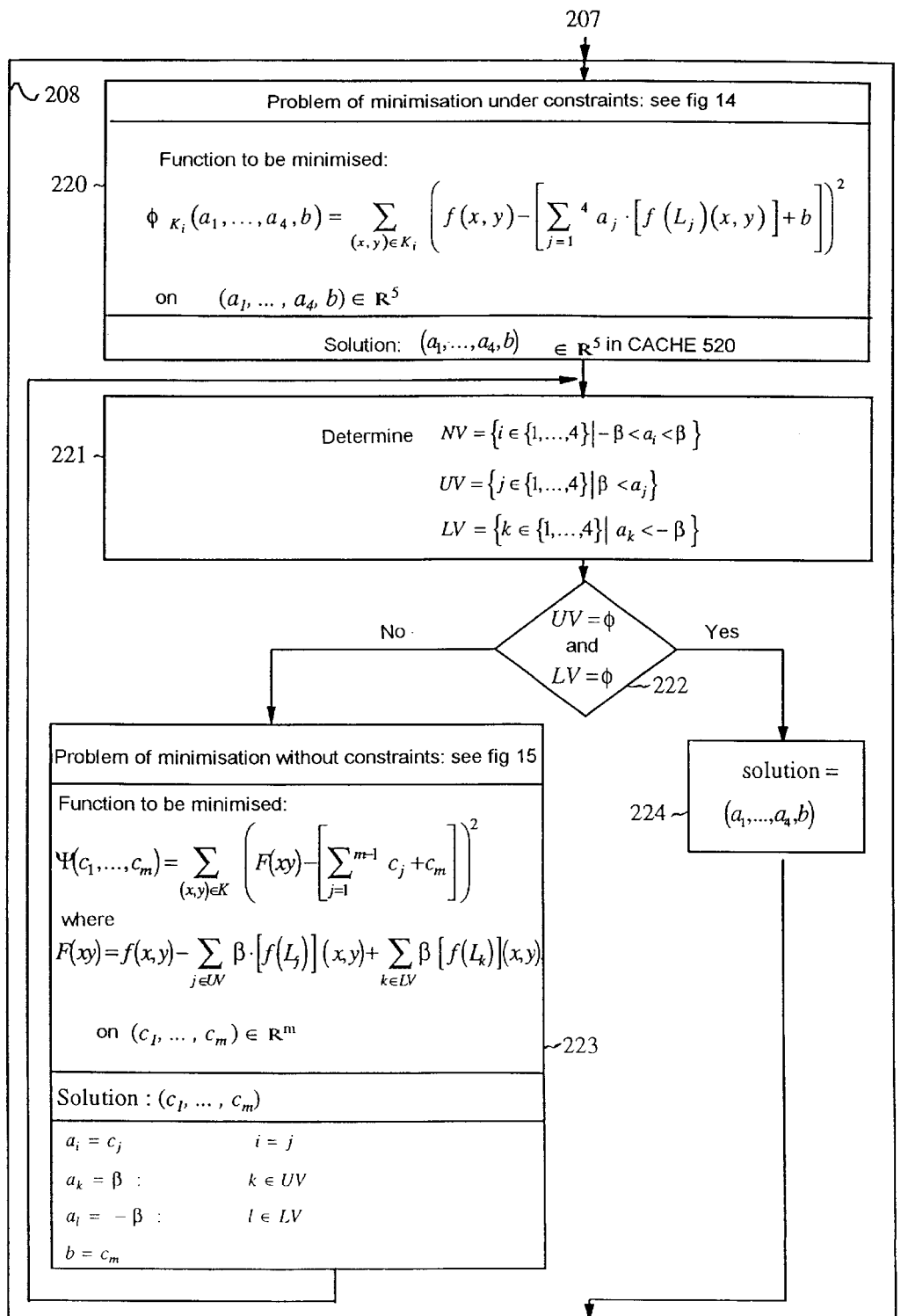

A simplified description of step 208 is given in the flow diagram depicted in FIG. 13. It should be stated that, in order to determine the factors $a_1$, $a_2$, $a_3$, $a_4$ and b, it is necessary to resolve a problem of minimisation of a function under constraints. Above it was seen, in conjunction with equations 14 to 29, that this amounts to iteratively resolving two types of problem of minimisation under constraints. The explanations given above for a general case are put into practice for determining the four parameters $a_1$, $a_2$, $a_3$, $a_4$ and the parameter b.

At step 220 the first problem of minimisation without constraints is resolved. The function:

$$\phi_{K_i}(a_1, \ldots, a_4, b) = \sum_{(x,y) \in K_i} \left( f(x,y) - \left[ \sum_{j=1}^{n=4} a_j \cdot [f(L_j)](x,y) + b \right] \right)^2$$

is minimised for values $(a_1, \ldots, a_4, b)$ running throughout $R^5$. To do this, use is made of the method of least squares described above by equations (16) and (19). The unique solution to this problem $(a_1, \ldots, a_4, b) \in R^5$ is the solution of the linear system (19).

As illustrated in FIG. 14, step 220 is subdivided into four steps 230–233.

During step 230, factors $G_{ij}$ i=1, ..., 5, j=1, ..., 5, using the following formulae:

$$G_{ji} = \sum_{(x,y) \in K} [f(L_j)](x,y) \cdot [f(L_i)](x,y) \quad i, j = 1, \ldots, 4$$

$$G_{5i} = G_{i5} = \sum_{(x,y) \in K} [f(L_i)](x,y) \quad i = 1, \ldots, 4$$

$$G_{55} = 32^2$$

The factors $[G_{ij}]$ constitute the matrix to be inverted in order to resolve the linear system of equations (19).

The above formulae for determining the factors $G_{ij}$ are, as can be seen, simple additions and multiplications using pixel values corresponding the colour levels of the component in question, for each of the $32^2$ pixels of the elementary sub-set in question.

Likewise at step 231 the factors $S_1, \ldots, S_5$ constituting the second member of the linear system are calculated. The formulae used are:

$$S_i = \sum_{(x,y) \in K} [f(L_j)](x,y) \cdot f(x,y) \quad i = 1, \ldots, 4$$

$$S_5 = \sum_{(x,y) \in K} f(x,y)$$

Step 232 has recourse to a conventional routine of inverting a system of linear equations, in this case with 5 unknowns. The linear system to be inverted is as follows:

$$\begin{bmatrix} G_{11} & G_{21} & G_{31} & G_{41} & G_{51} \\ G_{12} & G_{22} & G_{32} & G_{42} & G_{52} \\ G_{13} & G_{23} & G_{33} & G_{43} & G_{53} \\ G_{14} & G_{24} & G_{34} & G_{44} & G_{54} \\ G_{15} & G_{25} & G_{35} & G_{45} & G_{55} \end{bmatrix} \begin{bmatrix} a_1 \\ a_2 \\ a_3 \\ a_4 \\ b \end{bmatrix} = \begin{bmatrix} S_1 \\ S_2 \\ S_3 \\ S_4 \\ S_5 \end{bmatrix}$$

The solution $a_1, \ldots, a_4, b$ will be stored at step 233 in the register 520 of the CACHE 514.

The program then goes to step 221 (FIG. 13) where, in accordance with equations (20) to (23), a separate partitioning of all the integers {1,2,3,4} into NV, UV and LV defined as $NV=\{i \in \{1, \ldots, 4\} | -\beta < a_i < \beta$ $UV=\{j \in \{1, \ldots, 4\} | \beta < a_j$ $LV=\{k \in \{1, \ldots, 4\} | a_k < -\beta$ is determined.

The program then switches to the test 222 in the course of which it is checked whether the sets UV and LV are empty. If this test is positive, the values currently present in the CACHE 520 constitute (step 224) the solution of the problem with constraints.

If it is negative, certain constraints are active for the solution of the problem with constraints. In this case (step 233; see FIG. 15), it is necessary to resolve a restricted problem.

It is a case here of minimising under constraints the modified function:

$$\Psi(c_1, \ldots, c_m) = \Sigma_{(x,y) \in K}(F(xy) - [\Sigma_{j=1}^{m-1} c_j \cdot [f(L_j)](x,y) + c_m])^2$$

where $F(x,y)=f(x,y)-\Sigma_{j \in UV}\beta \cdot [f(L_j)](x,y)+\Sigma_{k \in LV}\beta \cdot [f(L_k)](x,y)$, and m<4 since fewer constraints are active.

The solution to this problem is $(c_1, \ldots, c_m)$ and is obtained by considering equations (16) and (18) and resolving the linear system (19).

The solution of the initial problem with constraints will be:

$a_j=c_j$: j=1, ..., m-1 ou i∈NV, $a_k=\beta$: k∈UV, $a_l=-\beta$: l∈LV, $b=c_m$.

Step 223 will be described in conjunction with the flow diagram of FIG. 15, assuming that m=3. It is necessary to consider the problem of minimisation without constraints, described in step 223, which is subdivided into four steps 240 to 243. During step 240, the factors $H_{ij}$ i=1, ..., 4, j=1, ..., 4 are calculated using the following formulae:

$H_{ji}=\Sigma(x,y) \in K[f(L_j)](x,y) \cdot [f(L_i)](x,y)$ i, j=1, ..., 3

$H_{4i}=H_{i4}=\Sigma_{(x,y) \in K}[f(L_i)](x,y)$ $H_{44}=32^2$

The factors $[H_{ij}]$ constitute the matrix to be inverted in order to resolve the linear system of equations (19).

The above formulae for determining the factors $H_{ij}$ are, as can be seen, simple additions and multiplications using pixel values corresponding to the colour levels of the component in question for each of the $32^2$ pixels of the elementary sub-set in question.

Likewise at step 241 the factors $T_1, \ldots, T_4$ constituting the second member of the linear system are calculated. The formulae used are:

$T_i=\Sigma(x,y) \in K[f(L_j)](x,y) \cdot [f(L_i)](x,y)$ i=1, ..., 3

$T=\Sigma_{(x,y) \in K}F(x,y)$

Step 242 has recourse to a conventional routine of inverting a system of linear equations, in this case with four unknowns. The linear system to be inverted is as follows:

$$\begin{bmatrix} H_{11} & H_{21} & H_{31} & H_{41} \\ H_{12} & H_{22} & H_{32} & H_{42} \\ H_{13} & H_{23} & H_{33} & H_{43} \\ H_{14} & H_{24} & H_{34} & H_{44} \end{bmatrix} \begin{bmatrix} c_1 \\ c_2 \\ c_3 \\ b \end{bmatrix} = \begin{bmatrix} T_1 \\ T_2 \\ T_3 \\ T_4 \end{bmatrix}$$

At the end of step 223, it is necessary to review whether the solution thus obtained still satisfies the constraints. To do this, step 221 and the test 222 are executed once again. This process until the test 222 is positive.

The program then switches to step 209, in the course of which the factors $a_1$, $a_2$, $a_3$, $a_4$ and b are recorded in the memory REG 1.

At the end of step 209 the program switches again to the test 205, and all the operations 205–209 are reiterated as long as the memory REG 2 is not empty.

When the test 205 is positive, the program switches once again to the test 201 in order to check whether or not the counter CNT 513 is equal to 3. In the affirmative, this signifies that the three colours have been processed. The program then switches to the final step 210. The parameters of the global contractive mapping are in the register REG 1 560. These parameters constitute a primary representation of the initial data which were recorded in the data source 592. The following performance was observed on a 512×512 pixel colour image with 252 levels:

Number of data at start:

3×512×512×8 bits=6,291,456

Number of data on arrival:

3×256×(4×64+10)=204,288 consequently:

compression rate: 30 number of bits per pixel: 0.78

Processing time:

3×256×80 msec.≅61 sec.

(80 msec=unit time for calculating $a_1, \ldots, a_4, b$)

Description of Two Embodiments of a Decompression Flow Diagram

A description will now be given, in conjunction with FIGS. 16 and 17, of the flow diagram of the program 631 for retrieving the data of the original colour image.

In conjunction with FIG. 18, a variant of the program 631 (program 632) will be described. In this variant, the data obtained are of a different type from the original data since they concern the data of a grey-level image corresponding to the original colour image.

At 400 in FIG. 16, an initialisation is carried out of the registers IM, RE and IT of the random access memory 610, of the two memories REG 1 560 and REG 2 570, and of the counter CNT 513.

At 401, a first test is carried out for the purpose of determining whether or not the content of the counter CNT is equal to 3. If so, the three components have been retrieved and the decompression program is ended (step 402).

If not, the program switches to step 403, in the course of which the compressed data of the input memory are loaded into the memory REG 1 560. It should be stated that the compressed data are formed by a sequence of five numbers, namely the factors $a_1, a_2, a_3, a_4$ and b relating to each elementary sub-set $K_i$. In the case of a colour image of 512×512 pixels, each component has been compressed into 256 sequences of five numbers $a_1, \ldots, a_4$, b in the course of the primary treatment as performed by the program 531 described above. This sequence of 256×5 numbers is loaded into REG 1 560.

The program then switches to step 404, in the course of which the list of sub-images will be created. In the course of this step, the list of references is obtained at each elementary sub-set. In this case it is a question of a list of the coordinates $(x_i, y_i)$ of the bottom left-hand pixel of each elementary sub-set K), of 32×32 pixels. The constitution of the list is identical to the procedure of step 204 described above in conjunction with FIG. 11.

The program then switches to step 406, in the course of which:

in accordance with the preferred embodiment of the invention, an arbitrary initial image is stored in the register IM 511 of the random access memory 610. In the present case of decompression of a colour image where each component has 256 levels having respectively the values 0 to 255, advantageously the register IM is initialised at 128 for each pixel for the first component. For the successive components, the result previously obtained will be used as the initialisation;

the register IT 612 is initialised with a value p read in the register 623 of the RAM 610. The number of iterations is recorded in the register p, having regard to the RMSQ desired (see above Table 1 of the general description of the method). The inventors in fact found, during tests with the prototype, that, in order to obtain a given RMSQ from a compression rate, a limited number of successive iterations in the course of the approximation calculation were necessary. Typically: 2<p<10; however, for complex images, p may have a higher value;

the counter CNT 513 is incremented by one unit.

The program then executes a number p of iterations referenced on the loop 450 in order to enable the retrieval of a component of the image.

The program switches first of all to the test 407, in the course of which it is checked whether the content of the register IT 612 is positive and non null.

If the test 407 is positive, the program switches to the test 408, in the lo course of which it is checked whether or not the list recorded in REG 2 570 is empty.

If the test 408 is negative, the program switches to step 410 and executes it until all the elementary sub-sets $K_i$ have been processed.

The details of step 410 will now be described in FIG. 17.

Step 410 itself comprises steps 411 to 415:

At step 411, the coordinates $(x_i, y_i)$ of the elementary sub-set $K_i$ in question are withdrawn and are copied into the register CSI 515. The factors $(a_1, \ldots, a_4, b)$ relating to the sub-sets $K_i$ in question are copied from the register REG 1 to the register 520 of the CACHE 614.

The purpose of step 412 is to determine the working sub-sets related geometrically and in a predetermined manner to the elementary sub-set $K_i$ in question. This step includes the same operations as at step 207 described above in conjunction with FIG. 12. The values $f(L_1), f(L_2), f(L_3)$ and $f(L_4)$ of the pixels relating respectively to $L_1, L_2, L_3$, and $L_4$ are respectively copied into the registers 516, 517, 518 and 519 of the CACHE 614.

The program then switches to step 413 and 414, in the course of which there is calculated, for each pixel (x,y) of $K_i$, the value $$\sum_{i=1}^{4} a_i \cdot [f(L_i)](x, y) + b$$

using the factors stored in the register 520 and the data $f(L_1), \ldots, f(L_4)$ stored in the register 516 and 519 (step 413), and this value is stored (step 414) in the register RE 621 of the RAM 610.

If the test 408 is positive, the content of the register RE 621 is copied into the register IM 611, and the content of the register IT 612 is reduced by one unit.

Test 407 is once again carried out. As long as this test is positive this means that the number of iterations provided by the number recorded in the register p have not finished and the operations 408 to 410 are reiterated. When the test 407 is negative or null, the number of iterations provided is ended, for the component in the course of processing, and the program leaves the loop 450. This component is therefore decompressed.

Step 405 is carried out, which consists of copying the content of the register IM 511 into the output buffer OBFR 690. The program then switches to test 401.

As long as the test 401 is negative, this means that there remains at least one component completely compressed.

It will be observed that, for the second and third component, a new initialisation of the register IM 511 is not carried out. The register IM in fact includes the list of the values corresponding to each pixel for the components previously decompressed. This value list is the initial arbitrary image for the following component. FIG. 16a illustrates, in this regard, the progress of step 406.

At 403, the test of the counter CNT is carried out. If its content is equal to zero, this means that it is a case of the start of the decompression process and the register IM 511 is initialised at 128 for each pixel (step 431). The register IT is initialised at the value p (step 432).

If the content of the counter CNT is greater than zero, this means that one component at least has been decompressed and, at step 433, the register IM 511 is loaded with the content of the register RE 621, that is to say with the values corresponding to the components previously decompressed. This makes it possible to decrease the number of iterations p by two units (cf step 434 where IT is initialised at the value p−2) since the initial image is very close to the final image. The calculation time is reduced because of this characteristic.

The counter CNT is then incremented by one unit (step 435).

When the three components have been decompressed, the test 401 is positive. The data relating to each of the three colour components have in turn been copied into the output buffer OBFR 690, from where they have been transferred to the decompressed data user means 682 (FIG. 7).

The program 632 will now be described in conjunction with FIG. 18.

This program is a variant of the program 631 which was described in conjunction with FIGS. 16 and 17. The program 632 makes it possible to obtain, using the parameters relating to a so-called original colour image, the data of a corresponding grey-level.

The program 632 has, overall, a structure similar to that of the program 631. In particular, in the preferred embodiment described here of the program 632, the inventors sought to use the routines of the program 631 as far as possible. Such a procedure proves advantageous, on the assumption that the programs 631 and 632 are designed to be used within the same device incorporating both a primary processing device and a secondary processing device.

The first step of the program 632 is an initalisation step 400 similar to that described above. The program then switches to a test 449 similar to the test 401 described above, in the course of which it is determined whether or not the content of the counter CNT is equal to 3.

If not, step 451 is carried out, in the course of which the data relating to the first colour component will be read in the buffer register IBFR 680 in order to load them into the register REG 1 560. The counter CNT is incremented by one unit. The three colour components are thus read successively and loaded into the register REG 1 560.

The test 449 then becomes positive and the program switches to step 404, in the course of which the list of sub-images will be created. Step 404 of the flow diagram of FIG. 18 is identical to step 404 of the flow diagram of FIG. 16 described above.

The program then switches to step 452, which will now be described. This step is detailed in FIG. 19.

It is during step 452 that a global contractive mapping of the "second type" is determined, making it possible to obtain data of a type different from the original data, in this case a grey-level image, using parameters relating to a colour image.

In addition, in a preferred embodiment, the inventors sought to use, as far as possible, the iteration routine 450 in the course of which the contractive mapping of the first type (the original one) is used in order to execute the method of successive approximations. Thus, in this embodiment, the contractive mapping of the second type has a structure similar to that of the contractive mapping of the first type, however, its factors are different and will be determined in the course of step 452. In other embodiments, experts will be able to effect contractive mappings of the "second type" which differ both with regard to their structure and with regard to the parameters used. In reality, the nature of the contractive mapping of the second type depends on the nature of the data of the second type which it is sought to obtain. As in the embodiment described here it is a case of obtaining an image with one grey level using parameters relating to the same colour image, it was considered that it was simpler to preserve the structure of the contractive mapping, whilst changing the parameters thereof, in order to obtain the said contractive mapping of the second type.

In the course of step 452, the calculation of so-called "substitution" factors $a_{iS}$, $b_s$ is therefore carried out using f $a_{iR}$, $b_R$, $a_{iG}$, $b_G$ and $a_{iB}$, $b_B$ (i=1, . . . , 4) relating respectively to each of the red, green and blue colour components.

The formulae used are here:

$$a_{iS}=r \cdot a_{iR}+g \cdot a_{iG}+b \cdot a_{iB} \quad i=1, 2, 3, 4 \tag{33}$$

$$b_S=r \cdot b_R+g \cdot b_G+b \cdot b_B \tag{34}$$

where r. multiplication factor relating to the factors $a_{iR}$ and $b_R$.
A value of the factor r can for example be: 1/3 g: multiplication factor relating to the factors $a_{iG}$ and $b_G$.
A value of the factor g can for example be: 1/3 b: multiplication factor relating to the factors $a_{iB}$ and $b_B$.
A value of the multiplication factor b can for example be: 1/3

The factors r, g and b are in this case conventional factors of composition of the colour components in order to make it possible to transform a colour image into a grey-level image. The advantage in this case is that factors r, g and b of values already known in the prior art for other mappings can be used in order to define a global contractive mapping of the second type on compressed data (that is to say on parameters) in order to obtain decompressed data relating to a grey-level image.

The factors $a_{iS}$ and $b_S$ are therefore substitution factors which will be used in the course of the iteration routine 450. The data converge towards the fixed point of the contraction thus defined, relating to a grey-level image corresponding to the original colour image.

With reference to FIG. 19, step 452 first of all includes a test 453, in the course of which it is checked whether or not the list recorded in the course of step 404 in the register REG 2 (670) is empty.

If not, the program switches to step 454 in the course of which the above formulae 33 and 34 are used to determine the substitution factors $a_{iS}$, $b_S$, (i=1, . . . 4).

At step 455, the substitution factors thus calculated for each of the sub-sets $K_i$ are stored in the register REG 1 (560), where they come to replace the factors $a_{iR}$, $b_R$, $a_{iG}$, $b_G$, $a_{iB}$, $b_B$ relating to the colour components of the said sub-set $K_i$.

At step 456, the coordinates relating to the elementary sub-sets processed $K_i$ are eliminated. The coordinates of the last elementary sub-set appearing in the list, and which will be processed in the course of the following loop, are the coordinates relating to the sub-image $K_{i-1}$.

The program then re-switches to the test 453, in order to see whether or not the list of sub-images in the register REG 2 is empty.

If not, the loop continues with the following elementary sub-set $K_{j-1}$ to be processed. If the test 453 is positive, all the sub-images $K_j$ have been processed and the program switches to step 406A including the steps 433 and 434 described above in conjunction with FIG. 16A.

At the end of step 406, the program switches to the loop 450 identical to the one described above in conjunction with FIG. 16. It is during the loop 450 that the method of successive approximations is used in the course of a predetermined number of iterations p (2<p<10).

When the planned number of iterations have been effected, that is to say the test 407 of the loop 450 is positive, the program switches to step 405, similar to that described above in conjunction with FIG. 16, in the course of which the content of the register IM (611) is copied into the output buffer OBFR (690). The program then switches to a final step 402.

The data relating to the grey levels of each of the pixels constituting the 512×512 pixel image are then presented in the output buffer OBFR 690, from where they can be transferred to the decompressed data user means 692 (FIG. 7).

Description of the Flow Diagram of the Configuration Program

A description will now be given, in conjunction with FIG. 20, of the flow diagram of the configuration program used in the device 800 of FIGS. 9 and 9A.

The configuration program bears the reference 831 in FIGS. 9A and 20.

The device 800 illustrated in FIG. 9A has four operating modes, which will be detailed below.

The operating mode of the apparatus is first of all selected (step 832). The mode is selected by entering a value equal to 0, 1 or 2 in the register MOD 822 and a value of 0 or 1 in the register CHTY. This recording can take place by any means within the knowledge of experts. In particular, it could be done by means of a switch arranged on the casing of the apparatus 800 with four positions each corresponding to the desired operating mode. This switch would make it possible to send the appropriate signals to the RAM memory 810, so as to load the values indicated into the registers MOD or CHTY. This initialisation can also be carried out in a similar manner by means of a keyboard, not shown in FIG. 9A.

At step 833, a first test is carried out on the register MOD in order to determine whether or not its content is equal to zero. If the test 833 is positive, this means that the operating mode chosen is the first of those mentioned above and the program 531 is implemented using data fed from the data source 810, the compressed data being delivered at the output 881 to the compressed data user means 860 (FIG. 9).

If the test 833 is negative, a test is carried out at step 834 for the purpose of determining whether or not the content of the register MOD is equal to 1.

If the test 834 is positive, a test 840 is then carried out on the content of the register CHTY for the purpose of determining whether or not it is equal to 1.

If the test 840 is negative, this means that the device of FIGS. 9 and 9A is in the second operating mode, that is to say in the one where it is used to retrieve the original data of a colour image from parameters (compressed data) fed at the input 881, from a source 861 (FIG. 9). The decompressed data delivered at the output 892 of the device 800 are fed to the decompressed data user means 820.

If the test 840 is positive, this means that the device 800 is in the third operating mode, that is to say the one in which it is used to perform a secondary processing of compressed data and deliver data of a type different from those of the original data, in this case data relating to a grey-level image corresponding to an original colour image. In this case, the program 632 is implemented using parameters delivered by a source of compressed data 861. The decompressed data are delivered at the output 692 and fed to user means 820.

If the test 834 is negative, this means that the content of the register MOD is equal to 2. The device 800, which is then in its fourth operating mode, is used to transform a colour image into a grey-level image. It is a case here of an example of complex processing within the meaning of the present invention, including a primary processing phase and a secondary processing phase.

Thus, in the embodiment described here, in accordance with this first aspect of the invention, the primary processing and secondary processing programs are used sequentially.

The program 531 makes it possible, using data delivered by a source of non-compressed data 810 at the output 891 of the device 800, to compress these data, in order to obtain parameters $a_i$, b, relating to each of the elementary sub-sets $K_i$ of the original image. These parameters, in accordance with that which was described above in conjunction with FIG. 10, are all present in the register REG 1 560 at the end of the program 531. The main program of FIG. 20 then activates a direct switching to step 404 of the program 632 described above in conjunction with FIG. 18 (as illustrated in FIG. 20 and, in dotted lines, in FIG. 18). Steps 452, 406, 450, 405 and 402 of the end of the program 632 described above in conjunction with FIG. 18 are then executed.

The transformed data are then present at the buffer register OBFR 893 of the device 800 and transferred to the decompressed data user means 820. These data are those relating to a grey-level image corresponding to the colour image whose data were transferred into the device 800 from the source 810.

It will be noted that the sub-program including all the steps 404, 452, 406, 450, 405 and 402 of the program 632 constitutes here a particular mode of implementation of a secondary processing method according to the invention. It is this particular sub-program which is here used following the program 631 in order to constitute an example of a "complex" processing within the meaning of the present invention.

3. Description of a Variant Using Working Sub-sets Having a Size Different From That of the Corresponding Elementary Sub-set A description will now be given, in conjunction with FIGS. 3A, 10, 11, 12A, 13 to 16 and 17A, of a variant embodiment of the method and device described above, in which at least one working sub-set has a size different from that of the corresponding elementary sub-set. In the preferred embodiment of this variant, four working sub-sets are associated with each elementary sub-set, these four working sub-sets having a size greater than that of the corresponding elementary sub-set.

The image to be processed is here an image of 512×512 pixels partitioned into square sub-sets of 32×32 pixels, in accordance with that which was described above in conjunction with FIG. 1.

The division of the image into working sub-sets will now be described. The working sub-sets here have a size twice that of the elementary sub-sets, so that the 512×512 pixel image is divided into square sub-sets of 64×64 pixels. However, so that four working sub-sets correspond to a given elementary sub-set (see FIG. 3A), the offset used for the division of the image is 32 pixels, the division of the image then resulting in a tiling.

In FIG. 3A the elementary sub-set $K_i$ which has the coordinates $(x_i,y_i)$ is illustrated in thick lines, whilst the corresponding working sub-sets are illustrated in dotted lines, the other sub-sets being outlined in thin lines. It will be observed that, in this embodiment, to each of the sub-sets $K_i$, there are linked four working sub-sets $L_j$ (numbered $L_1, \ldots, L_4$) offset by 64 pixels in both directions and disposed symmetrically with respect to the sub-sets $K_i$ in question. It is a case in reality of the four sub-sets resulting from the division which cover the elementary sub-set in question (resulting from the partitioning). The following expressions show the coordinates of a sub-sets $K_i$ and working sub-sets $L_1, \ldots, L_4$.

TABLE 2

$K_i$: $[x_i, x_i + 31] \times [y_i, y_i + 31]$
$L_1$: $[x_i - 48, x_i + 15] \times [y_i + 16, y_i + 79]$
$L_2$: $[x_i + 16, y_i + 79] \times [y_i + 16, y_i + 79$
$L_3$: $[x_i - 48, x_i + 15] \times [y_i - 48, y_i + 15]$
$L_4$: $[x_i + 16, y_i + 79] \times [y_i - 48, y_i + 15$ The compression and decompression devices used to implement this variant embodiment are similar to those described in conjunction with FIGS. 4 and 6. However, the programs 531 and 631 are modified, as will be explained below.

With regard first of all to the compression program 531 described above in conjunction with FIG. 10, its structure is preserved. Only the operation 207 changes. This modified operation 207A will be described below in conjunction with FIG. 12A.

At step 207A, a search is carried for the four adjacent sub-images $L_1, L_2, L_3, L_4$ (see FIG. 3A) from the address recorded in the register CS1. For this purpose, the rule stated above is applied.

The purpose of step 207A is to determine the values f(x,y) of the colour component associated with each of the pixels of the working sub-sets $L_1, L_2, L_3, L_4$ linked geometrically and in a predetermined manner to the elementary sub-set $K_i$ in question. The set of values f(x,y) related to the pixels of the sub-set $L_1$ (respectively $L_2$, $L_3$ and $L_4$) will hereinafter be denoted $f(L_1)$ (respectively $f(L_2)$, $f(L_3)$ and $(L_4)$) in accordance with the notations used above.

The essential element which differentiates step 207A lies in the fact that the set of values represented by $f(L_i)$, i=1, ..., 4 concerns working sub-sets $L_i$, l=1, ..., 4 which have a size different from that of the elementary sub-set $K_i$. In order to be able to perform the operations of comparison with the sub-set $K_i$, it is necessary to bring the sub-sets $f(L_i)$ to the same size. Several methods are available to the expert. In this embodiment, where the size of the working sub-sets is 64×64 pixels and that of the elementary sub-sets 32×32 pixels, a mean value per square of 4 pixels is adopted. The set of these mean values will be denoted, for a working sub-set $L_i$ in question: $f(L_{i/2})$. The detailed flow diagram of this step is depicted in FIG. 12A.

Figure 12A:
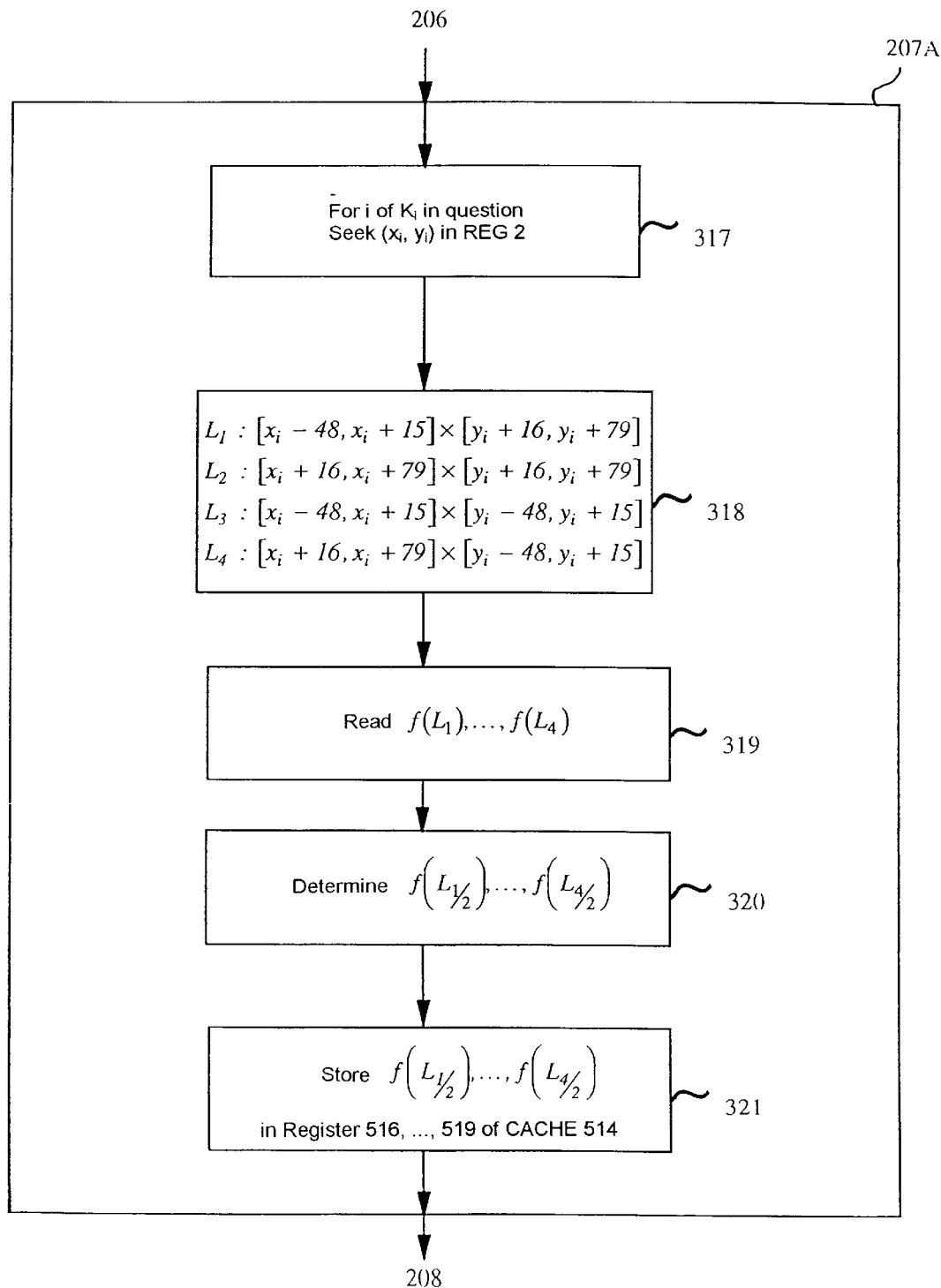

With reference to FIG. 12A at step 317, the coordinates $(x_i,y_i)$ of the bottom left-hand pixel of the elementary sub-set $K_i$ in question are copied into the arithmetic unit 550, and are stored in the register REG 2 570. Then the arithmetic unit 550 determines the coordinates of each pixel of each working sub-set in accordance with Table 2, as indicated at step 318.

At step 319, the arithmetic unit 550 will seek, for the colour component in the course of processing, the value corresponding to each of the 642 pixels of $L_i$ (respectively $L_2$, $L_3$ and $L_4$) and stores all the 642 values in the register $f(L_1)$ 516 (respectively $f(L_1)$ 517, $f(L_3)$ 518 and $f(L_4)$ 519) of the cache 514.

At step 320, the arithmetic unit 550 processes each square of 2×2 values of $f(L_1)$ and substitutes for this a corresponding value of $f(L_{1/2})$ in the register 516. In this embodiment the corresponding value of $f(L_{1/2})$ will be obtained by calculating the mean of the values of the said square of 2×2 values of $f(L_1)$. The other sets $f(L_2), \ldots, f(L_4)$ are then processed in the same way.

At step 321, the values of $f(L_{1/2}), \ldots, f(L_{4/2})$ are stored in the memory CACHE 514, in the registers $f(L_1)$ 516, ..., $f(L_4)$ 519.

The program then switches to step 208 (FIG. 13) in the course of which, as indicated above, the parameters $a_i$ (in this case $a_1, a_2, a_3, a_4$) and b are calculated using the method of least squares with the constraints described above (see equations 12 and 13). However, in this embodiment, the value of i will be less than $\sqrt{2}/_n$.

The operation of the compression program is, for the rest, identical to the operation of the compression program 531 described above in conjunction with FIG. 10. The only difference being that, in the registers 516 to 519, the values $f(L_{1/2}), \ldots, f(L_{4/2})$ are stored.

In this variant embodiment, the decompression program functions in a similar manner to the program 631 described above in conjunction with FIGS. 16 and 17. However, the operation 410 must be modified as disclosed above and will be referenced as 410A, illustrated in FIG. 17A.

The details of step 410A are described in conjunction with FIG. 17A.

Step 410A itself comprises steps 459 to 465: steps 459 and 460 are identical to steps 411 and 412 described above (FIG. 17).

The program then switches to steps 461, 462 and 463, in the course of which the values $f(L_{1/2}), \ldots, f(L_4)$ are determined. Then at step 462 the values $f(L_{1/2}), \ldots, f(L_{4/2})$ are determined. To do this, the arithmetic unit 550 processes each square of 4 values of $f(L_1)$ and substitutes for it a corresponding value of $f(L_{1/2})$ in the register 516. In this embodiment the corresponding value of $f(L_{1/2})$ is obtained by calculating the mean of the values of the said square. The other sets $f(L_2), \ldots, f(L_4)$ are then processed in the same way. At step 463, for each pixel (x,y) of $K_i$, the value $$\sum_{i=1}^{4} a_i \cdot \left[f\left(L_{\frac{1}{2}}\right)\right](x, y) + b$$

is calculated using the factors of 520 and the data $f(L_{1/2}), \ldots, f(L_{4/2})$ of 516 to 519 (step 462), and this value is stored (step 463) at the corresponding pixel in the register RE 621 of the RAM 410.

Finally, step 464 is identical to step 414 (FIG. 17).

The functioning of the modified decompression program as disclosed above in conjunction with FIGS. 17A is for the rest identical to the functioning of the decompression program 631 described above in conjunction with FIG. 16.

In this variation embodiment, a complex processing can also be carried out, enabling the data to be transformed, as described above in conjunction with FIG. 20, using the modified compression 531 and decompression 631 programs as disclosed above in conjunction with FIGS. 10, 11, 12A, 13, 14 and 17A.

4. Description of a Variant Embodiment Using a Global Contractive Mapping Composed of Non-linear Mappings In this variant embodiment of the methods and devices according to the invention, a global contractive mapping is used, composed of non-linear mappings.

In this variant embodiment, which also concerns the compression and decompression of images, the image to be processed is also a 512×512 pixel image. This image is partitioned into elementary sub-sets and divided into working sub-sets in the same way as that described above in conjunction with FIGS. 1 to 3.

The global contractive mapping will now be defined in a preferred method of this variant embodiment.

In accordance with this aspect of the invention, each "piece" of the global contractive mapping is a non-linear Lipschitz elementary mapping of the type:

$$T(f)\Big|_{Ki} : (x,y) \in Ki \rightarrow [T(f)](x,y) = \sum_{j=1}^{n} a_j \cdot g_j[f]\Big|_{L_j} (x,y) + b \quad (10 \text{ ter})$$

where:

$T(f)|_{Ki}$ the restriction of $T(f)$ to the elementary sub-set $K_i$ $g_1[f], \ldots, g_n[f]$ are non-linear transformations of $f(g_i \in F(E,E))$ such as fractional or integer powers of $f$ (for example $g[f] = \sqrt{f}$)

n>1 the number of working sub-sets (n=4 in this embodiment)

$a_1, \ldots a_n$ the multiplication factors b the translation factor $L_1, \ldots l_n$ the working sub-sets, with a predetermined position with respect to $K_i$ and related to this sub-set.

It can be seen that equation (10b) above is of a non-linear nature essentially because of the non-linear transformations $g_1, \ldots, g_n$, the factors $a_j$, j=1, n and b being respectively the multiplication factors and translation factor. The factors $(a_1, \ldots, a_n, b)$ are here the "parameters" within the meaning of the invention of the elementary mapping relating to the sub-set $K_i$. The set of factors $(a_1, \ldots, a_n, b)K_i$ relating to the m elementary sub-sets $(K_1, \ldots, K_m)$ constitutes here also the "set of parameters" of the global contractive mapping within the meaning of the invention.

It should be stated that, in this embodiment, n=4, which means that only four working sub-sets $L_j$, j=1, \ldots, n, such as those defined in conjunction with FIG. 3, are related to each elementary sub-set $K_i$.

Thus, with each pair of values (x,y) of a given elementary sub-set $K_i$, there is associated with it a value calculated from the non-linear equation (10b). This is done for all the m elementary sub-sets $(K_1, \ldots, K_m)$.

In order to resolve the problem of simplified optimisation (see above, notably equation (7)) which makes it possible to determine the non-linear mapping factors $a_j$, j=1, \ldots, n and b for each of the elementary working sub-sets $K_j$, it is necessary, in general terms, for each elementary sub-set $K_j$, to minimise the distance between the restriction to the elementary sub-set $K_i$ and its transform by the global contractive mapping. In other words, it is necessary to minimise the distances:

$$d(f|_{Ki}, T(f)|_{Ki}), i=1, \ldots, m \quad (11)$$

In this regard, the theory disclosed in conjunction with FIGS. (12) to (29) in the part relating to the general theory is applied.

In addition, it will be observed that, in general terms in this variant embodiment, the method of secondary representation of the parameters coming from the primary processing, of initial data, in accordance with the variant described above, uses the general principles described above in relation to equations (30) to (32).

The compression and decompression devices used to implement this variant embodiment are similar to those described above in conjunction with FIGS. 4 and 6. However, the programs 531 and 631 are modified as will be explained below.

With regard first of all to the compression program 531 described above in conjunction with FIG. 10, its structure is preserved. Only step 207 relating to the calculations of the factors changes. This variant of step 207 (marked 207B) will now be described notably in conjunction with FIG. 12B.

Step 207B includes the steps 322 and 323 respectively identical to steps 217 and 218 described above in conjunction with FIG. 12. At step 324, the values $f(L_1), \ldots, f(L_4)$ are read in the register IM 511.

At step 325, the values $g_1[f(L_1)], \ldots, g_4[f(L_4)]$ are determined by calculating by applying the formula $g_i[f(L_i)] = \sqrt{f(L_i)}$.

Finally, at step 326, the values $g_1[f(L_1)], \ldots, g_4[f(L_4)]$ are stored in the registers 516 to 519 of the CACHE 514.

The functioning of the compression program with the modified operation 207 as just described is, for the rest, identical to the functioning of the program 531 described above in conjunction with FIG. 10.

In this variant embodiment, the decompression program functions in a similar manner to the program 631 described above in conjunction with FIGS. 16 15 and 17. However, the operation 410 must be modified as disclosed below. This new operation is referenced 410B and is illustrated in FIG. 17B.

The details of step 410B will now be described in conjunction with FIG. 17B. Step 410B itself comprises steps 471 to 475:

At step 471, the coordinates $(x_i, y_i)$ of the elementary sub-set $K_i$ in question are withdrawn and are copied into the register CS1 515. The factors $(a_1, \ldots, a_4, b)$ relating to the sub-sets $K_i$ in question are copied from the register REG 1 to the register 520 of the CACHE 614.

The purpose of step 472 is to determine the working sub-sets linked geometrically and in a predetermined manner to the elementary sub-set $K_i$ in question. This step includes the same operations as at step 207 described above in conjunction with FIG. 12. The values $g_1[f]|_{L_1}, g_2[f]|_{L_2}, g_3[f]|_{L_3}$ and $g_4[f]|_{L_4}$ of the pixels relating respectively to $L_1, L_2, L_3$ and $L_4$ are respectively copied into the registers 516, 517, 518 and 519 of the CACHE 614.

The program then switches to steps 473 and 474, in the course of which, for each pixel (x,y) of $K_i$, the value $$\sum_{i=1}^{4} a_i \cdot [g_i[f]|_{L_1}](x,y) + b$$

is calculated using the factors stored in the register 520 and the data $f(L_1), \ldots, f(L_4)$ stored in the register of 516 to 519

(step 474), and this value is stored at the corresponding pixel in the register RE 621 of the RAM 610.

Figure 12B:
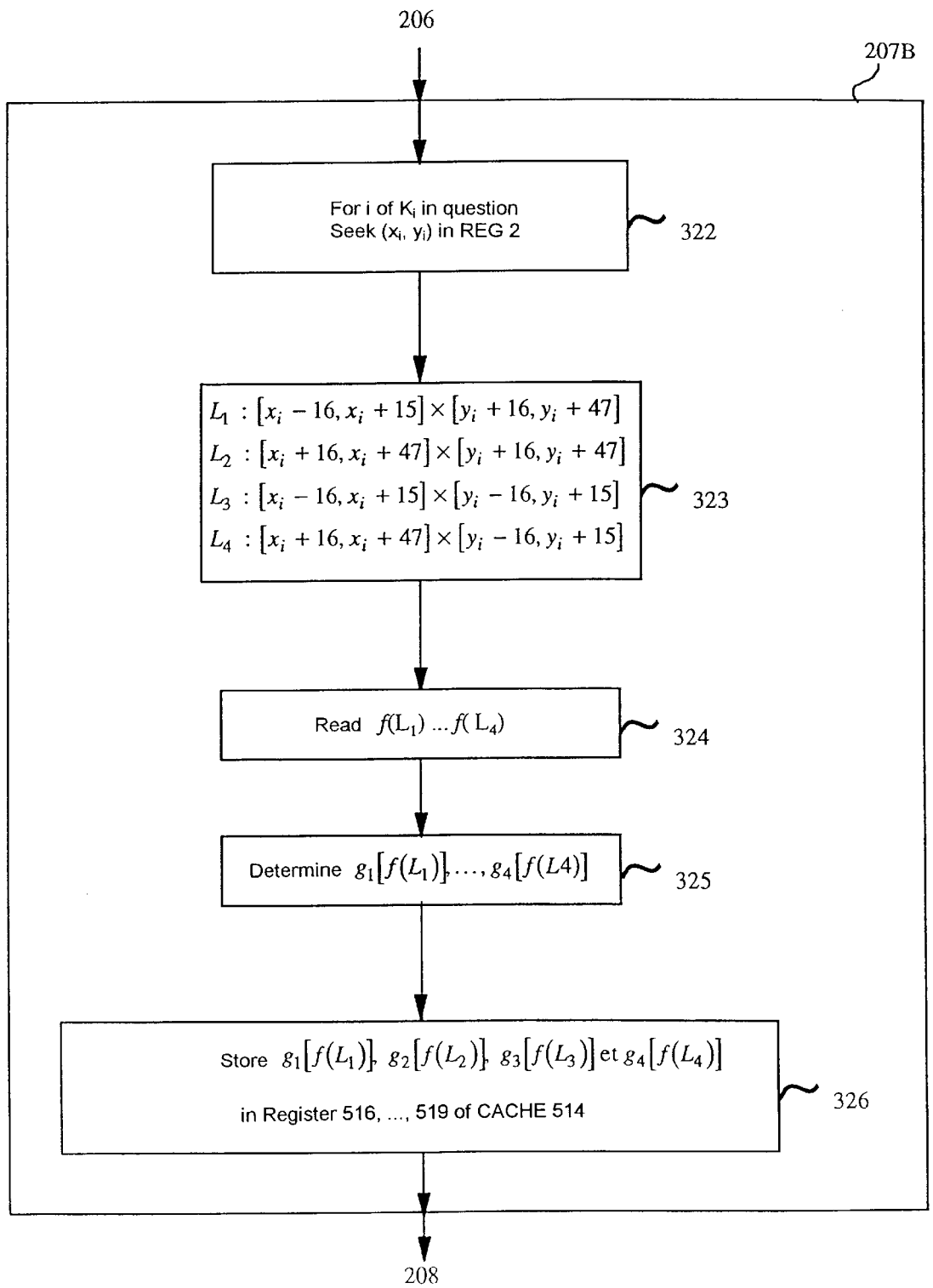

In this variant embodiment, a complex processing can also be carried out, for transforming the data as described above in conjunction with FIG. 20, using modified compression 531 and decompression 631 programs as disclosed above in conjunction with FIGS. 12B and 17B.

Naturally the present invention is in no way limited to the embodiments chosen and depicted but, quite the contrary, encompasses all variants within the ability of experts.

What is claimed is:

1. Method for encoding at least one digital signal representing a set of data, the set of data representing at least one digital image, comprising the steps of:
    a step of constructing a global contractive mapping of a first type for the set of data, a fixed point of which constitutes an approximation of all or part of this set, using, to do this, at least one mapping belonging to the group of mappings consisting of multi-dimensional mappings and non-linear mappings; and
    determining parameters of the global contractive mapping so as to allow the use of a method of successive approximations converging towards the fixed point of the global contractive mapping,
    wherein the determined set of parameters constitutes a primary, encoded representation of the set of data represented by the at least one digital signal.

2. Method according to claim 1, wherein it also includes, prior to the constructing step:
    a partitioning step of partitioning the set of data represented by the at least one digital signal into m elementary sub-sets ($K_i$).

3. Method according to claim 2, wherein the global contractive mapping consists of m elementary Lipschitz mappings related to the m elementary sub-sets ($K_i$).

4. Method of encoding at least one digital signal representing a set of data, the set of data representing at least one digital image, comprising:
    a) a partitioning step of partitioning the set of data represented by the at least one digital signal into m elementary sub-sets ($K_i$);
    b) a construction step in which, for each of the elementary subsets ($K_i$), n working sub-sets ($L_j$) are taken into consideration, n being greater than 1, and an elementary mapping of the n working sub-sets ($L_j$) is constructed in the elementary sub-set in question; and determining the parameters of the elementary mapping so as
        to make contractive a global mapping, of a first type, including the m elementary mappings related to the m elementary sub-sets ($K_i$) and a fixed point of which constitutes an approximation of all or part of this set of data, and
        to allow the use of a method of successive approximations converging towards the fixed point of the global contractive mapping,
        wherein all the parameters thus determined and related to the m elementary subsets ($K_i$) constitute a primary, encoded representation of the set of data represented by the at least one digital signal.

5. Method of encoding at least one digital signal representing a set of data, the set of data representing at least one digital image, comprising:
    a) a partitioning step of partitioning the set of data represented by the at least one digital signal into m elementary sub-sets ($K_i$);
    b) a construction step in which, for each of the elementary subsets ($K_i$), n working sub-sets ($L_j$) are taken into consideration, related geometrically thereto in a predetermined manner, n being non-null, and an elementary mapping belonging to the group of mappings consisting of multi-dimensional mappings and non-linear mappings is constructed, from the n working sub-sets ($L_j$) elementary subset in question, and determining all the parameters of this elementary mapping so as
        to make contractive a global mapping, of a first type, including the m elementary mappings related to the m elementary sub-sets ($K_i$) and a fixed point of which constitutes an approximation of all or part of this set of data, and
        to allow the use of a method of successive approximations converging towards the fixed point of the global contractive mapping,
        wherein all the parameters thus determined and related to the m elementary subsets ($K_i$) constitute a primary, encoded representation of the set of data represented by the at least one digital signal.

6. Method according to either one of claims 4 or 5, wherein at least one working sub-set ($L_j$) amongst the n working sub-sets ($L_j$) has a size different from that of the corresponding elementary sub-set.

7. Method of encoding at least one digital signal representing a set of data, the set of data representing at least one digital image, comprising:
    a) a partitioning step of partitioning the set of data represented by the at least one digital signal into m elementary sub-sets ($K_i$);
    b) a construction step in which, for each of the elementary subsets ($K_i$), n working sub-sets ($L_j$) which correspond to it are taken into consideration, at least one working sub-set ($L_j$) having a size different from that of the corresponding elementary sub-set, n being non-null, and an elementary mapping belonging to the group of mappings consisting of multi-dimensional mappings and non-linear mappings is constructed, of the n working sub-sets ($L_j$) in the elementary sub-set in question, and determining all the parameters of this elementary mapping so as
        to make contractive a global mapping, of a first type, including the m elementary mappings related to the m elementary sub-sets ($K_i$), a fixed point of which constitutes an approximation of all or part of this set of data, and
        to allow the use of a method of successive approximations converging towards the fixed point of the global contractive mapping,
        wherein all the parameters thus determined and related to the m elementary subsets ($K_i$) constitute a primary, encoded representation of the set of data represented by the at least one digital signal.

8. Method according to either one of claims 4 or 7, wherein at least a portion of each of the n working sub-sets ($L_j$) is spatially offset from the elementary sub-set in question.

9. Method for the processing of a set of data including a set of parameters resulting from the encoding of the at least one digital signal representing the initial data effected by implementing the method according to claim 1, comprising an iterative calculation step in the course of which, using the set of parameters, use is made of a method of successive approximations converging towards a fixed point of a global contractive mapping of a second type, the latter fixed point constituting a secondary representation (RE) of the set of initial data.

10. Method of processing at least one digital signal representing a set of data, the set of data representing at least one digital image, comprising the steps of:

constructing, in a primary, encoding processing phase, a global contractive mapping of a first type for the set of data, a fixed point of which constitutes an approximation of all or part of this set, using, to do this, at least one mapping belonging to the group of mappings consisting of multi-dimensional mappings and non-linear mappings and determining the parameters of the global contractive mapping so as to allow the use of a method of successive approximations converging towards the fixed point of the global contractive mapping, wherein the set of parameters thus determined constitutes a primary, encoded representation of the set of data represented by the at least one digital signal; and in a secondary processing phase, an iterative calculation step in the course of which, from the set of parameters, a method of successive approximations is used, converging towards a fixed point of a global contractive mapping, of a second type, the latter fixed point constituting a secondary representation (RE) of the set of data.

11. Method according to claim 10, further comprising, prior to the constructing step:

a partitioning step of partitioning the set of data represented by the at least one digital image into m elementary sub-sets ($K_i$).

12. Method according to claim 11, wherein the global contractive mapping consists, at least partially, of m elementary Lipschitz mappings related to the m elementary sub-sets ($K_i$).

13. Method of processing at least one digital signal representing a set of data, the set of data representing at least one digital image, comprising the steps of:

in a primary, encoding processing phase, a) a partitioning step of partitioning the set of data represented by the at least one digital signal into m elementary sub-sets ($K_i$);

b) a construction step in which, for each of the elementary sub-sets ($K_i$), n working sub-sets ($L_1$) are taken into consideration, n being greater than 1, and an elementary mapping of the n working sub-sets ($L_j$) is constructed in the elementary sub-set in question, determining the parameters of the elementary mapping so as to make contractive a global mapping, of a first type, including the m elementary mappings related to the m elementary sub-sets ($K_i$) and a fixed point of which constitutes an approximation of all or part of this set of data, and to allow the use of a method of successive approximations converging towards the fixed point of the global contractive mapping, wherein all the parameters thus determined and related to the m elementary sub-sets ($K_i$) constitute a primary, encoded representation of the set of data represented by the at least one digital signal, and, in a secondary processing phase, c) an iterative calculation step in the course of which, using the set of parameters, use is made of a method of successive approximations converging towards a fixed point of a global contractive mapping of a second type, the latter fixed point constituting a secondary representation (RE) of the set of initial data.

14. Method of processing at least one digital signal representing a set of data, the set of data representing at least one digital image, comprising the steps of:

in a primary, encoding processing phase, a) a partitioning step of partitioning the set of data represented by the at least one digital signal into m elementary sub-sets ($K_i$);

b) a construction step in which, for each of the elementary subsets ($K_i$), n working sub-sets ($L_1$) are taken into consideration, related geometrically thereto in a predetermined manner, n being non-null, and an elementary mapping belonging to the group of mappings consisting of multi-dimensional mappings and non-linear mappings is constructed, from the n working sub-sets ($L_j$) in the elementary sub-set in question, determining all the parameters of this elementary mapping so as to make contractive a global mapping, of a first type, including the m elementary mappings related to the m elementary sub-sets ($K_i$) and a fixed point of which constitutes an approximation of all or part of this set of data, and to allow the use of a method of successive approximations converging towards the fixed point of the global contractive mapping, wherein all the parameters thus determined and related to the m elementary subsets ($K_i$) constitute a primary, encoded representation of the set of data represented by the at least one digital image, and, in a secondary processing phase, c) an iterative calculation step in the course of which, using the set of parameters, use is made of a method of successive approximations converging towards a fixed point of a global contractive mapping of a second type, the latter fixed point constituting a secondary representation (RE) of the set of initial data.

15. Method according to claim 13 or 14, wherein at least one working sub-set amongst the n working sub-sets ($L_j$) has a size different from that of the corresponding elementary sub-set.

16. Method of processing at least one digital signal representing a set of data, the set of data representing at least one digital image, comprising the steps of:

in a primary, encoding processing phase, a) a partitioning step of partitioning the set of data represented by the at least one digital signal into m elementary sub-sets ($K_i$);

b) a construction step in which, for each of the elementary subsets ($K_i$), n working sub-sets ($L_j$) which correspond to it are taken into consideration, at least one working sub-set ($L_j$) having a size different from that of the corresponding elementary sub-set, n being non-null, and an elementary mapping belonging to the group of mappings consisting of multi-dimensional mappings and non-linear mappings is constructed, of the n working sub-sets ($L_j$) in the elementary sub-set in question, determining the parameters of this elementary mapping so as to make contractive a global mapping, of a first type, including the m elementary applications related to the m elementary sub-sets ($K_i$) and a fixed point of which constitutes an approximation of all or part of this set of data, to allow the use of a method of successive approximations converging towards the fixed point of the global contractive mapping, wherein all of the parameters thus determined and related to the m elementary subsets ($K_i$) constitute a primary, encoded representation of the set of data represented by the at least one digital signal; and, in a secondary processing phase, c) an iterative calculation step in the course of which, using the set of parameters, use is made of a method of successive approximations converging towards a fixed point of a global contractive mapping of a second type, the latter fixed point constituting a secondary representation (RE) of the set of initial data.

17. Method according to either one of claims 13 or 16, wherein the n working sub-sets ($L_j$) are geometrically related in a predetermined fashion to the elementary sub-set in question.

18. Method according to either one of claims 9 or 10, wherein in the course of the iterative calculation step, account is taken of the set of parameters and of an arbitrary set of data referred to as an initialisation set, and, in order to effect the global contractive mapping of the second type:

$c_1$) the initialisation set is partitioned into m elementary sub-sets ($K_i$);

$c_2$) for each of the m elementary sub-sets ($K_i$) thus determined, the parameters of elementary mappings corresponding to the elementary sub-sets ($K_i$) resulting from the partitioning of the set of initial data are taken into consideration, and the elementary mappings are used on the elementary sub-sets ($K_i$) of the initialisation set;

$c_3$) the set of data obtained by the m implementations of elementary mappings are combined, this constituting an intermediate representation of the initial data, with an error; and $c_4$) operations $c_1$–$c_3$ are reiterated, taking the intermediate representation as the initialisation set, so as to approach the fixed point of the global contractive mapping of the second type;

wherein the set of data finally obtained constitutes a secondary representation (RE) of the set of data represented by the at least one digital image which was the subject of encoding.

19. Method according to either one of claims 9 or 10, wherein the global contractive mapping of the second type is identical to the global contractive mapping of the first type.

20. Method according to claim 4, wherein the elementary mapping constructed for at least one of the elementary sub-sets ($K_i$), is of the Lipschitz type.

21. Device for encoding at least one digital signal representing a set of data, the set of data representing at least one digital image, comprising:

means of inputting the at least one digital signal representing data to be processed;

means of outputting parameters; and first logic means of transforming the data to be processed into parameters;

said first logic means including:
construction means adapted:
to construct, for each set of data to be processed, a global contractive mapping of a first type, a fixed point of which constitutes an approximation of all or part of this set of data, using, to do this, at least one mapping belonging to the group of mappings consisting of multi-dimensional mappings and non-linear mappings, so as to allow the use of a method of successive approximations converging towards the fixed point of the global contractive mapping, and to deliver, at the output means, the parameters thus determined, wherein the parameters constitute a primary, encoded representation of the set of data represented by the at least one digital signal.

22. Device according to claim 21, wherein said first logic means includes:

means adapted to partition the set of data represented by the at least one digital signal into m elementary sub-sets ($K_i$).

23. Device according to claim 22, wherein the construction means is adapted to constitute the global contractive mapping, at least partially, of m elementary Lipschitz mappings related to the m elementary subsets ($K_i$).

24. Device for encoding at least one digital signal representing a set of data, the set of data representing at least one digital image, comprising:

means of inputting the at least one digital signal representing data to be processed;

means of outputting parameters; and first logic means for transforming the data to be processed into parameters;

the said first logic means including:
means adapted to partition the set of data into m elementary sub-sets ($K_i$);
construction means adapted:
to take into account, for each of the elementary sub-sets ($K_i$), n working sub-sets ($L_j$), n being greater than 1, to construct, for each of the elementary sub-sets ($K_i$), an elementary mapping of the n working sub-sets ($L_j$) in the elementary sub-set in question, determining the parameters thereof so as to make contractive a global mapping of a first type including the m elementary mappings related to the m elementary sub-sets ($K_i$), and a fixed point of which constitutes an approximation of all or part of this set of data, and to permit the implementation of a method of successive approximations converging towards the fixed point of the global contractive mapping, and to deliver at the output means the parameters thus determined, wherein said parameters constitute a primary, encoded representation of the set of data represented by the at least one digital signal.

25. Device for encoding at least one digital signal representing a set of data, the set of data representing at least one digital image, comprising:

means of inputting the at least one digital signal representing data to be processed;

means of outputting parameters; and first logic means of transforming the data to be processed into parameters;

said first logic means including:
partitioning means adapted to partition the set of data into elementary sub-sets ($K_i$),
construction means adapted:
to take into account, for each of the elementary sub-sets ($K_i$), n working sub-sets ($L_j$) related thereto in a predetermined fashion, n being non-null, to construct, for each of the elementary sub-sets ($K_i$), an elementary mapping belonging to the group of mappings consisting of multi-dimensional mappings and non-linear mappings, of the n working sub-sets ($L_j$) in the elementary sub-set in question, determining all the parameters of this elementary mapping so as to make contractive a global mapping of a first type including the m elementary mappings related to the m elementary sub-sets ($K_i$) whose fixed point constitutes an approximation of all or part of this set of data, to allow the use of a method of successive approximations converging towards the fixed point of the global contractive mapping, and to deliver, at the output means, the parameters thus determined, wherein the parameters constitute a primary, encoded representation of the set of data represented by the at least one digital signal.

26. Device for encoding at least one digital signal representing a set of data, the set of data representing at least one digital image, comprising:

means of inputting the at least one digital signal representing data to be processed;

means of outputting parameters; and first logic means of transforming the data to be processed into parameters;

said first logic means including:

partitioning means adapted to partition the set of data into elementary sub-sets ($K_i$), construction means adapted:

to take into account, for each of the elementary sub-sets ($K_i$), n working sub-sets ($L_j$) which correspond thereto, at least one of the working sub-sets ($L_j$) having a size different from that of the corresponding elementary sub-set, n being non-null;

to construct, for each of the elementary sub-sets ($K_i$), an elementary mapping belonging to the group of mappings consisting of multi-dimensional mappings and non-linear mappings, of the n working sub-sets ($L_j$) in the elementary sub-set in question, determining all the parameters of this elementary mapping so as to make contractive a global mapping of a first type including the m elementary mappings related to the m elementary sub-sets ($K_i$) whose fixed point constitutes an approximation of all or part of this set of data, to allow the use of a method of successive approximations converging towards the fixed point of the global contractive mapping, and to deliver, at the output means, the parameters thus determined, wherein the parameters constitute a primary, encoded representation of the set of data represented by the at least one digital signal.

27. Device according to any one of claims 24 to 26, wherein the construction means is adapted to take into account, for each of the elementary sub-sets ($K_i$), n working sub-sets ($L_j$) geometrically related in a predetermined manner to the elementary sub-set in question.

28. Device according to either one of claims 24 or 25, wherein the construction means is adapted to take account of at least one working sub-set ($L_j$) amongst the n working subsets ($L_j$) having a size different from that of the corresponding elementary sub-set.

29. Data processing device suitable for the processing of a set of parameters resulting from the encoding of the at least one digital signal represented by the initial data effected by the implementation of the method according to claim 1, said device comprising:

means of inputting parameters;

means of outputting data; and second logic means for transforming the parameters into data, said second logic means including iterative calculation means adapted to implement, using the set of parameters, a method of successive approximations converging towards a fixed point of a global contractive mapping of a second type, the latter fixed point constituting a secondary representation (RE) of the set of initial data, and delivering the data thus calculated at the output means.

30. Data processing device suitable for the processing of a set of parameters resulting from the encoding of the at least one digital signal represented by the initial data effected by implementing the method according to claim 1, the device comprising:

means of inputting parameters;

means of outputting data; and second logic means for transforming the parameters into data;

the second logic means including:

iterative calculation means adapted to effect, using the set of parameters, and on an arbitrary set of data referred to as an initialisation set, a global contraction of the second type and, for this purpose:

$c_1$) to partition the initialisation set into m elementary sub-sets ($K_i$), $c_2$) to take into consideration, for each of the m elementary sub-sets ($K_i$) thus determined, the parameters of the elementary mappings corresponding to the elementary sub-sets ($K_i$) resulting from the partitioning of the set of initial data, and to use the elementary mappings on the elementary sub-sets ($K_i$) of the initialisation set, $c_3$) to combine the set of data obtained by the m implementations of elementary mappings, this constituting an intermediate representation of the initial data, with an error, $c_4$) to reiterate operations $c_1$–$c_3$, taking the intermediate representation as the initialisation set, so as to approach a fixed point of the global contractive mapping of the second type, and $c_5$) to deliver, at the output means, the set of data thus obtained, this set constituting a secondary representation (RE) of the set of initial data.

31. Processing device according to claim 21, wherein said first logic means includes:

a microprocessor;

a read only memory including a program for the primary representation of data, and a random access memory including registers adapted to record variables modified during the running of the secondary representation program.

32. Processing device according to either one of claims 29 or 30, wherein said second logic means includes:

a microprocessor;

a read only memory including a program for the secondary representation (RE) of data, and a random access memory including registers adapted to record variables modified during the running of the primary representation program (RE).

33. Data processing device, comprising:

a first data processing device for the primary, encoding processing of at least one digital signal representing a set of data, the set of data representing at least one digital image, said first data processing device comprising:

means of inputting the at least one digital signal representing data to be processed, means of outputting parameters, and first logic means of transforming the data to be processed into parameters, said first logic means including:

construction means adapted to construct, for each set of data to be processed, a global contractive mapping of a first type, a fixed point of which constitutes an approximation of all or part of this set of data, using, to do this, at least one mapping belonging to the group of mappings consisting of multi-dimensional mappings and non-linear mappings, so as to allow the use of a method of successive approximations converging towards the fixed point of the global contractive mapping, and to deliver, at the output means, the parameters thus determined, wherein the parameters constitute a primary, encoded representation of the set of data represented by the at least one digital signal; and a second data processing device suitable for the secondary processing of the parameters resulting from the primary processing performed by said first data processing device, said second data processing device comprising:

means of inputting those parameters;

means of outputting data; and second logic means for transforming the parameters into data, said second logic means including iterative calculation means adapted to implement, using the set of parameters, a method of successive approximations converging towards a fixed point of a global contractive mapping of a second type, the latter fixed point constituting a secondary representation (RE) of the set of initial data, and delivering the data thus calculated to the output means.

34. Data processing device according to claim 33, wherein said first and second logic means are incorporated in particular in:

a microprocessor;

a read only memory including a program for the primary representation of data and a program for the secondary representation (RE) of data; and a random access memory including registers adapted to record variables modified during the running of the programs.

35. Device according to claim 34, wherein the global contractive mapping of the second type is identical to the global contractive mapping of the first type.

36. Device according to claim 35, wherein the elementary mapping constructed for at least some of the elementary sub-sets ($K_i$) is of the Lipschitz type.

37. Method according to either one of claims 9 or 10, in which the parameters are a primary representation of a color image with three components (CNT, R, G, B) wherein, after an iterative calculation step on one of the components (CNT), use is made, as initialisation, of the iterative calculation step relating to the component according to the secondary representation (RE) obtained at the end of the iterative calculation step relating to one of the components already processed.

38. Device according to claim 36, in which the parameters are a primary representation of a color image with three components (CNT, R, G, B), wherein said second logic means is adapted to supply, to the iterative calculation means, an arbitrary initialisation set for the processing of the parameters relating to a first component and, as an initialisation set for the processing of the following components, the secondary representation (RE) obtained at the end of the iterative calculation step relating to one of the components already processed.

* * * * *

UNITED STATES PATENT AND TRADEMARK OFFICE
CERTIFICATE OF CORRECTION

PATENT NO.    : 6,456,743 B1
DATED         : September 24, 2002
INVENTOR(S)   : Maryline Charrier et al.

It is certified that error appears in the above-identified patent and that said Letters Patent is hereby corrected as shown below:

Title page,
Item [57], ABSTRACT,
Line 2, "a" should read -- of a --.

Column 1,
Line 32, "resulting" should read -- resulting in --; and
Line 58, "is" should be deleted.

Column 7,
Line 4, "non null," should read -- non-null, --; and
Line 29, ""partitioning" should read -- "partitioning" --.

Column 8,
Line 10, "non null," should read -- non-null, --; and
Line 35, ""partitioning" should read -- "partitioning" --.

Column 9,
Line 31, "parameters" should read -- parameters; --.

Column 12,
Line 38, "this." should read -- this, --; and
Line 64, "device." should read -- device, --.

Column 14,

Line 52, "?a*∈σ(X):d(f,a*)≦d(f,a),∀a∈σ(X)" should read
   --?a*∈ŏ(X):d(f,a*)≦d(f,a),∀a∈ŏ(X)--.

Column 16,

Line 34, "$\bigcup_{i=1}^{III} K_1$" should read --$\bigcup_{i=1}^{III} K_1$--; and Line 48, "$K_j$." should read -- $K_i$. --.

UNITED STATES PATENT AND TRADEMARK OFFICE
CERTIFICATE OF CORRECTION

PATENT NO. : 6,456,743 B1
DATED : September 24, 2002
INVENTOR(S) : Maryline Charrier et al.

It is certified that error appears in the above-identified patent and that said Letters Patent is hereby corrected as shown below:

Column 17,
Line 18, "$\bigcup_{J=1} L_j \ \Omega$" should read -- $\bigcup_{j=1}^{l} L_j \subset \Omega$ --;

Line 21, "one" should read -- other --; and

Line 25, "$L_j \neq \emptyset, i, j = 1,...,1, i \neq j.$" should read -- $L_j \neq \emptyset, i, j = 1,...,l, i \neq j.$ --.

Column 18,
Line 54, "$\sum_{j=1}^{n} a_1 \cdot g \Big|_{ij} (x,y) + b$" should read -- $\sum_{j=1}^{n} a_j \cdot g \Big|_{ij} (x,y) + b$ --.

Column 20,
Line 10, "$\phi_{K_i}(a_1,...,a_n b) = \sum_{(x,y) \in K_1} \left( f(x,y) - \left[ \sum_{j=1}^{n} a_j \cdot f'_{iL_j}(x,y) + b \right] \right)^2$ . (14)" should read -- $\phi_{K_i}(a_1,...,a_n b) = \sum_{(x,y) \in K_1} \left( f(x,y) - \left[ \sum_{j=1}^{n} a_j \cdot f \big|_{Lj}(x,y) + b \right] \right)^2$ . (14) --;

Line 18, "$\phi_K(a_1^*,...,a_n^*,b^*) = \min \{\phi_K(a_1,...,a_n,b) | (a_1,...,a_n,b) \in C.$ (15) should read -- $\phi_{K_i}(a_1^*,...,a_n^*,b^*) = \min \{\phi_{K_i}(a_1,...,a_n,b) | (a_1,...,a_n,b) \in C.$ (15) --; and Line 59, "$G_{ji} = \sum_{(x,y) \in K} g_j(xy) \cdot g_i(xy), \{j = 1,...,m-1, i = 1,...,m-1,$" should read -- $G_{ji} = \sum_{(x,y) \in K} g_j(xy) \cdot g_i(xy), \begin{cases} j = 1,...,m-1, \\ i = 1,...,m-1, \end{cases}$ --.

UNITED STATES PATENT AND TRADEMARK OFFICE
CERTIFICATE OF CORRECTION

PATENT NO. : 6,456,743 B1
DATED : September 24, 2002
INVENTOR(S) : Maryline Charrier et al.

It is certified that error appears in the above-identified patent and that said Letters Patent is hereby corrected as shown below:

Column 22,

Line 32, " $d\bigl((T^*)^l(x_0), (T^*)^{l+1}(x_0)\bigr) < \epsilon$ " should read -- $d\bigl((T^*)^l(x_0), (T^*)^{l+1}(x_0)\bigr) < \varepsilon$ --;

Line 34, "$\epsilon$" should read -- $\varepsilon$ --.

Column 30,
Lines 25-29,
" $H_{ji} = \sum (x,y) \in K\bigl[f(L_j)\bigr](x,y) \cdot \bigl[f(L_i)(x,y)\; i,j = 1,\ldots,3\bigr]$ $H_{4i} = H_{i4} = \sum_{(x,y)\in K} \bigl[f(L_i)\bigr](x,y)$ $H_{44} = 32^2$ "

should read

-- $H_{ji} = \sum_{(x,y)\in K} \bigl[f(L_j)\bigr](x,y) \cdot \bigl[f(L_i)\bigr](x,y) \qquad i,j = 1,\ldots,3$ $H_{4i} = H_{i4} = \sum_{(x,y)\in K} \bigl[f(L_i)\bigr](x,y) \qquad i = 1,\ldots,3$ $H_{44} = 32^2$ --; and Lines 41-44, " $T_i = \sum (x,y) \in K\bigl[f(L_j)\bigr](x,y) \cdot \bigl[f(L_i)\bigr](x,y)\; i=1,\ldots,3$ $T_4 = \sum_{(x,y)\in K} \cdot F(x,y)$ "

should read

-- $T_i = \sum_{(x,y)\in K} \bigl[f(L_j)\bigr](x,y) \cdot F(x,y) \quad i=1,\ldots,3$ $T_4 = \sum_{(x,y)\in K} F(x,y)$ --.

UNITED STATES PATENT AND TRADEMARK OFFICE
CERTIFICATE OF CORRECTION

PATENT NO. : 6,456,743 B1
DATED : September 24, 2002
INVENTOR(S) : Maryline Charrier et al.

It is certified that error appears in the above-identified patent and that said Letters Patent is hereby corrected as shown below:

Column 34,
Line 21, "f" (third occurrence) should read -- factors --.

Column 35,
Line 6, "K" should read -- $K_i$ --.

Column 37,
Line 18, "sub-sets" should read -- sub-set --.

Column 38,
Lines 6 and 7, "642" should read -- $64^2$ --; and
Line 25, "i" should read -- $\beta$ --.

Column 40,
Line 38, "15" should be deleted; and

Line 60-63, "$\sum_{i=1}^{4} a_i \cdot [g_i[f]|_{L_i}](x,y)+b$" should read -- $\sum_{i=1}^{4} a_i \cdot [g_i[f]|_{L_i}](x,y)+b$ --.

Column 43,
Line 42, "$(L_l)$" should read -- $(L_j)$ --.

Column 44,
Line 11, "$(L_l)$" should read -- $(L_j)$ --.

Signed and Sealed this

Twenty-first Day of October, 2003

JAMES E. ROGAN
*Director of the United States Patent and Trademark Office*